United States Patent

Koshiba et al.

Patent Number: 6,040,840
Date of Patent: Mar. 21, 2000

[54] VIRTUAL CLAY SYSTEM AND ITS METHOD OF SIMULATION

[75] Inventors: Takeshi Koshiba; Masahiro Matsuoka; Kuniharu Takayama, all of Kawasaki, Japan

[73] Assignee: Fujitsu Limited, Kawasaki, Japan

[21] Appl. No.: 09/031,916

[22] Filed: Feb. 27, 1998

[30] Foreign Application Priority Data

May 28, 1997 [JP] Japan .................................. 9-137359

[51] Int. Cl.[7] .................................................. G06F 15/00
[52] U.S. Cl. ........................................................... 345/441
[58] Field of Search .................................... 345/440, 441, 345/443, 419, 424, 433

[56] References Cited

U.S. PATENT DOCUMENTS 4,841,292  6/1989  Zeno ...................................... 340/736
5,446,833  8/1995  Miller et al. ............................ 395/125

FOREIGN PATENT DOCUMENTS 5-314091  11/1993  Japan .

OTHER PUBLICATIONS

Lamousin et al., "NURBS–Based Free–Form Deformations", IEEE Computer Graphics and Applications, 11, Nov.1994, pp. 59–65.

Qin et al., "D–Nurbs" A Physics–Based Framework for Geometric Design, IEEE Transactions on Visualization and Computer Graphics, vol. 2, No. 1, Mar., 1996, pp. 85–96.

Rappoport et al, "Volume–Preserving Free–Form Solids", IEEE Transactions on Visualization and Computer Graphics, vol. 2, No. 1, Mar., 1996, pp. 19–27.

Varshney et al., "Computing Smooth Molecular Surfaces", IEEE Computer Graphics and Applications, Sep., 1994, pp. 19–25.

Hirota et al., "Providing Force Feedback in Virtual Environments", IEEE Computer Graphics and Applications, Sep., 1995, pp. 22–30.

Yasugi et al., "An Object–Oriented Concurrent Algorithm for N–Body Problem", Japan Software academic Society, The 8th Conference Collection of Papers, 1992, From "2 0 (N log N) Successive Algorithm" to 4 Sophisticated Object–Oriented Concurrent Algorithm on pp. 405–408.

*Primary Examiner*—Phu K. Nguyen
*Attorney, Agent, or Firm*—Staas & Halsey

[57] ABSTRACT

The system creates the aggregate of virtual particles in a cybernetic space on a computer and displays the shape of an object by means of a film covering its surface. When a user inputs a deforming designation, each particle moves and deforms the film. At this time the shape, sense of touch and counter force are output from the computer, and the user can deform the object with a feeling of working clay.

17 Claims, 78 Drawing Sheets

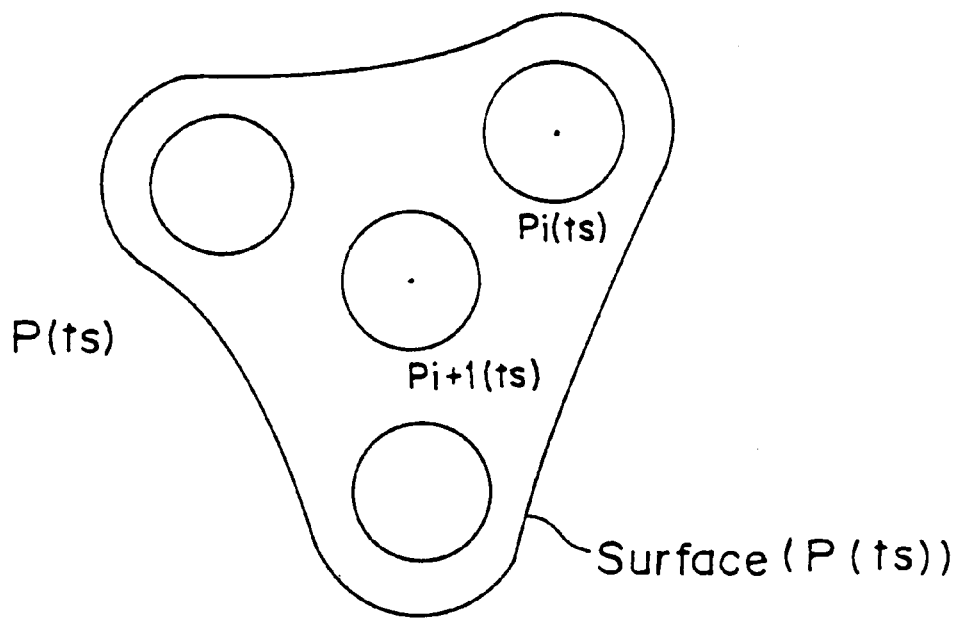
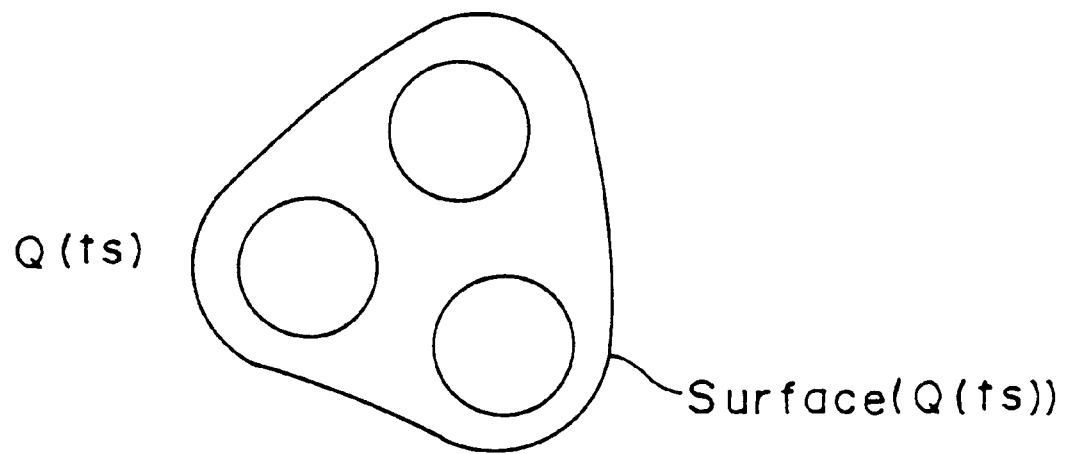
FIG. 14

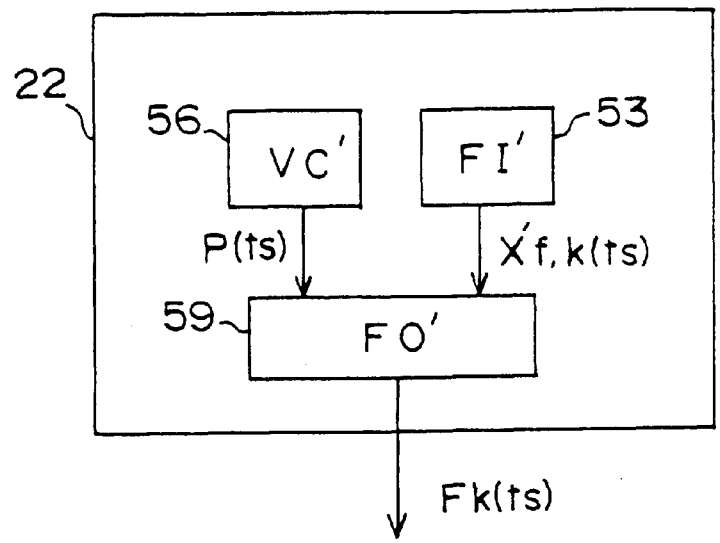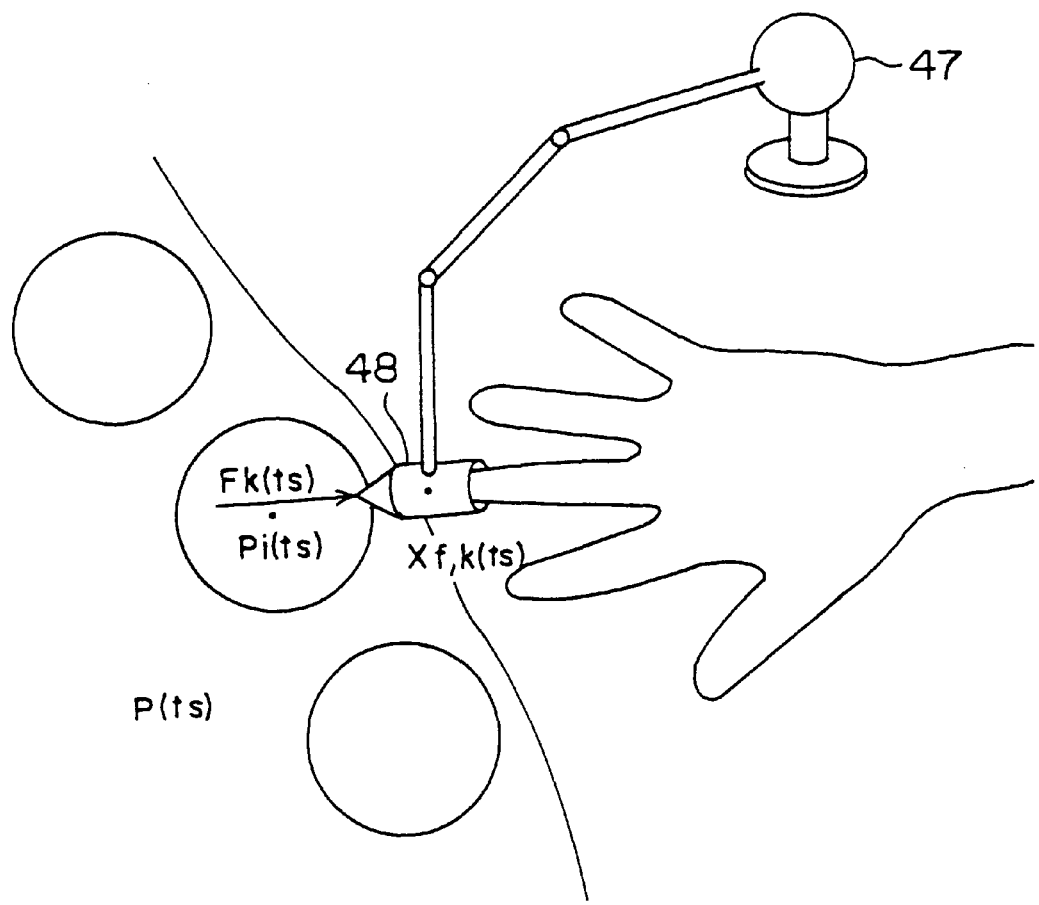
FIG. 17

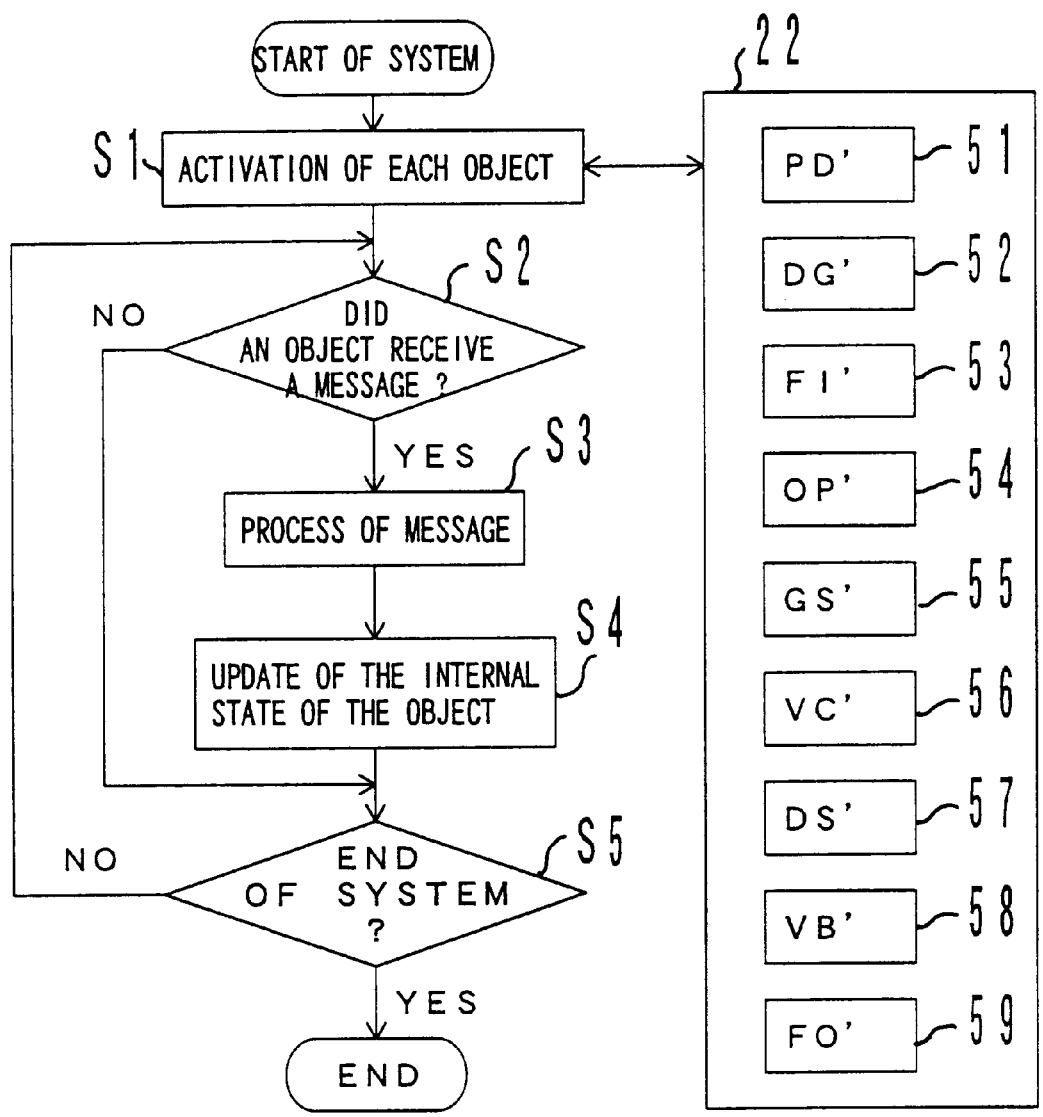
F I G. 2 2

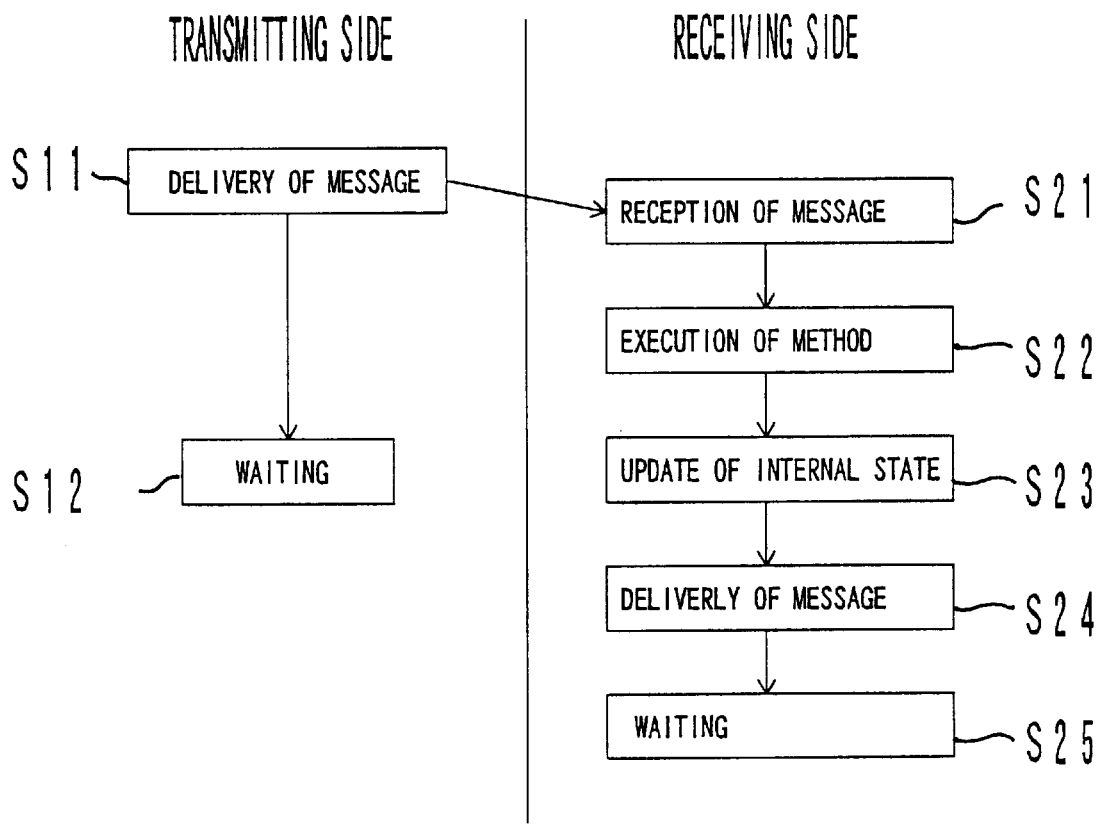
F I G. 2 3

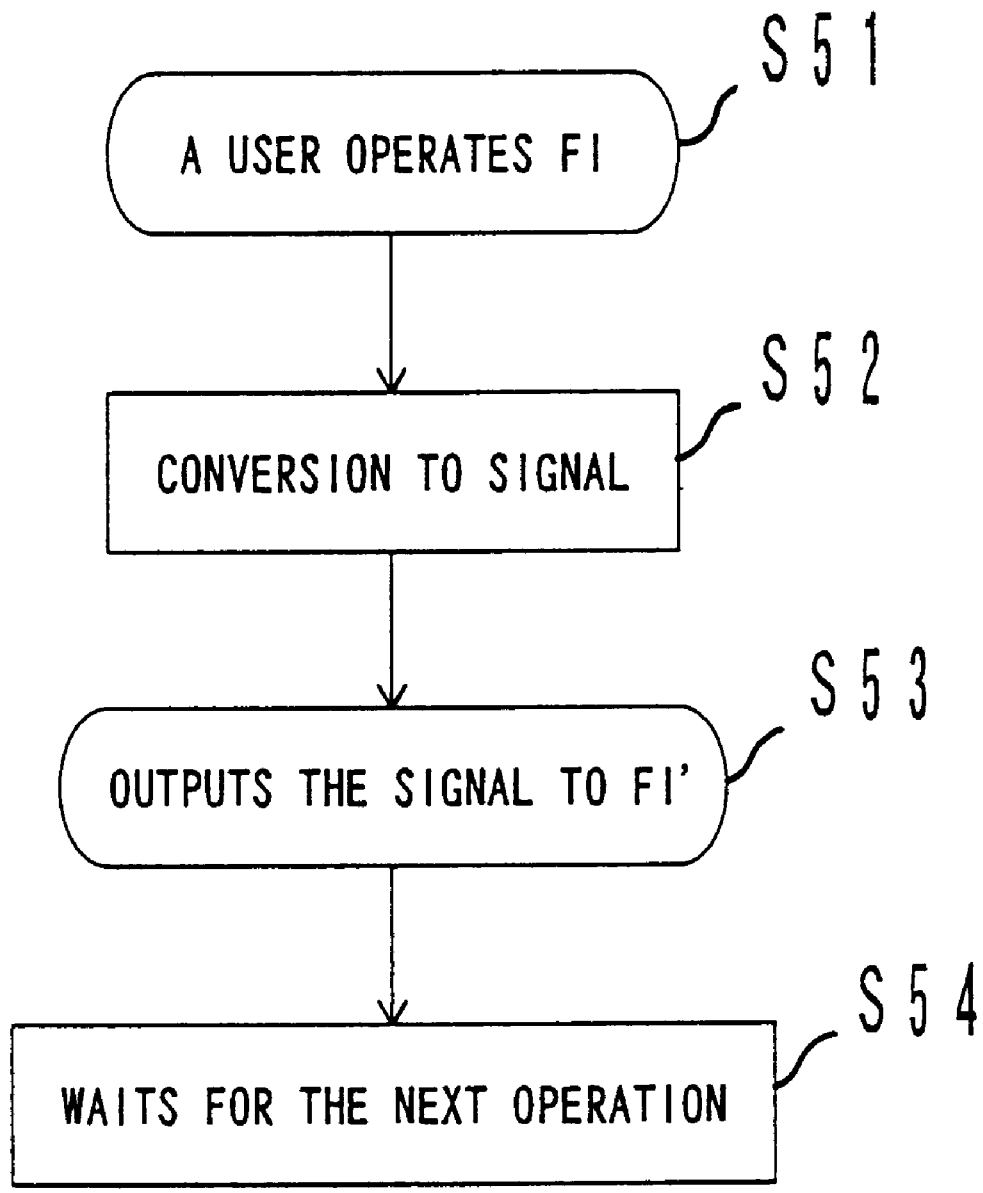
F I G. 2 6

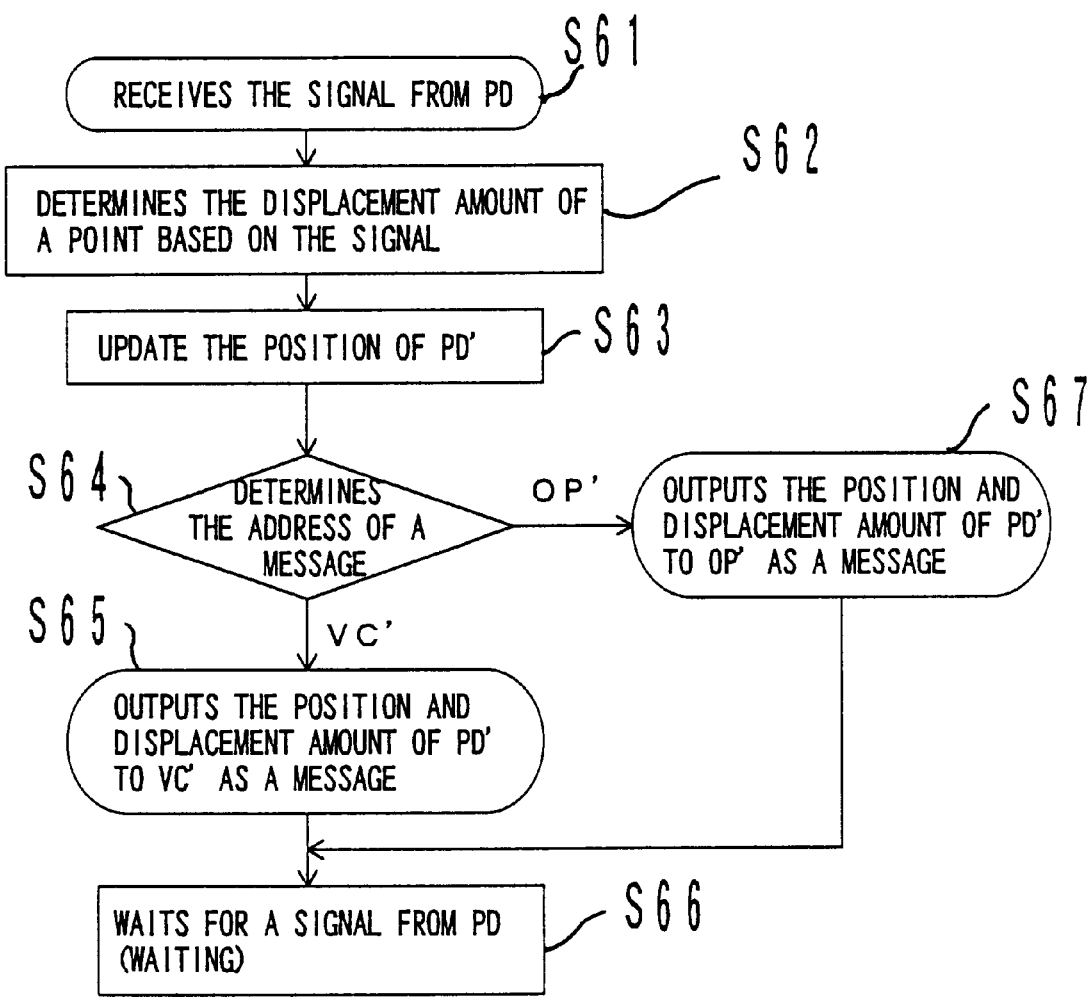
F I G. 27

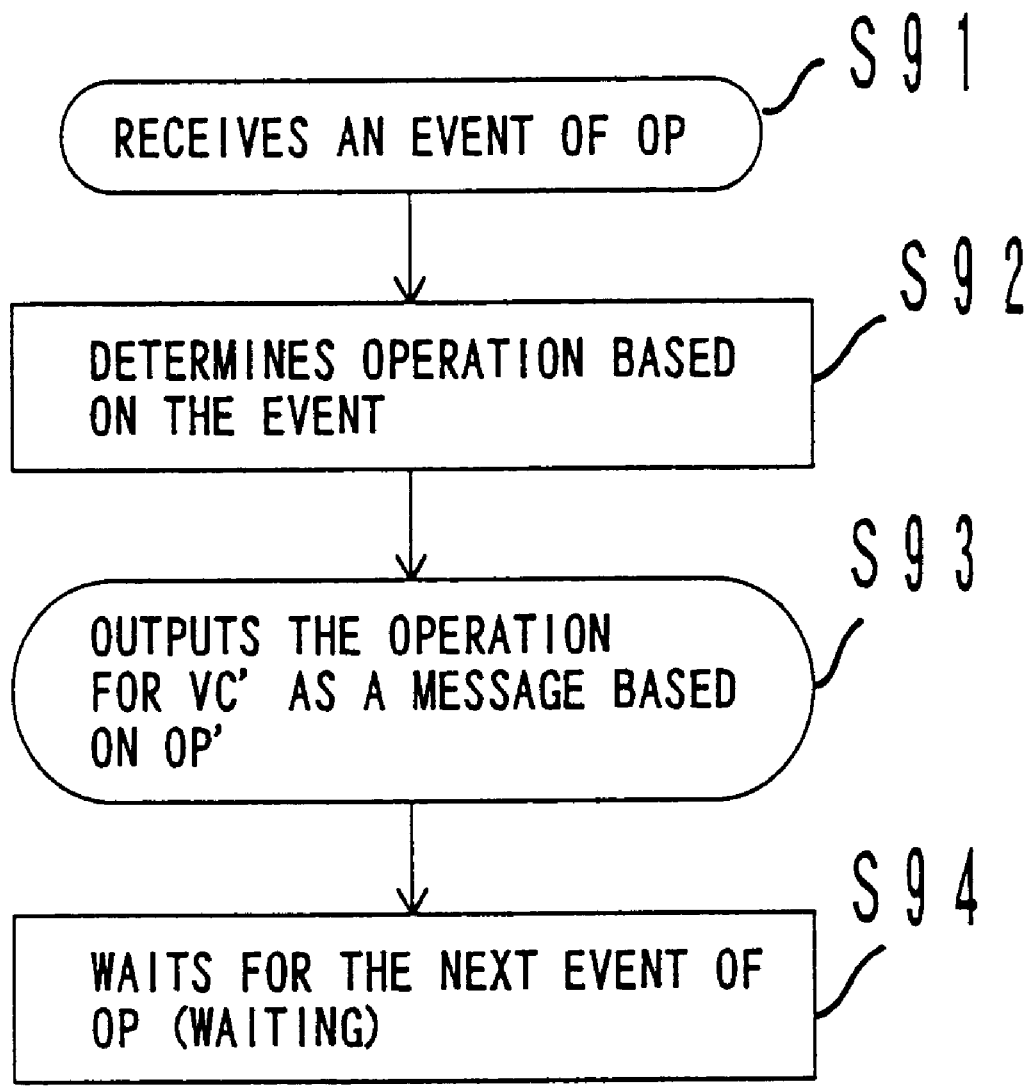
F I G. 3 0

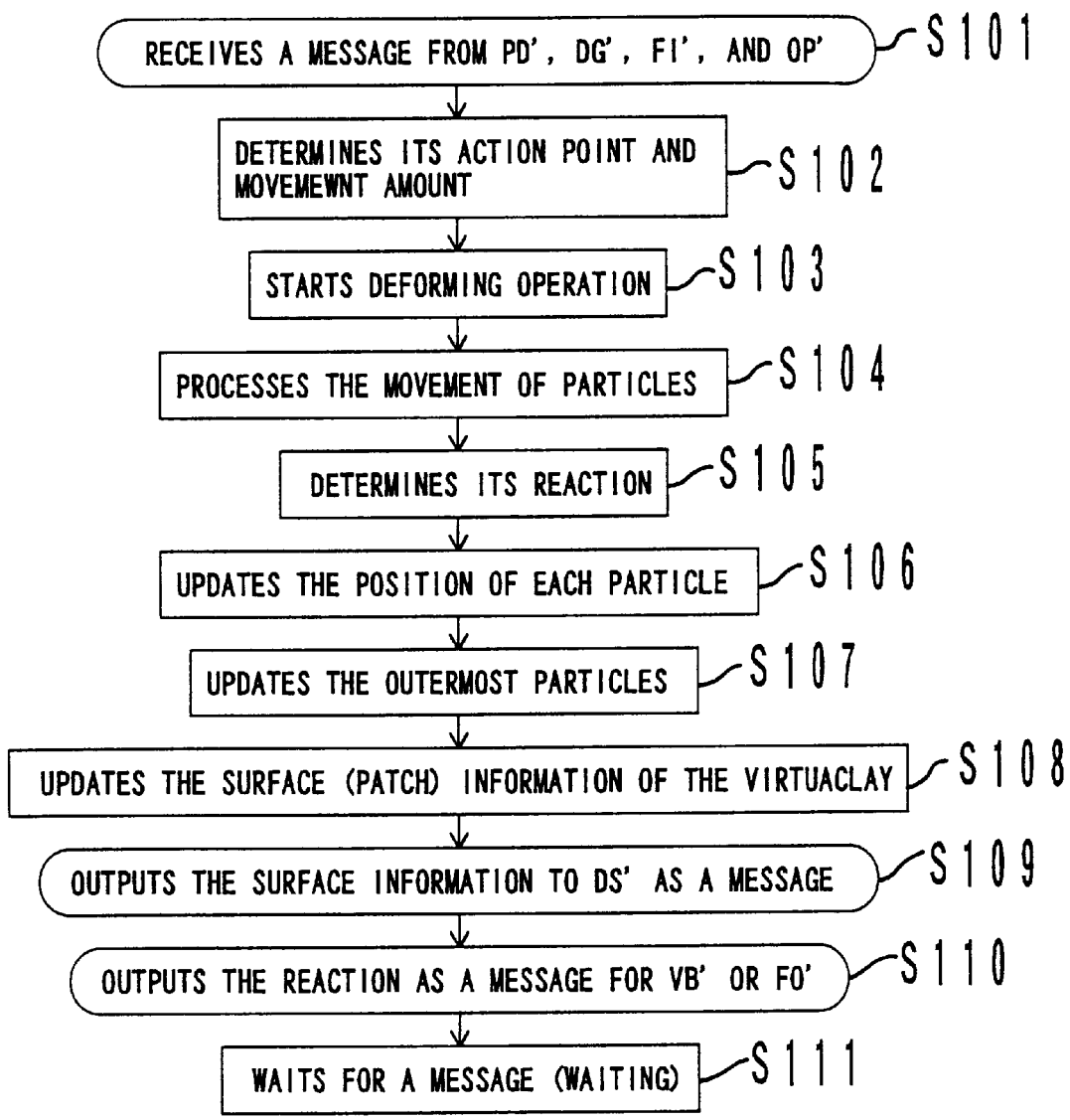
F I G. 3 1

VIRTUAL CLAY SYSTEM AND ITS METHOD OF SIMULATION

BACKGROUND OF THE INVENTION

1. Field of Invention

The present invention relates to a system and method for executing the simulation of a change in the shape of an object using a clay model in a virtual space (cybernetic space) realized by using a computer.

2. Description of the Related Art

To clarify the image of a product a designer often produces a model of it in the designing process of a product. After the designer produces various sizes/shapes of models ranging from a miniature model to a full-sized model for the product by trial and error, he or she decides on the final design of the product.

Since design is a key factor in judging the commercial value of a product, to decide on the most suitable design a great number of models are produced. However, since the model is made of real materials such as clay, wood, paper, etc., this process takes a considerable amount of time and labor. Therefore, the conventional production methods of a model have a problem that they have enormous cost.

The success in reducing the labor and time needed for the process of producing a model without deteriorating its quality leads to a reduction of the product cost. This also makes it possible to spare more sufficient time for other processes needed for the designing.

This applies to not only the design of a model using real materials but also the design and production of a virtual building or model in virtual reality created by a computer.

These days three-dimensional (3D) modeling software is also used in 3D computer-aided design (CAD) and 3D graphics. However, since this modeling software inherits two-dimensional (2D) draw system software, it is often strongly restricted by a 2D pointing device function when forming the shape of an object.

Design when using the cross section of a 3D object, the reproduction of the 3D object using translation or rotation copying, the surface formation and curved-plane operation of a 3D object by controlling a patch representing part of the curved plane, etc. are also performed.

Therefore, in the conventional modeling software a user is required to perform a complicated and inefficient operation, and it is difficult to shape an object, until the user completes a series of operation procedures. Accordingly, although the troublesome works of processing materials can be saved by using a 3D modeling software, it is necessary for the user to acquire the expertise for its operation, and nobody can use it without some difficulty. This is a problem of the conventional art.

SUMMARY OF THE INVENTION

It is an object of the present invention to provide a system and method for executing the efficient simulation of the shape of an object easily in cybernetic space realized by using a computer.

In the present invention the nature of materials, such as clay, in the cybernetic space is simulated using an aggregate (a set) of virtual particles. The shape of the aggregate of virtual particles can be freely changed by modifying the position of each particle.

In the first aspect of the present invention a virtual clay system is realized using a computer, and comprises an input unit, a deforming unit, a memory unit, a shape-generating unit and an output unit.

The memory unit stores particle aggregate data representing the aggregate of virtual particles and position data representing the position of each particle in the particle aggregate, and the shape-generating unit generates shape data representing the shape of the particle aggregate. The input unit inputs user's designation information on the particle aggregate, and the deforming unit dynamically changes the shape by changing the position of at least some of the particles in the aggregate according to the designation information. Then, the output unit outputs shape information based on its shape data.

In the second aspect of the present invention the virtual clay system is also realized using a computer, and comprises an input unit, a deforming unit, a memory unit and an output unit.

The memory unit stores particle aggregate data representing the aggregate of virtual particles and position data representing the position of each particle in the particle aggregate. The input unit inputs user's designation information on the particle aggregate, and the deforming unit dynamically changes the shape by changing the position of at least some of the particles in the aggregate according to the designation information. Then, the output unit outputs at least one of the tactile information of a virtual object represented by the particle aggregate and information on a force generated in the object.

BRIEF DESCRIPTION OF THE DRAWINGS

FIG. 14 shows a virtual clay model.

FIG. 17 is a drawing showing the output by the force input/output device.

FIG. 22 is a flowchart showing the process of the virtual clay system.

FIG. 23 is a flowchart showing the transmitting and receiving process of message.

FIG. 26 is a flowchart showing the operation of the force input/output device.

FIG. 27 is a flowchart showing the operation of an object PD'.

FIG. 30 is a flowchart showing of the operation of an object OP'.

FIG. 31 is a flowchart showing of the operation of an object VC'.

DESCRIPTION OF THE PREFERRED EMBODIMENT

Figure 1:
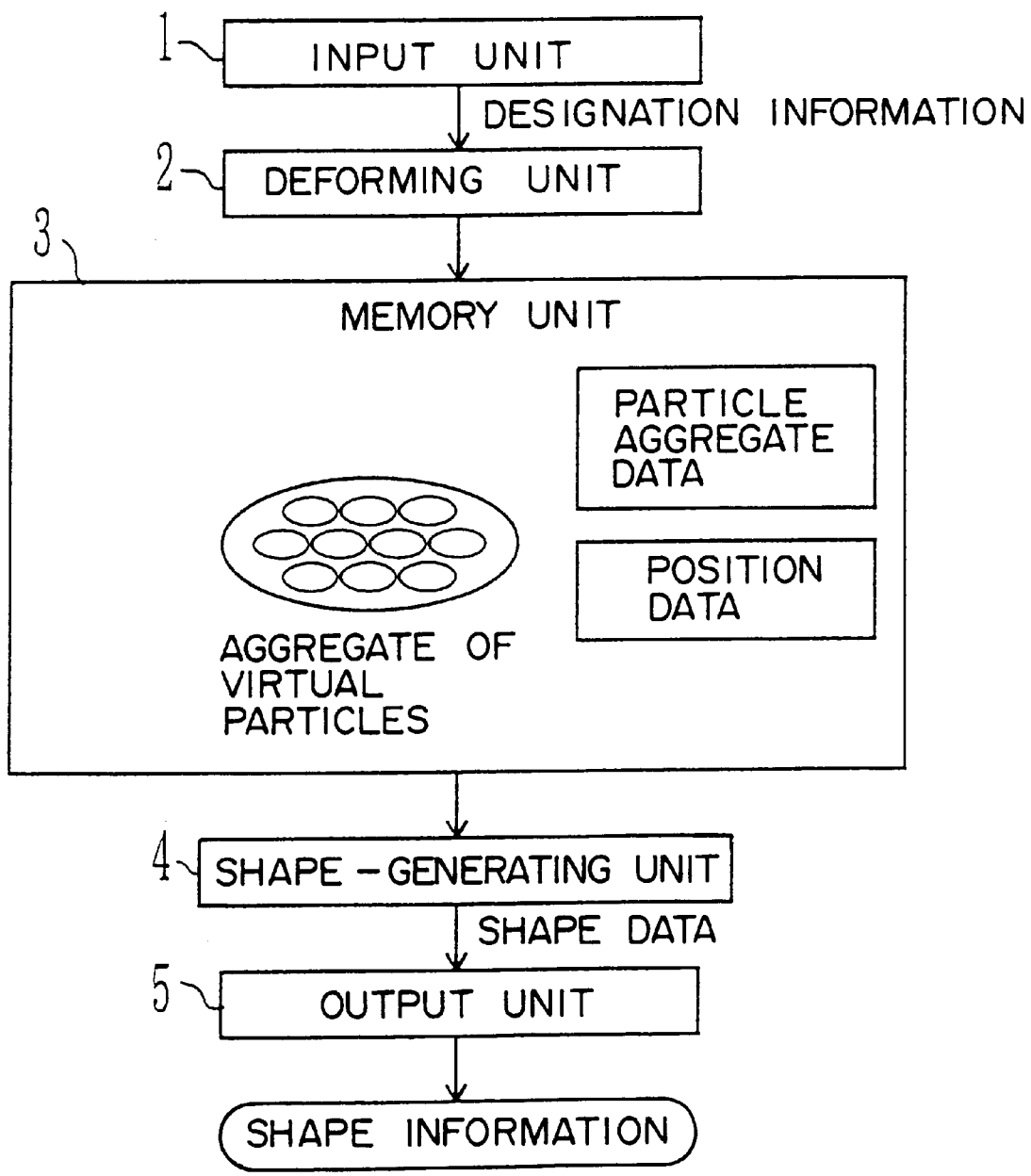
FIG. 1 is a drawing showing the principle of the virtual clay system of the present invention.

The details of the preferred embodiment of the present invention are described below referring to the drawings.

FIG. 1 is a drawing showing the principle of the virtual clay system of the present invention. The virtual clay system shown in FIG. 1 is realized by using a computer, and comprises an input unit 1, a deforming unit 2, a memory unit 3, a shape-generating unit 4 and an output unit 5.

The memory unit 3 stores particle aggregate data representing the aggregate of virtual particles and position data representing the position of each particle in the particle aggregate, and the shape-generating unit 4 generates shape data representing the shape of the particle aggregate. The input unit 1 inputs user's designation information on the particle aggregate, and the deforming unit 2 dynamically changes the shape by changing the position of at least some of the particles in the aggregate according to the designation information. Then, the output unit 5 outputs the shape information based on the shape data.

The shape of the virtual particle aggregate can be freely changed by changing the position of each particle, and the nature of materials such as clay can be simulated in the cybernetic space. In the memory unit 3 are stored the particle aggregate data representing the number of the particles contained in the particle aggregate, the identifier of each particle, etc. and the position data representing the position of each particle in the cybernetic space, and the shape-generating unit 4 generates the shape data of a virtual object being represented by the entire aggregate based on the position data of each particle.

The input unit 1, for example, inputs designation information on the deformation of the particle aggregate, and the deforming unit 2 determines the particle the position of which should be changed according to it and calculates its movement amount. Thus, the position data on some of or all the particles in the aggregate are changed, and the shape-generating unit 4 generates the shape data based on the updated position data. Then, the output unit 5 outputs the shape information on the object in a form of an image, etc. based on the generated shape data.

By using this virtual clay system, when designation information are consecutively input, the shape data at each control time are calculated and shape data corresponding to it are output. Therefore, the user can recognize the change of the virtual object in real time while inputting the designation information.

By representing information on not only the surface of the object but also its internal structure as an aggregate of particles, the deforming operation of the surface can be simulated by the movement of each particle. Thus, the deforming operation can be executed intuitively, as if the user were working clay with an internal structure, and the input of designation information can be simplified. By using an output device other than the display unit for the output unit 5, the tactile information on the virtual object and information on the force generated in the object can also be transmitted to the user.

For example, the input unit 1 shown in FIG. 1, the deforming unit 2, the shape-generating unit 4, the memory unit 3, and the output unit 5 correspond to an input unit 23, a central processing unit (CPU) 21 and memory 22, a memory 22, and an output unit 24, respectively, in FIG. 3 to be described later.

Although in the production of a conventional model real materials are used, the cost of the materials and the time needed to process the materials can be reduced if the model production is simulated by using a computer. If operability closer to the real world can be realized apart from the conventional operation by means of modeling software, the model generating time can be further reduced. For the technology needed to realize this, the following can be listed.

(1) Can simulate the physical and materialistic nature of an object in a virtual world realized by using a computer.
(2) Can simulate the operability of the real world in a virtual world on the computer.

The advantage in realizing this on a computer is the possibility of realizing an operation which is impossible in the real world.

Figure 2:
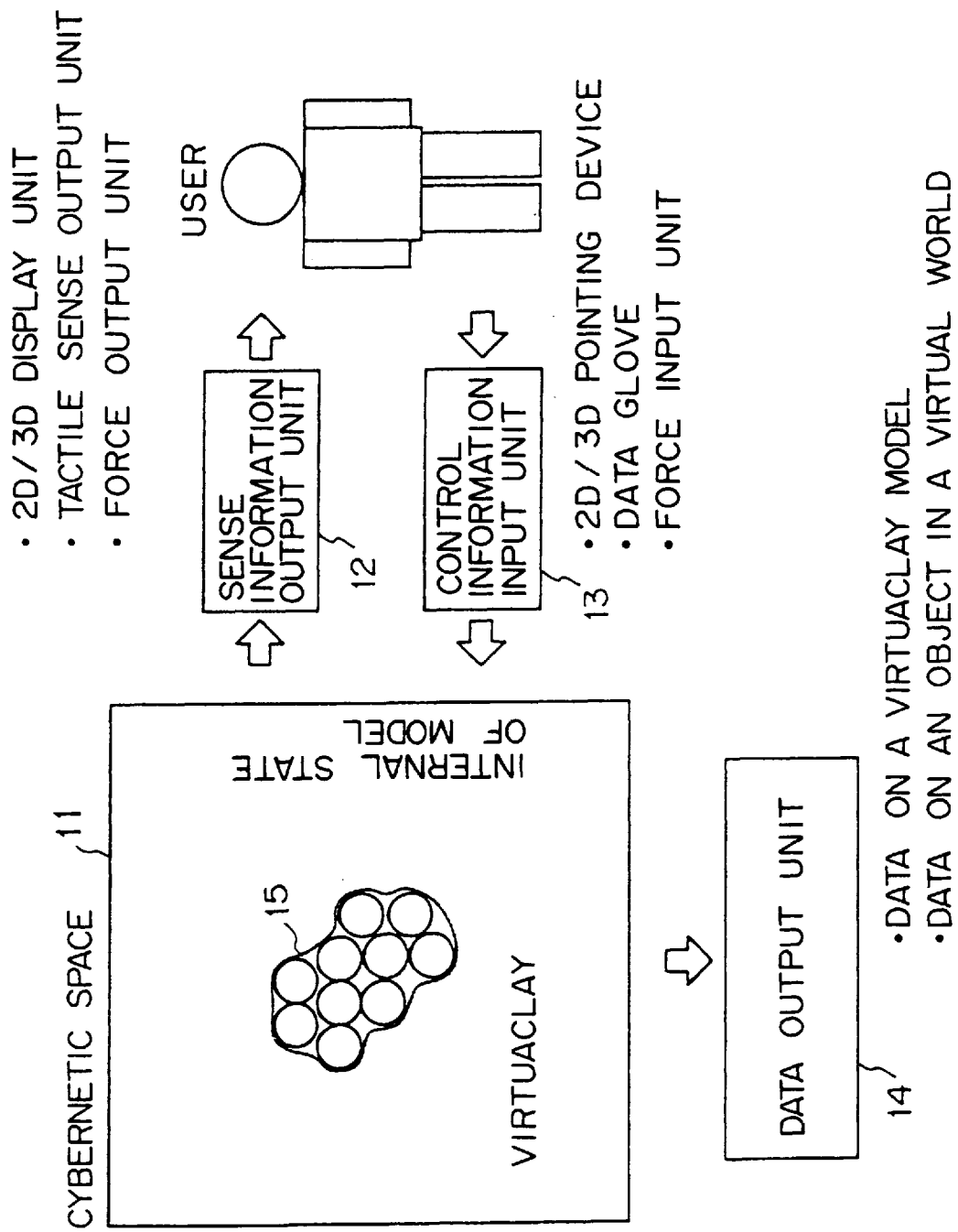
FIG. 2 is a drawing showing the virtual clay system.

In the present invention clay is selected as typical material which can be deformed easily and kept in a certain shape, and virtual clay (hereinafter called "virtual clay" or "Virtuaclay") is assumed as a material used in the computer simulation. The change of the shape of the Virtuaclay is simulated on the computer under the virtual laws of physics. FIG. 2 shows a Virtuaclay system for executing a simulation such as this.

In FIG. 2 the Virtuaclay 15 existing in a cybernetic space 11 in the computer consists of a great number of particles, and the model of the Virtuaclay 15 and its internal state are stored as data. The user inputs control information to the cybernetic space from a control information input unit 13, and receives sense information from a sense information output unit 12. The output unit 14 outputs the data on the Virtuaclay model and data on other objects if necessary.

An object means units of information in object-oriented programming, and has a set of data and a method, i.e., a procedure applicable to it. By executing the method defined in the object various kinds of data processing can be realized. The details of the object in the Virtuaclay system are described later.

The control information input unit 13 is an input device for inputting a designation for processing the Virtuaclay 15 in a virtual world, and for example, a 2D/3D pointing device, instrument glove or force input unit is used for it. The sense information output unit 12 is an output device for outputting the shape, etc. of the processed Virtuaclay 15, and, for example, a 2D/3D display unit, tactile sense output unit or force output unit is used.

The 2D pointing device is, for example, a mouse, and the 3D pointing device is, for example, a pointing device with operability including the movement and rotation in 3D. The instrument glove is a glove with a 3D position sensor for making possible various kinds of hand movements in a virtual world, and it is also called "Dataglove". Each sensor accurately detects the position and movement of fingers, and reflects it on the movement and deformation of the object in the virtual world.

The force input unit is, for example, an input device for inputting force while putting a finger tip in a gimbal of a glove finger shape, and it functions as a 3D position sensor for inputting the position of the finger tip. This force input unit is also provided with a force outputting function, and feeds back the counter force (resistance force) from the material to the finger tip in real time. Thus, the user can feel the hardness of the object, friction on its surface, etc. in a cybernetic space.

For a display other than the normal desk-top display unit, for example, a head mounted display for perceiving (artificial sense) a virtual world is used. For the tactile sense output unit, for example, a vibrator mounted on the instrument glove is used. By using these input/output devices the difference between the material processing operation in a virtual world and that in the real world is reduced.

There are various methods for simulating the physical and materialistic nature of the Virtuaclay. It is not necessary to accurately simulate its dynamic system, it is sufficient if the natural production environment of a model is simulated taking into consideration the fact that real-time interaction is required. This rule for controlling the environment shall be called "approximate physical law" or "quasi-physical law", and this can be realized by approximate calculations in the computer.

Although there are "tear off", "work (knead)", "attach", "pull", "pinch", "join", "mix", etc. as the deforming operations of clay, these operating functions can be realized under the quasi-physical law. To be concrete, the operating function designated by the control information input unit 13 can be realized by combining the simple basic dynamic elements in a virtual world 11. Then, the sense or force information accompanying these operations is output through the sense information output unit 12.

By using the Virtuaclay system in a computer in this way operations such as the reproduction, enlargement/reduction, movement of a model and the smoothing of a model surface, correction, change, parts-making, and reuse of a model can be easily executed. Particularly, although enlargement/reduction cannot be realized in a real model, it is possible in Virtuaclay. This is convenient when a small object in Virtuaclay having a rough shape is produced and its details are processed after it is enlarged.

Figure 3:
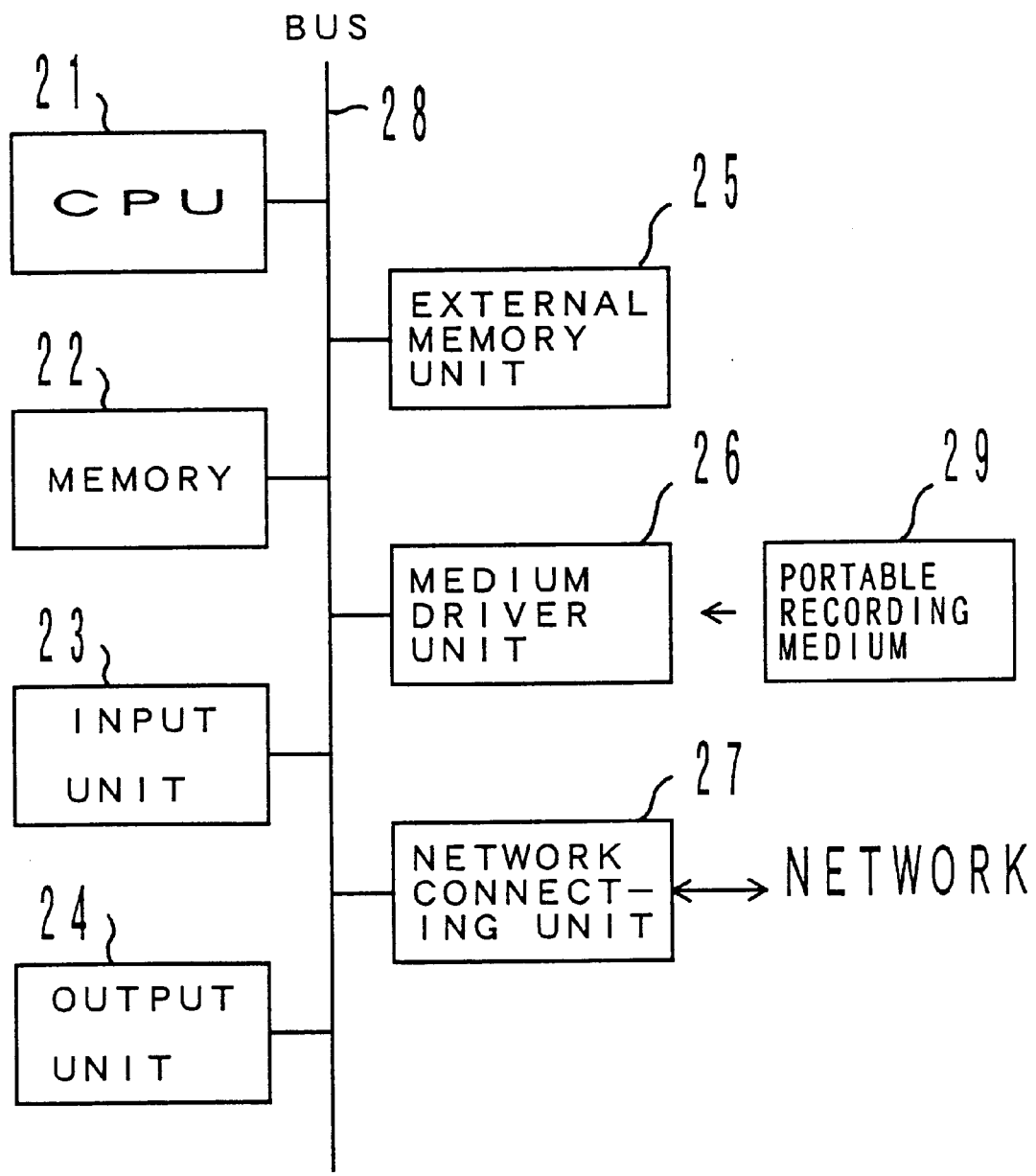
FIG. 3 is a block diagram of a data processing apparatus.

The Virtuaclay system of this embodiment, for example, can be realized by using a computer (data processing apparatus) as shown in FIG. 3. The data processing apparatus shown in FIG. 3 comprises a CPU 21, a memory 22, an input unit 23, an output unit 24, an external memory unit 25, a medium driver unit 26 and a network connection unit 27, and these units are connected with each other through a bus 28.

The CPU 21 executes the programs stored in the memory 22, and realizes the process of the Virtuaclay system. For the memory 22, for example, a read only memory (ROM), random access memory (RAM), etc. are used.

The input unit 23 corresponds to the control information input unit 13 shown in FIG. 2 or a keyboard, and is used to input a user's operating designation. The output unit 24 corresponds to the sense information output unit 21 shown in FIG. 2 or a printer, and is used to output information on a model in a virtual world, etc.

The external memory unit 25 is, for example, a magnetic disk, optical disk or magneto-optical disk, and can store programs and data. This can also be used as a database for storing data on the produced model.

The medium driver unit 26 drives a portable recording medium 29, and accesses its stored contents. For the portable recording medium 29 any kind of computer-readable recording medium such as a memory card, floppy disk, compact disk read only memory (CD-ROM), optical disk, magneto-optical disk, etc. can be used. In this portable recording medium 29, besides data, a program for executing the processes of the Virtuaclay system is also stored.

The network connection unit 27 is connected to any kind of communication network such as a local area network (LAN), etc. and performs data exchange accompanying communication. The data processing apparatus can obtain the necessary information from a network through the network connection unit 27.

Next, the technology related to the realization of the Virtuaclay is listed below.

(1) Forms the surface of an object using a 3D patch, and controls a control point interactively. The design method of using this algorithm is described in the following two documents.

H. J. Lamousin and W. N. Waggenspack, Jr., "NURBS-Based Free-Form Deformations", IEEE Computer Graphics and Applications, 11, pp.59–65 (1994).

H. Qin and D. Terzopoulos, "D-NURBS: A Physics-Based Framework for Geometric Design", IEEE Transactions on Visualization and Computer Graphics, Vol. 2, No. 1, pp.85–96 (1996).

(2) Assumes a solid model, the volume of which is defined, and controls its shape under the restriction of preserving the volume when deforming it. This technology is described in the following document.

A. Rappoport, A. Sheffer and M. Bercovier, "Volume-Preserving Free-Form Solids", IEEE Transactions on Visualization and Computer Graphics, Vol. 2, No. 1, pp.19–27 (1996).

(3) When displaying the structure of a macromolecule, calculates not only the combined structure but also the surface of the molecule, and represents the shape occupying the space. This technology is described in the following document.

A. Varshneym, F. P. Brooks, Jr. and W. V. Wright, "Computing Smooth Molecular surfaces", IEEE Computer Graphics and Applications, 9, pp.19–25 (1994).

(4) Simulates the action/reaction in the case where an elastic body is deformed with a human finger, etc. Represents the plasticity/elasticity of the object for the touch of the finger tip, detects the force from the finger tip, and realizes the interaction of the deformation through a device for converting them to data for simulation. This technology is described in the following document.

K. Hirota and M. Hirose, "Providing Force Feedback in Virtual Environments", IEEE Computer Graphics and Applications, 9, pp.22–39 (1995).

(5) Executes the parallel calculation of multi-object issues by means of message passing (transmission) between objects. This technology is described in the following document.

M. Yasugi and A. Yonezawa, "An Object-Oriented Concurrent Algorithm for N-Body Problem", Japan Software Academic Society, The 8th Conference Collection of Papers, pp.405–408 (1992).

(6) Defines the object and the physical law in a cybernetic space, and constructs a systematic software for executing the interference calculation between a finger and an object and between objects. This technology is described in the following document.

K. Hirota and R. Kijima, "Virtual Reality Software", Kyoritsu Publishing Co., Ltd., Prelude to Virtual Reality Science, Bit, August special issue, pp.132–142 (1994).

Although in this document an electronic clay system with a special interface in which a deformation plane and switch are used, is introduced, this is a simple system for simulating the change in shape of an object surface, and is essentially different from the Virtuaclay of the present invention which has a great number of particles in the inside.

The technology listed here is not technology indispensable to realize a Virtuaclay system, but it only shows that the Virtuaclay system is currently technically available by combining these technologies.

Next, the model into which the Virtuaclay technology of this embodiment is incorporated is described below. By uniting this Virtuaclay model and the related technologies described above, the Virtuaclay system can be realized.

Virtuaclay is defined as an aggregate (a set) of virtual particles of any shape, such as a small sphere, cube, etc., and the particle aggregate forms the rough shape of the Virtuaclay. Each particle is distinguished by means of identifying information such as a code, number, etc. and a film formed on the surface of the particle aggregate represents the shape of an object. The change in its shape is controlled by changing the position of each particle.

Each particle is provided with a functional neighborhood, and interaction is defined between particles, between neighborhoods of particles, and between a particle and external action (the finger movement of the user, etc.). For this interaction physical simulation based on an actual physical law may be applied or a proper quasi-physical law may be used in order to speed up the process.

Figure 4:
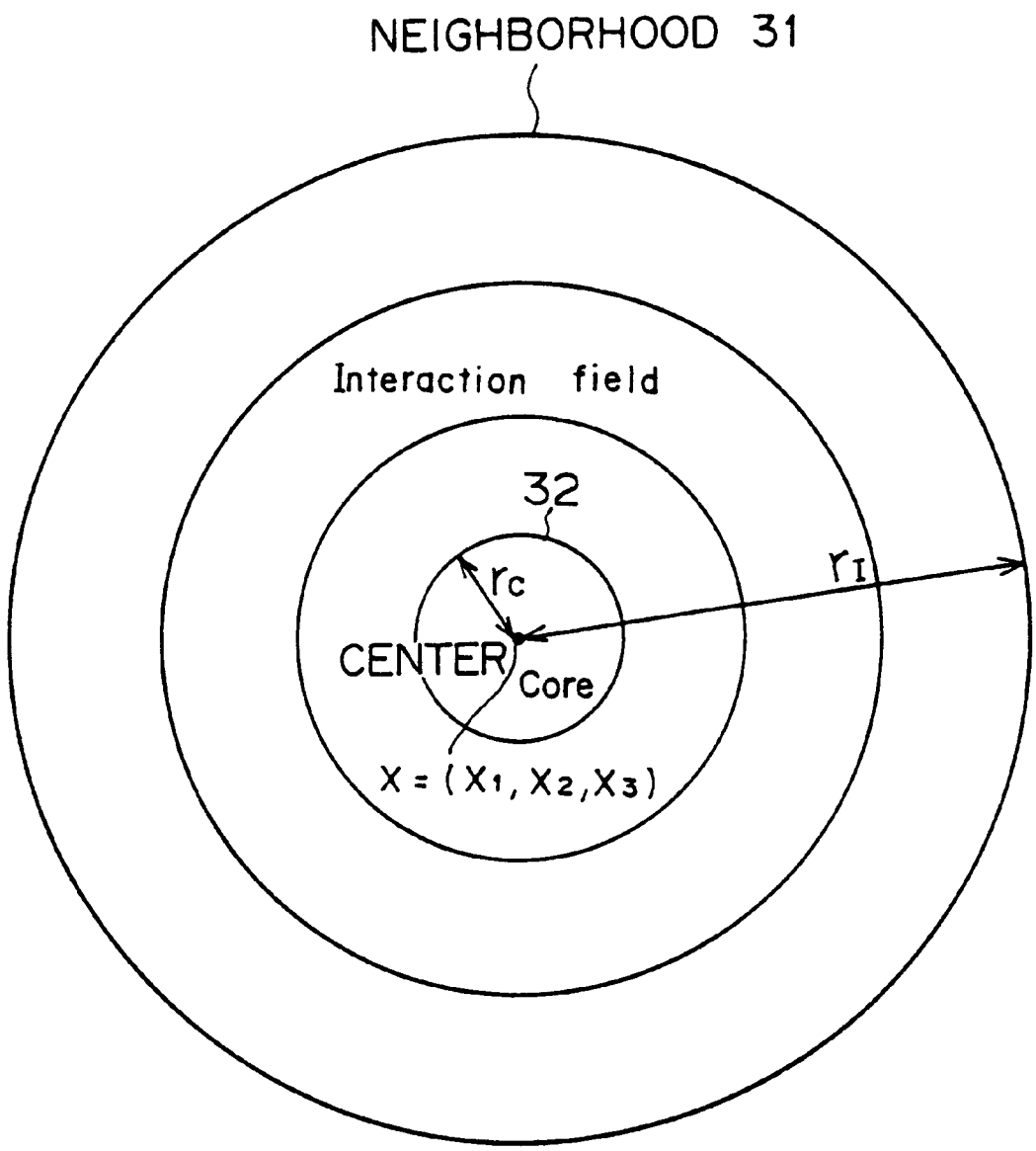
FIG. 4 shows the structure of a virtual particle.

FIG. 4 shows the structure of a spherical virtual particle composing the Virtuaclay. The particle shown in FIG. 4 has the coordinate $X=(x_1, x_2, x_3)$ at the center of Euclidean coordinate system as position information on space. It has a neighborhood structure 31 consisting of a plurality of layers.

For example, the innermost layer 32 is called the "core", and it spreads outward spherically with radius $r_c$ from the center X of the particle. Each particle cannot invade the core 32 of another particle. On the other hand, the outer layers are called "interaction fields", and they regulate the interaction with another particle by such as plasticity/elasticity and viscosity. The outermost out of these layers spreads outward spherically with a radius $r_I$ from the center X, which determines the size of the particle.

In this neighborhood structure 31 an inner layer has priority over an outer layer. Therefore, even the layer in which interaction such as plasticity/elasticity, etc. is defined cannot invade the core 32 of another particle.

The quasi-physical law assigned to the neighborhood 31 is decided for the interaction between particles or interaction between a particle and an external action depending on the other party of the interaction. The interaction between particles is defined with the positioning relation (distance) between particles as a medium parameter, and it regulates not only simple features such as attraction, repulsion, prohibition of invasion, etc. but also various kinds of other complicated features. Thus, Virtuaclay with a variety of material qualities can be produced.

For example, by using a particle alternately having an attraction layer and a repulsion layer, materials having a strange response can be produced. By using the feature of attracting/repulsing only, a specific particle in a state such as a fractal crystallization structure can also be created. By coloring it such an interesting visual effect as that of a glaze for chinaware can be obtained.

The effect due to this interaction can be confirmed by actual simulation. Accordingly, each user can design the neighborhood structure 31 freely and store the information in a library. The information in the library can be called up if necessary, and can be re-used.

Next, examples of the interaction between virtual particles is described below referring to FIGS. 5 to 9.

Figure 5:
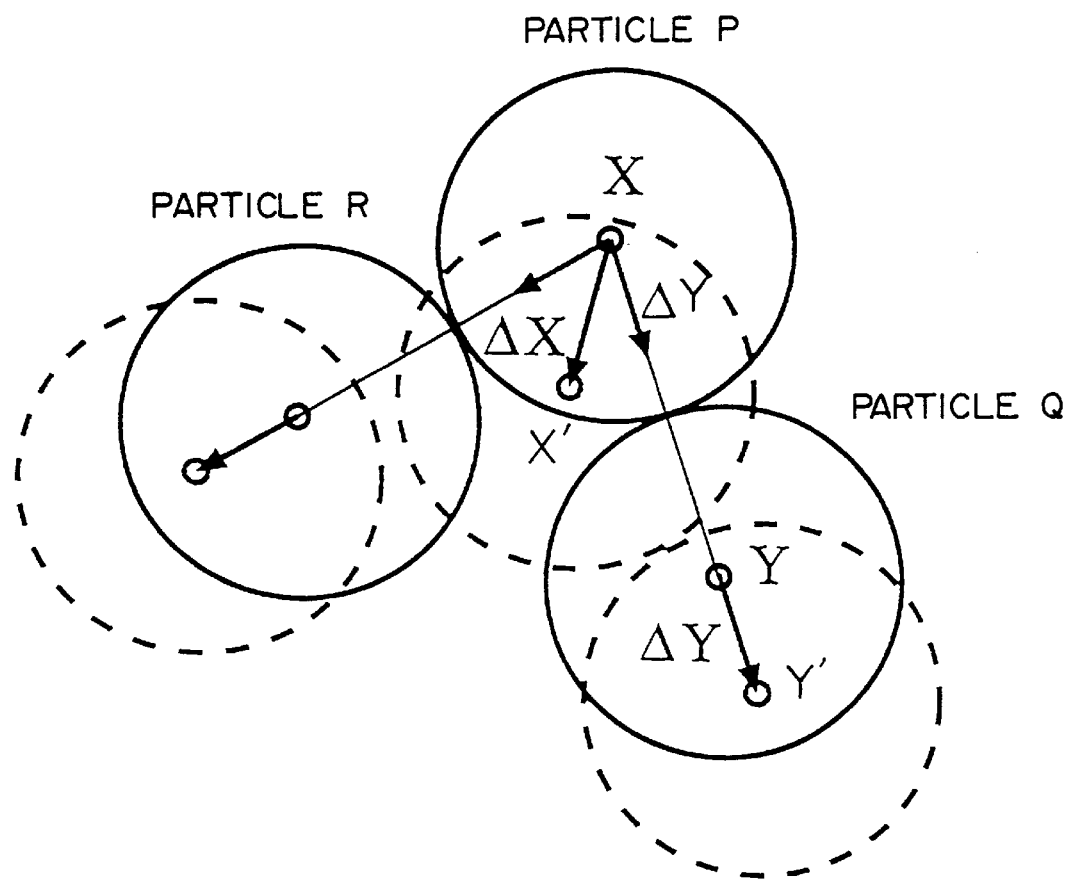
FIG. 5 shows the movement of a virtual particle.

FIG. 5 shows the propagation of the influence on neighboring particles by the displacing operation of a particle. In FIG. 5 it is assumed that the position of a particle P is $X=(x_1, x_2, x_3)$ and the displacing operation for the particle P is represented by vector $\Delta X=(\Delta x_1, \Delta x_2, \Delta x_3)$. The position X' of the particle P after movement due to this position modifying operation is calculated using an expression $X'=X+\Delta X$. By displacing the particle P a particle Q touching the particle P is displaced as follows.

First, it is assumed that the position of the particle Q is $Y=(y_1, y_2, y_3)$. When the vector obtained by projecting a vector $\Delta X$ perpendicularly to a straight line XY connecting X and Y is assumed to be $\Delta Y=Proj (\Delta X, XY)$, this $\Delta Y$ is the vector for the displacing operation of the particle Q. Therefore, the position Y' of the particle Q after the movement accompanying the movement of the particle P becomes $Y'=Y+\Delta Y=Y+Proj (\Delta X, XY)$. The similar calculation is executed for a particle R.

Figure 6:
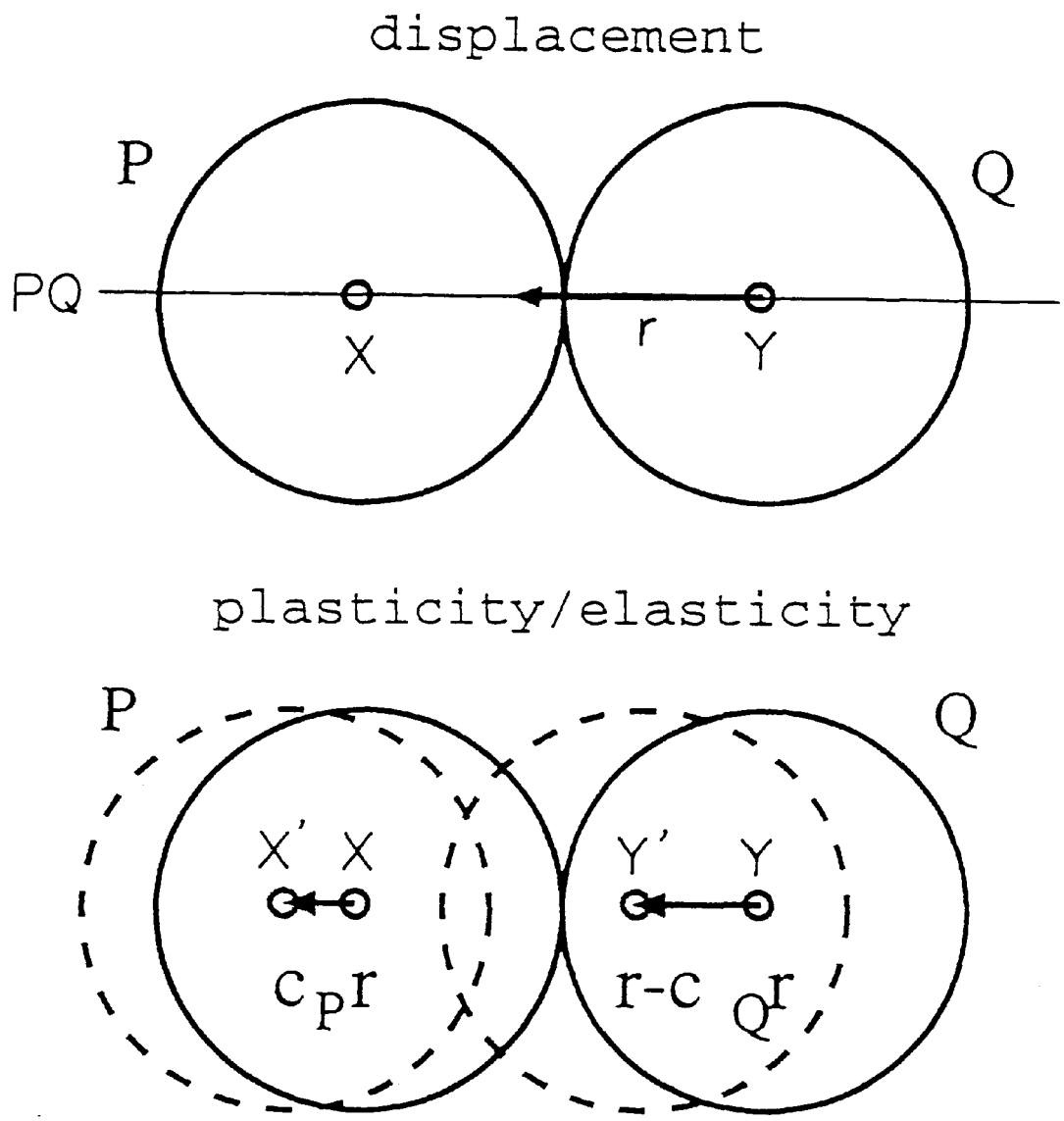
FIG. 6 shows the plasticity/elasticity against the moving operation.

FIG. 6 shows the effect of a neighborhood imitating the plasticity/elasticity against the displacing operation of a particle. The rule for imitating the plasticity/elasticity between particles is realized by the feature of the interaction fields described above. It is assumed here that the interaction fields of two particles P and Q are not overlapped. Although the interaction fields of the two particles allow each other to invade each other's interaction fields, that do not allow each particle to invade the innermost part, i.e., the other particle's core. At this time, the following rule is assigned assuming that the particle invaded by the displacing operation and the invading particle are P and Q, respectively.

When the field of the particle Q invades the field of the particle P by r towards Q→P assuming that the straight line connecting the centers X and Y of the two particles P and Q is PQ, the particle P is displaced by $c_p$ r towards Q→P assuming that $c_q$ is an appropriate constant ($0<c_p<1$). The particle Q is pushed back by $c_q$ r towards P→Q assuming that co is an appropriate constant ($0<c_Q<1$), and its movement amount towards Q→P becomes r $-C_Q$ r. As a result, the center X of the particle P moves to the position X', and the center Y of the particle Q moves to the position Y'. Typically, the plasticity/elasticity between particles is imitated by a rule such as this.

Figure 7:
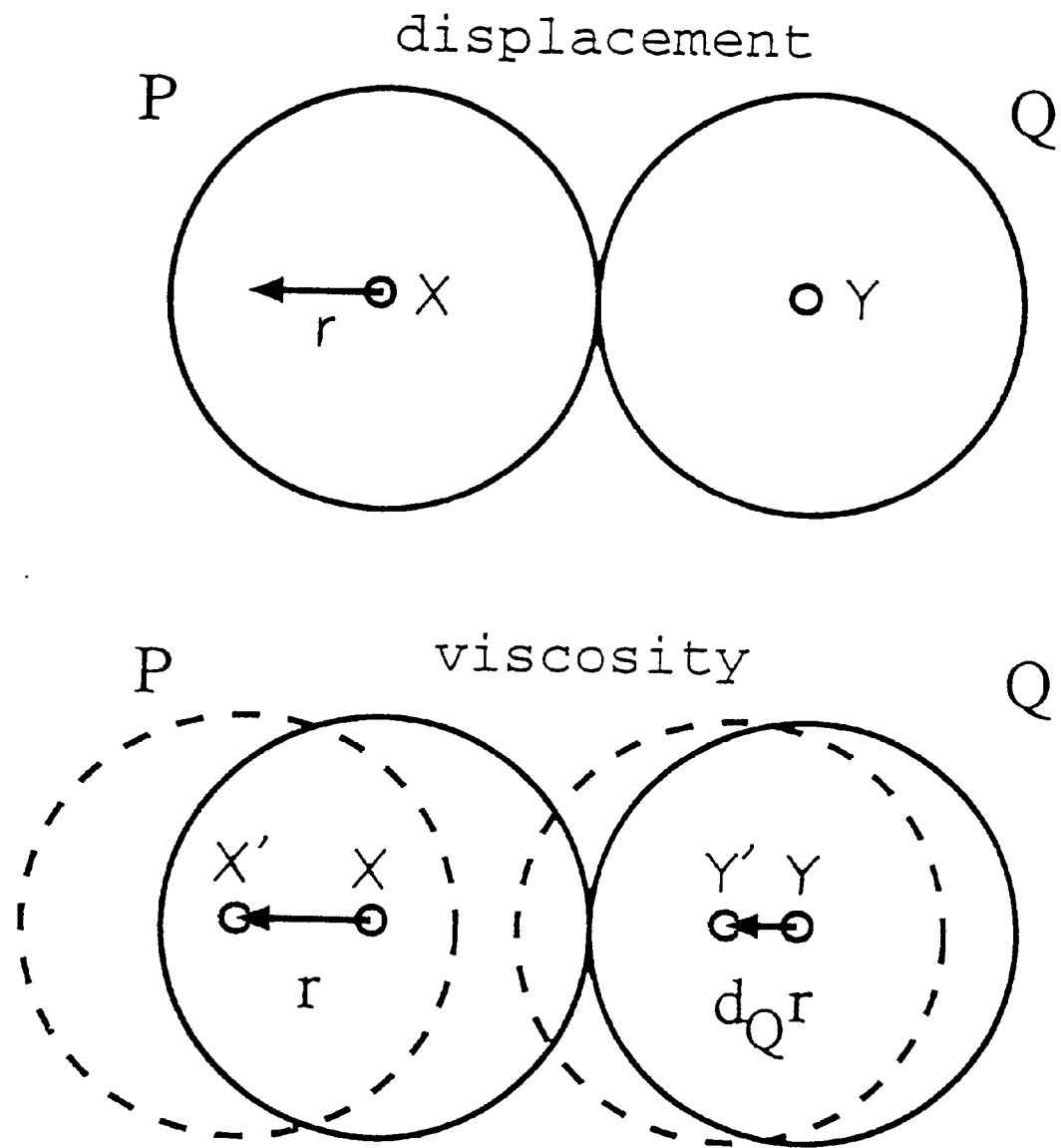
FIG. 7 is a drawing showing the viscosity against the moving operation.

FIG. 7 shows the effect of a neighborhood imitating the viscosity of a particle against a displacing operation. The rule for imitating the viscosity between particles is also realized by the feature of interaction fields. It is assumed here that the interaction fields of two particles P and Q are overlapped. When the particle P moves by r towards Q→P, the particle Q moves by $d_{qr}$ towards Q→P assuming that $d_Q$ is an appropriate constant ($0<d_Q<1$). As a result, the center X of the particle P moves to the position X', and the center Y of the particle Q moves to the position Y'. The viscosity between the particles is imitated by a rule such as this.

Besides the displacing operation shown in FIG. 5, the operation of separating touching particles is also available. In this case, although the same calculation as that of the deformation due to the movement described above is executed, the direction of movement vector becomes the reverse. If the displacing operation shown in FIG. 5 is called the pushing-in of a particle, this displacing operation can be called the tearing-off of a particle.

Figure 8:
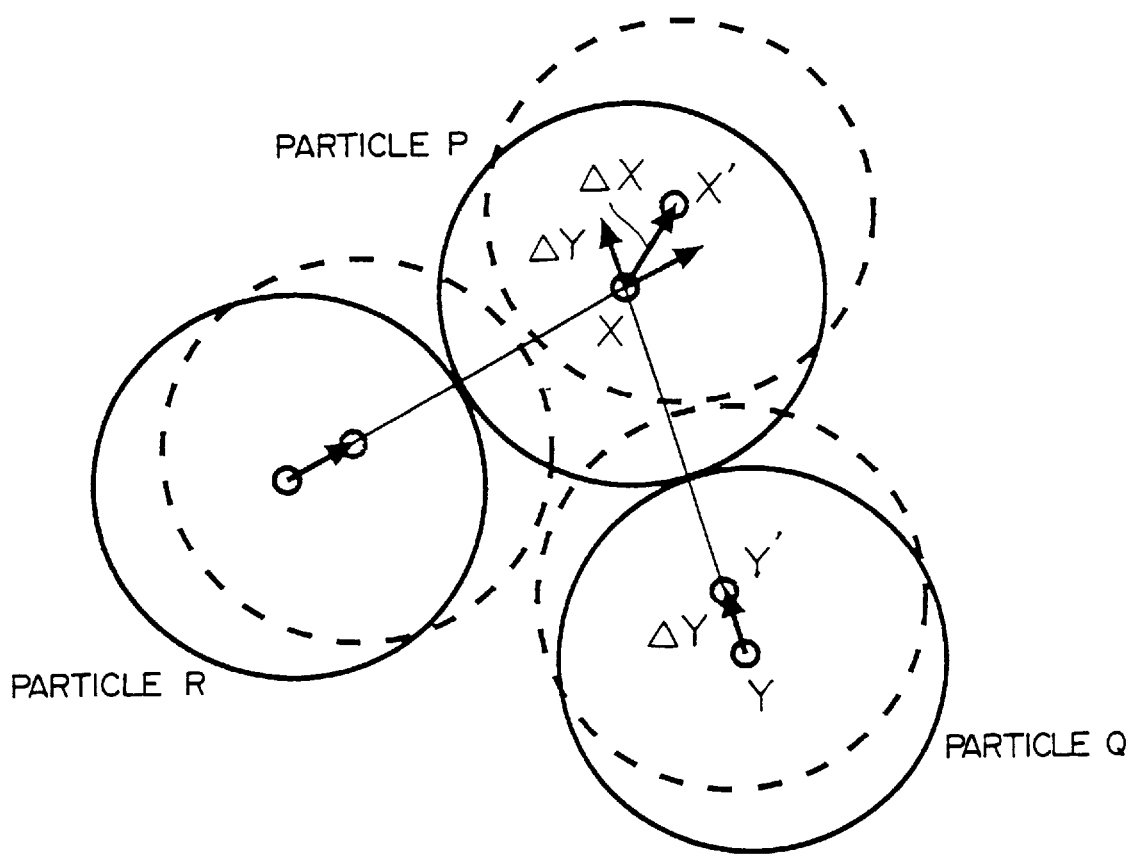
FIG. 8 shows the movement due to the tearing-off of a particle.

FIG. 8 shows the propagation of the influence on the neighboring particle by the tearing-off of a particle. In FIG. 8 it is assumed that the position of the particle P and the displacing operation against the particle P are represented by X and a vector $\Delta X$, respectively. At this time the position X' of the particle P after the movement is given by an expression of $X'=X+\Delta X$. When the particle P moves, the particle Q touching the particle P moves as follows.

It is assumed that the position of the particle Q is Y and the vector obtained by projecting a vector $\Delta X$ perpendicularly to the straight line connecting X and Y is Proj ($\Delta X$, XY). At this time it is also assumed that the transmission efficiency of the movement amount due to tearing-off and the movement vector $\Delta Y$ of the particle Q are $c_T$ and $\Delta Y=c_T$ Proj ($\Delta x$, XY), respectively. Then, the position Y' of the particle Q after the movement due to the movement of the particle P becomes $Y'=Y+\Delta Y=Y+c_T$ Proj ($\Delta X$, XY). The similar calculation is executed for a particle R.

Figure 9:
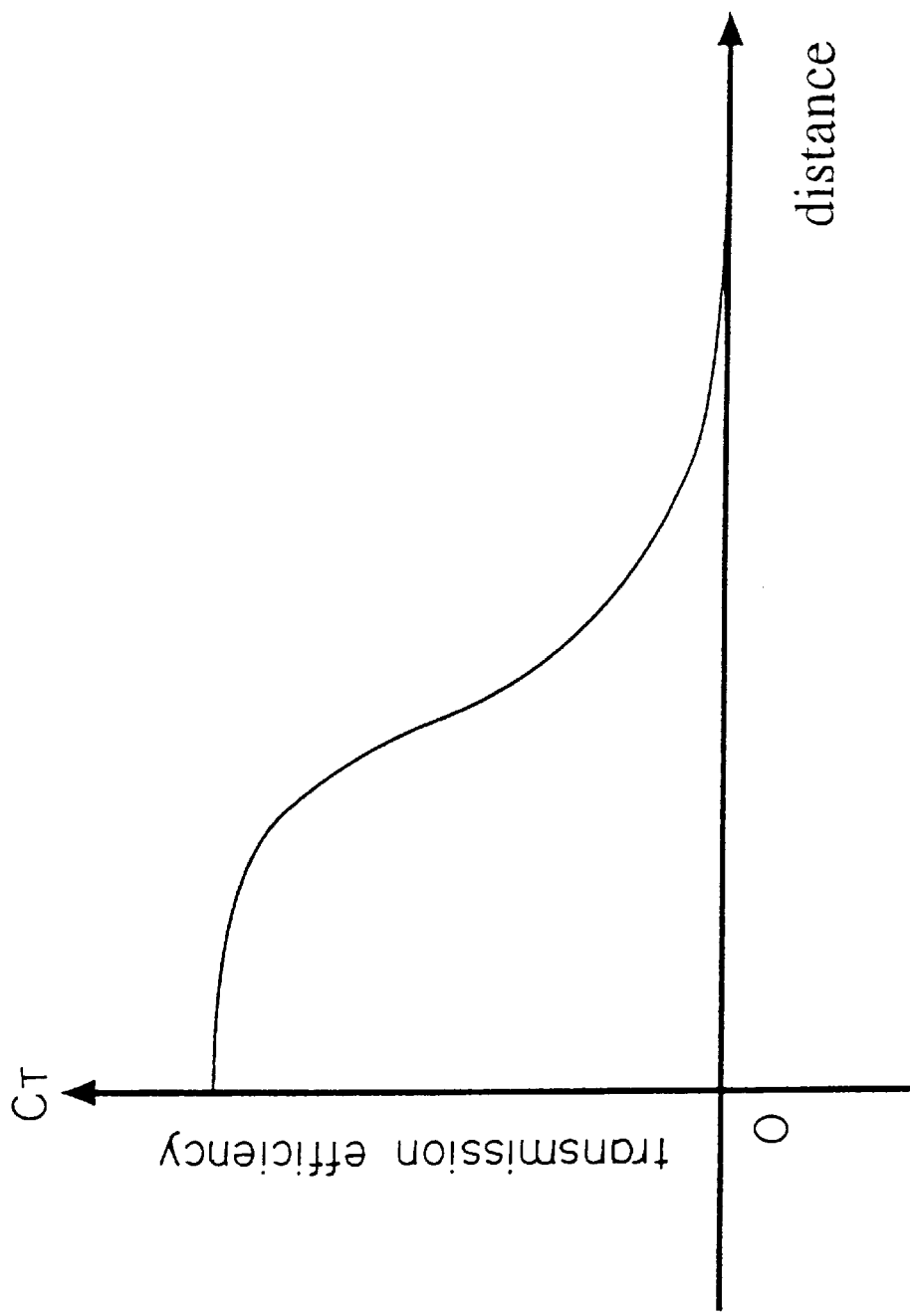
FIG. 9 is a drawing showing the transmission efficiency of the movement amount.

The transmission efficiency $c_T$ of the movement amount is set, as shown in FIG. 9, so as suddenly to become small as a particle moves away from the particle displaced first. Therefore, the particle further away than a certain distance does not suffer any influence from the tearing-off. This transmission efficiency such as this can be realized by a rule for imitating viscosity. By using this rule for tearing-off, the operation of separating several particles from the original aggregate and the deformation of the Virtuaclay due to it can be realized.

For the operation on the aggregate of virtual particles composing Virtuaclay the following are included. First, for the deforming operation with a continuous film on the surface, there are the operation for not opening a hole in the film and the operation for opening a hole in the film.

For the operation for not opening a hole in the film, for example, deformation due to the movement of an arbitrary particle and deformation for displacing particles while fixing the positions of some particles are included. In the latter case, a partial aggregate which is not affected by the deforming operation can be set in the particle aggregate. The deformation due to the movement in units of the partial aggregate in the particle aggregate is also available. In the case of the operation for opening a hole in the film, the outermost position of the particle aggregate is locally re-calculated around the hole to be formed.

The deformation due to an affine transforming operation in which its shape is not modified, is also one of the deforming operations with the continuous film on the surface. In this operation a translating operation, rotating operation, enlarging/reducing operation, etc. are included. The affine transformation is, for example, assigned by the designation on the operation panel displayed on the screen or the gesture by a hand filted into a data glove.

Further, while a threshold value is set for the input of the designating deformation within the normal operation range in advance, affine transformation can also be executed if the input is less than the threshold value. Furthermore, affine transformation may be executed in units of the partial aggregate as described above.

Next, the operation of working (kneading) means an operation of making the arrangement of the particles in the space uniform, and includes the operation of increasing and decreasing the number of particles, modifying the neighborhood structure of particles and replacing the identification codes of particles. For example, by working Virtuaclay with two different colors of particles, the distribution of its color can be made uniform.

By using a virtual tool, a particle aggregate can also be processed. For example, a virtual marker, a virtual smoother and a mechanical fan are used to designate the area or boundary of particle aggregates, to modify/put in good order the surface shape of a particle aggregate and to modify the surface shape of a particle aggregate using wind pressure. These tools used for surface finish are called "finishers". To be more concrete it means to filter the position data of a particle, and they execute the process of smoothing the aggregate.

Furthermore, by changing the parameter value of a quasi-physical law applied to each particle, the characteristics of the Virtuaclay can be modified. For example, by changing the parameter representing the strength of the combination between particles by means of a thermal change of a particle aggregate, phenomena such as solidification, fusion, evaporation, etc. can be simulated. In this case, a hot air dryer can also be defined as a virtual tool for heating the Virtuaclay. The joining and dividing operations of a particle aggregate are made as follows. When two particle aggregates are joined, there are two cases of where particles belonging to each aggregate are covered with the same film as shown in FIG. 10 and where they are covered with different films as shown in FIG. 11.

Figure 10:
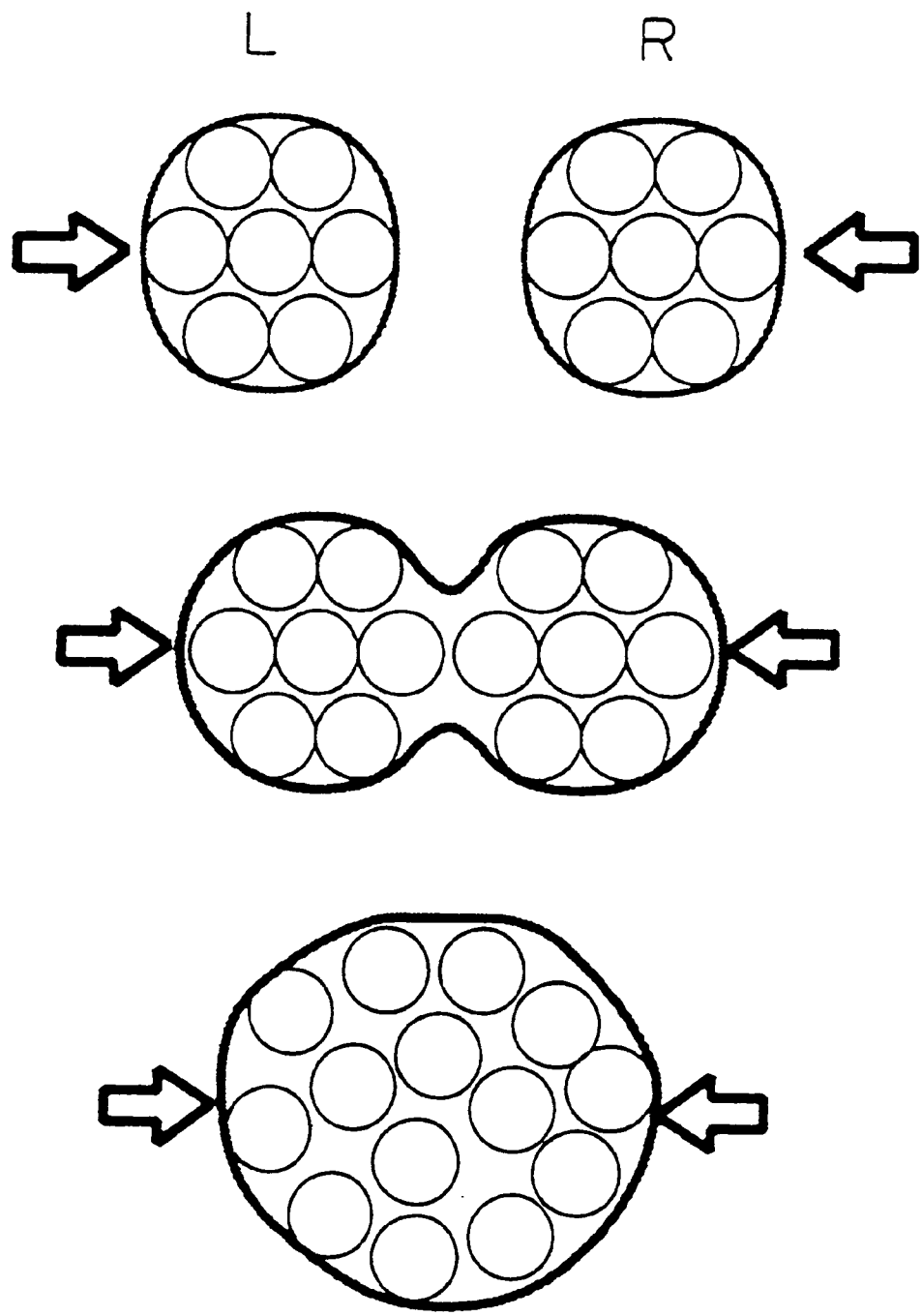
FIG. 10 shows the first joining operation.
Figure 11:
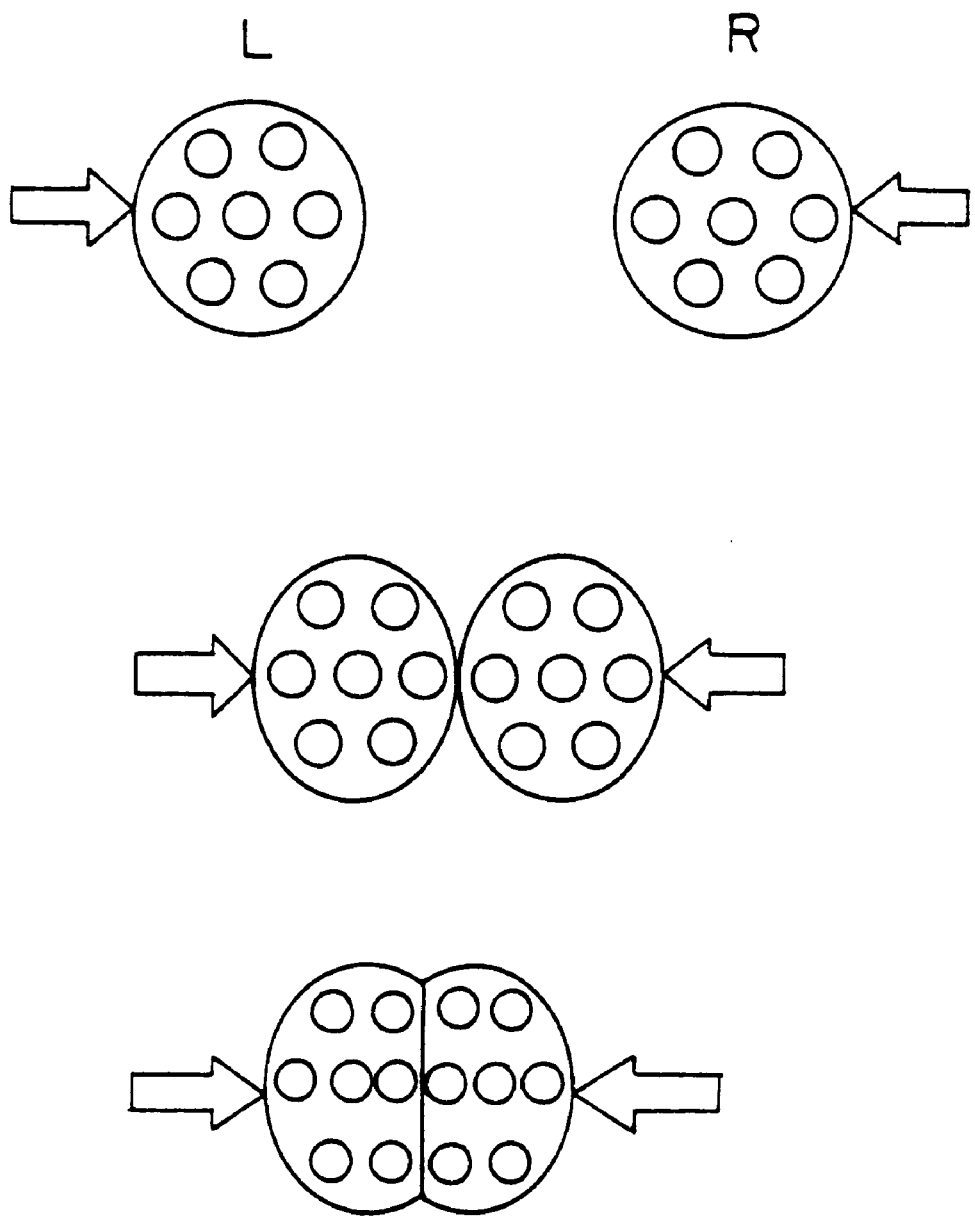
FIG. 11 shows the second joining operation.

In the joining operation shown in FIG. 10, when particle aggregates L and R are combined, the particles belonging to these aggregates are mixed with each other. On the other hand, in the joining operation shown in FIG. 11, they just touch each other and are not mixed. In each case, the particle aggregate after the combination becomes a basic unit in the subsequent deforming operation.

Figure 12:
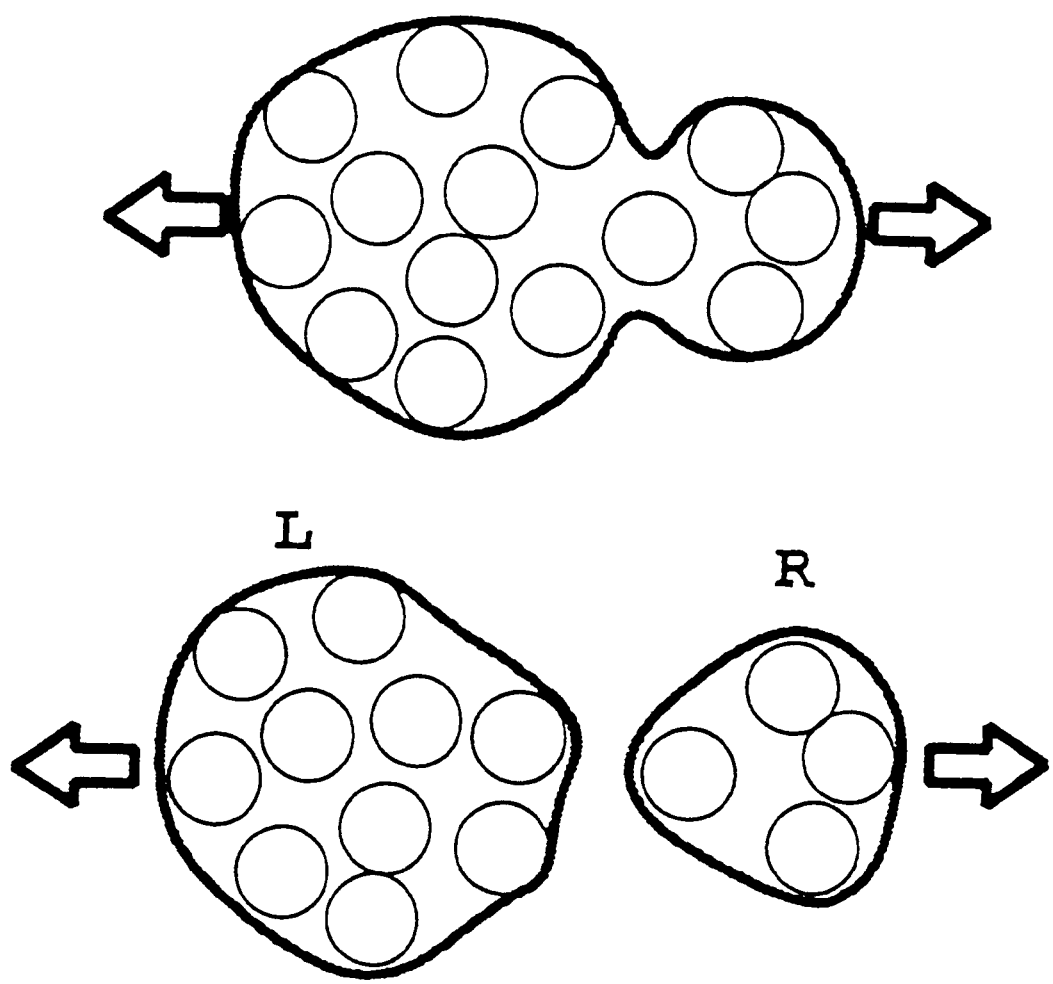
FIG. 12 shows the dividing operation.

On the other hand, when a particle aggregate is divided, an original aggregate is divided into two or more partial aggregates, which are covered with different films so that the partial aggregates may not touch each other, as shown in FIG. 12. In this operation, first the position for dividing is designated on the outermost particle of the original aggregate, an appropriate rule is determined and its boundary for separation is set. Then, the particles on the boundary are assigned to partial aggregates and new outermost particles are determined for each partial particle aggregate.

By executing various kinds of operations for a virtual particle aggregate in this way, the appearance of the Virtuaclay is changed. It is a film that decides the appearance of the Virtuaclay, and a film generation is defined as one action on a particle aggregate. Although the shape of a film is decided by the position of the outermost particles of the particle aggregate, anything can be adopted as a patch representing the surface. Each particle in the particle aggregate has identification information on whether or not it is the outermost particle.

For the calculation of the outermost particle and the patch on the film surface a linear programming can be used, for example. A simplex method known as an typical analysis method of linear programming issues is the method of obtaining the best solution by seeking the peak positioned on the boundary of allowable areas in a space representing its solution. The details of the calculation method of the outermost particle based on the simplex method are described in the document "Computing Smooth Molecular Surfaces" mentioned above, the algorithm of which is described later.

When a virtual particle aggregate has a complicated shape, it is not necessary to calculate the outermost particles from the complicated space arrangement of particles at one time. Accordingly, the final shape of the complicated Virtuaclay is gradually generated. Taking into consideration the fact that the shape is changed by local deformation, the calculation becomes simple by updating the outermost particles locally every time of applying such deformation.

The calculation of the reaction against the deformation of a virtual particle aggregate can also be defined. For amount applicable to the imitation of the reaction, there are the average movement vector of a particle, the virtual weight (mass) of the particle, the movement vector of the outermost particle which becomes an action point, a neighborhood interaction parameter in the reaction calculation, etc.

For the calculation method necessary to imitate the reaction there is, for example, the method of making a table of reactions against the basic operation, storing it in a memory and referring to it when the relevant operation is executed. In this case, reactions such as sounding, changing color, outputting response (counter force), etc. are set in advance.

Reactions can also be calculated from average movement vector, virtual work load, virtual mass, etc. Reactions can also be calculated from the loss movement vector due to its neighborhood plasticity/elasticity and viscosity.

Next, the detailed configuration of the Virtuaclay system of this embodiment is described below referring to FIGS. 13 to 21.

Figure 13:
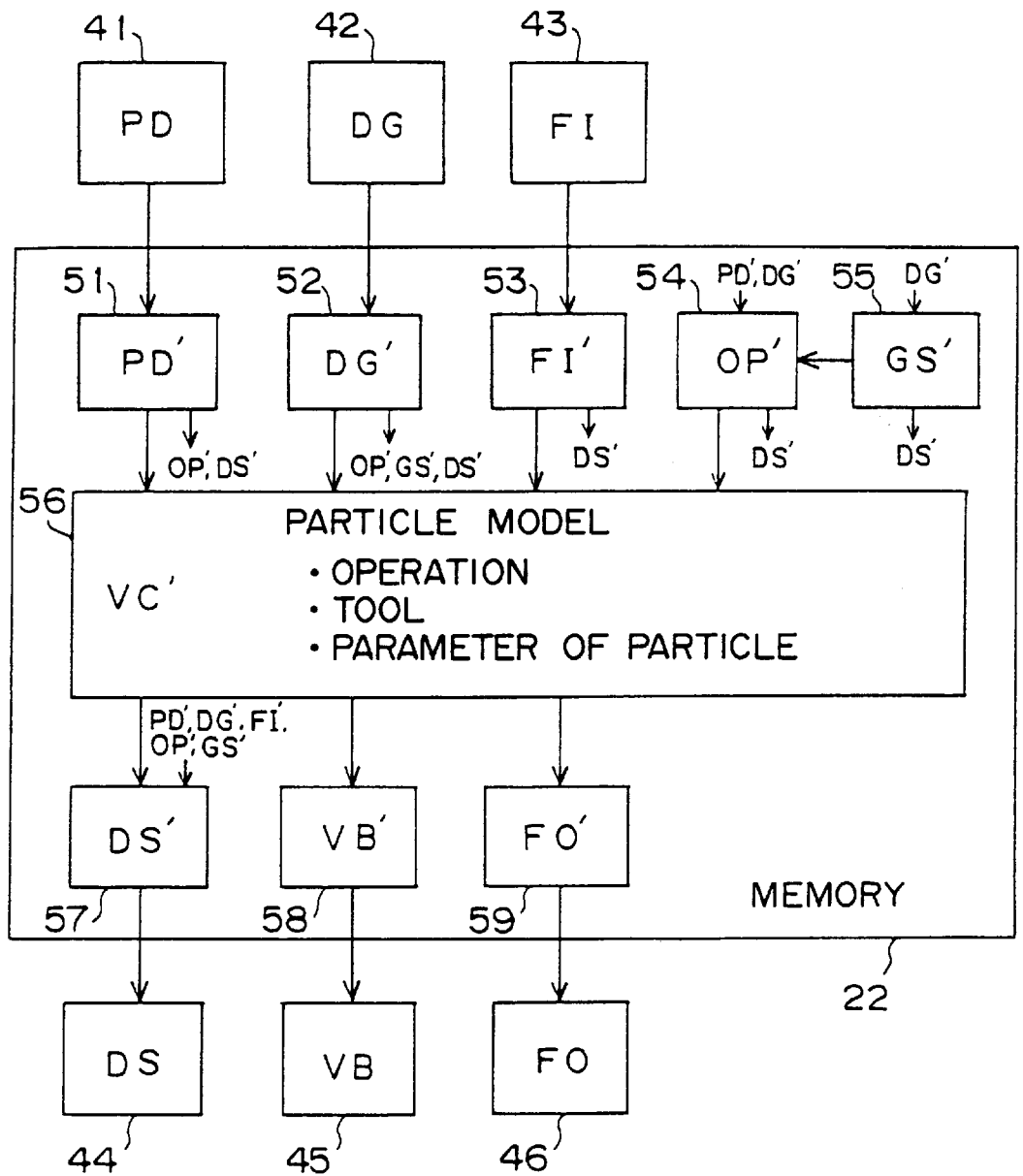
FIG. 13 is a block diagram of the virtual clay system.

FIG. 13 is a block diagram of the Virtuaclay system. The system shown in FIG. 13 is realized by using a data processing apparatus shown in FIG. 3, wherein an input unit 23 comprises a 2D/3D pointing device (PD) 41, a data glove (DG) 42 and a force input unit(FI) 43. An output unit 24 comprises a 2D/3D display (DS) 44, a vibrator (VB) 45 and a force output unit (FO) 46.

In the memory 22, data for a model (PD') 51 of the 2D/3D pointing device, a model (DG') 52 of the data glove, a model (FI') 53 of the force input unit, a model (OP') 54 of an operation panel, a model (GS') 55 of a gesture system, a model (VC') 56 of Virtuaclay, a model (DS') 57 of the 2D/3D display, a model (VB') 58 of the vibrator and a model (FO') 59 of the force output unit are also generated.

PD'51 conveys the information input from PD41 to OP'54, DS'57 and VC'56, DG'52 conveys the information input from DG42 to OP'54, GS'55, DS'57 and VC'56, and FI'53 conveys the information input from FI43 to DS'57 and VC'56, respectively. OP'54 conveys the information received from PD'51, DG'52 and GS'55 to DS'57 and VC'56, and GS'55 conveys the information received from DG'52 to OP'54 and DS'57, respectively.

VC'56 includes a particle model and has the definitions of the operation, tool, and parameters of a particle as its data and procedures. For the operation, the procedures for the creating of a particle (create), the discarding of a particle (discard), deforming (deformation), fixing (fix), unfixing (unfix), grouping (group), ungrouping (ungroup), translating (translate), rotating (rotate), the modifying of the scale (scale) and the generating of the film (surface generation), etc. are defined.

The creation and discard of a particle represent the operation of creating a new particle and discarding an existing particle, respectively. The deformation represents the operation of deforming a particle aggregate, and usually is accompanied by the movement of each particle. The fixing and unfixing represent the designating operation of an unmoved particle and the cancelling operation of the designation, respectively.

The grouping and ungrouping represent the operation of joining two or more particle aggregates into one aggregate and dividing one particle aggregate into two or more aggregates, respectively. The translation, rotation and the modification of the scale represent the affine transformation operation of a particle aggregate, and the generation of the film represents the operation of generating a film on the surface of a particle aggregate.

For tools, the procedures for a marker for designating the boundary of particle aggregates in grouping and ungrouping, a finisher for putting its outward form in good order, etc. are defined. For parameters of a particle, the radius $r_c$ of a core, radius $r_f$ of an interaction field, a plasticity/elasticity constant, a viscosity constant, etc. are defined.

VC'56 executes the corresponding procedures according to the information received from PD'51, DG'52, FI'53 and OP'54, and conveys the information on its result to OP'54, DS'57, VB'58 and FO'59.

DS'57 make DS44 display an image according to the information received from PD'51, DG'52, FI'53, OP'54, GS'55 and VC'56, VB'58 vibrates VB45 according to the information received from VC'56, and FO'59 make the FO46 output force according to the information received from VC'56.

In VC'56, for example, the particle aggregate $P(t_s)$ of the Virtuaclay shown in FIG. 14 is described as follows.

$$P(t_s) = \{ \ldots, p_i(t_s), i_{i+1}(t_s), \ldots \} \quad (1)$$

where $p_i(t_s)$ is the three-dimensional space coordinate representing the center position of the i-th ($i = 1, 2, 3, \ldots$) particle at a sampling time $t_s$, and it can be described as follows.

$$p_i(t_s) = [x_i(t_s), y_i(t_s), z_i(t_s)]^T \quad (2)$$

Usually since the position of a particle changes only when any operation is executed, the time when some operation input is made is adopted as $t_s$. The film representing the outward form of $P(t_s)$ is described as Surface ($P(t_s)$).

In the same way another particle aggregate $Q(t_s)$ is described as follows:

$$Q(t_s) = \{ \ldots, q_i(t_s), \ldots \} \quad (3)$$

and its film is described as Surface ($Q(t_s)$). A position coordinate and vector is assumed to represent the three-dimensional amount below, unless especially defined.

Figure 15:
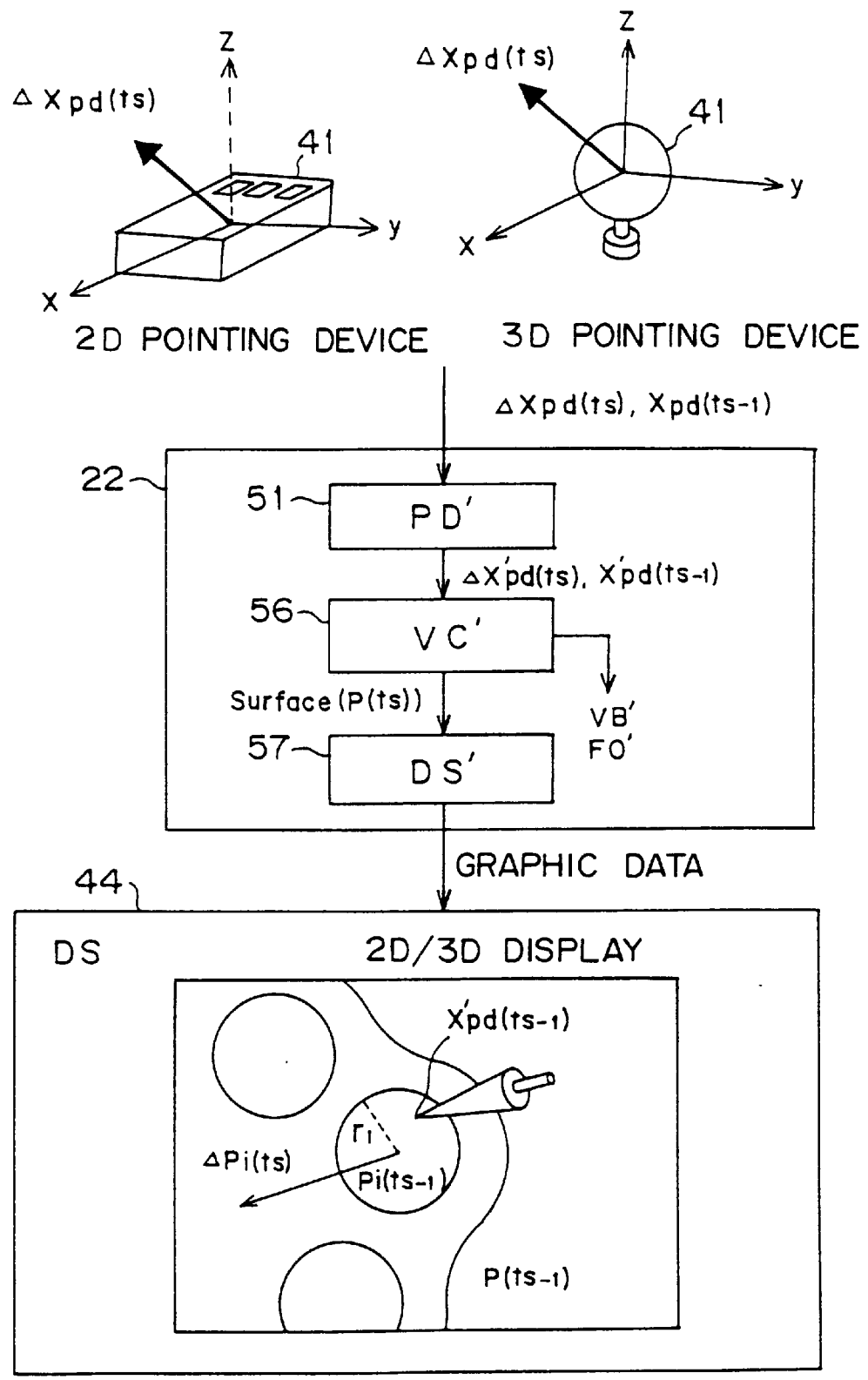
FIG. 15 shows pointing devices and a display.

FIG. 15 shows examples of PD41 and the screen of DS44. For example, the case where a user operates a 2D or 3D PD41, and inputs information on a displacement vector $\Delta x_{pd}(t_s)$ and the position $x_{pd}(t_{s-1})$ of an action point in the displacing operation is used. In this case, when PD41 is a 2D mouse, the displacement in the direction of z axis is designated by the number of clicks or a click interval.

When vector $\Delta x_{pd}(t_s)$ at each operation time $t_s$ is input, PD'51 converts it into a displacement vector $\Delta x'_{pd}(t_s)$ in the virtual world of a model by the following expression:

$$\Delta x'_{pd}(t_s) = \text{Gain} (\Delta x'_{pd}(t_s)) + \text{Offset} \quad (4)$$

where Gain and Offset are an appropriate function and a constant, respectively. The function type of Gain is decided by experiment. It also converts $x_{pd}(t_{s-1})$ into a coordinate $x'_{pd}(t_{s-1})$ of the virtual world in a similar way to (4) above.

Then, VC'56 executes a deforming operation based on $\Delta x'_{pd}(t_s)$ and $x'_{pd}(t_{s-1})$, and deforms the particle aggregate $P(t_s)$. At this moment the following calculation is executed as an input procedure of PD'51:

$$\Delta p_i(t_s) = \Delta x'_{pd}(t_s), \quad (5)$$

$$\forall i, |x'_{pd}(t_{s-1}) - p_i(t_{s-1})| < r_f,$$

$$p_i(t_{s-1}) \in P(t_{s-1})$$

where $\Delta p_i(t_s)$ and $p_i(t_{s-1})$ represent the movement vector of each particle and the position of each particle in the particle aggregate $P(t_{s-1})$ at a time $t_{s-1}$ before movement, respectively. Therefore, only the particles whose $x'_{pd}(t_{s-1})$ is in the interaction field are affected by the action of vector $\Delta x'_{pd}(t_s)$ and are moved. The positions of the other particles are not changed.

Then, VC'56 makes the entire particle aggregate $P(t_{s-1})$ reflect the influence of the movement vector $\Delta p_i(t_s)$ of the particle moved first, and creates a particle aggregate $P(t_s)$ after the operation. Then, it executes its film generating operation, generates a Surface ($P(t_s)$) and outputs the information.

DS'57 generates graphic data according to the information of the Surface ($P(t_s)$) and displays it on the screen of DS44. Although FIG. 15 shows the shape of a particle aggregate $P(t_{s-1})$ at a time $t_{s-1}$, the shape of a particle aggregate $P(t_s)$ is also displayed in the same way.

Figure 16:
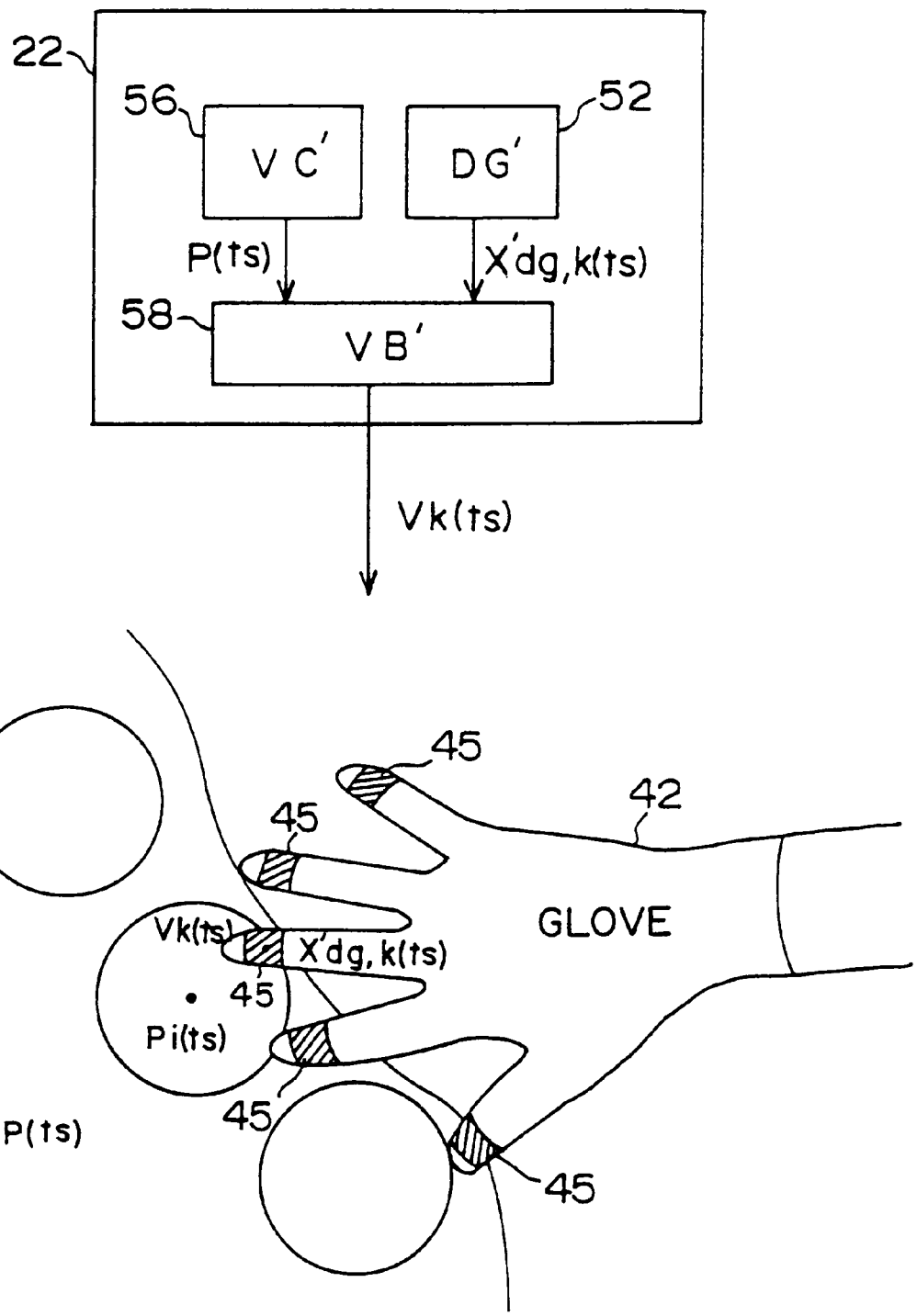
FIG. 16 shows a vibrator.

Next, FIG. 16 shows an example of VB45 mounted on DG42. VB'58 receives the information on a particle aggregate $P(t_s)$ from VC'56, and receives the coordinate information $x'_{dg,k}(t_s)$ in the position of k-th VB45 in the model world from DG'52, where k=1,2,3,4,5,6,7,8,9, 10, k=1,2,3, 4,5 correspond to a VB45 mounted on each finger of a left hand, and k=6,7,8,9,10 correspond to VB45 mounted on each finger of a right hand. Then, according to that information, a function $V_k(t_s)$ representing vibration data is calculated as follows:

$$V_k(t_s) = V_k \left( \sum_i |p_i(t_s) - x'_{dg,k}(t_s)| \right), \quad (6)$$

$$\forall i, |p_i(t_s) - x'_{dg,k}(t_s)| < r_f,$$

$$p_i(t_s) \in P(t_s)$$

where $|p_i(t_s) - x'_{dg,k}(t_s)|$ and $\Sigma_i$ represent the distance between $p_i(t_s)$ and $x'_{dg,k}(t_s)$, and the total sum of all particles, respectively. Therefore, $V_k(t_s)$ is defined as a function with the total sum of the distances between virtual positions of each particle and VB45 as a parameter, and its function type is decided by experiment. Only for the VB45 in which the $x'_{dg,k}(t_s)$ is in the interaction field of any particle, is $V_k(t_s)$ calculated, and for the other VB45s, $V_k(t_s)$ is set to 0.

The vibration data $V_k(t_s)$ calculated in this way is output to each VB45, which vibrates accordingly. Using this VB'58 only the VB45 which touches a particle which is moved accompanying a deforming operation in a virtual world vibrates, and the feeling of touching Virtuaclay can be expressed.

Next, FIG. 17 shows an example of the force input/output unit joining FI43 and FO46. FO'59 receives information on a particle aggregate $P(t_s)$ from VC'56 and receives the k-th coordinate information $x'_{f,k}(t_s)$ in the model world from FI'53. $x'_{f,k}(t_s)$ represents the position of the gimbal 48 of the force input/output unit 47, k=1,2,3,4,5 correspond to each finger of the left hand, and k=6,7,8,9,10 correspond to each finger of the right hand. According to this information a function $F_k(t_s)$ representing force data is calculated as follows:

$$F_k(t_s) = F_k \left( \sum_i |p_i(t_s) - x'_{f,k}(t_s)| \right), \quad (7)$$

$$\forall i, |p_i(t_s) - x'_{f,k}(t_s)| < r_f,$$

$$p_i(t_s) \in P(t_s)$$

where $F_k(t_s)$ is a function with the total sum of the distances between virtual positions of each particle and the gimbal 48, and its function type is decided by experiment. Only for the gimbal 48 in which $x'_{f,k}(t_s)$ is in the interaction field of any particle, is $F_k(t_s)$ calculated, and for the other gimbals 48, $F_k(t_s)$ is set to 0.

The force data $F_k(t_s)$ calculated in this way is output to the gimbal 48 and force is given to each finger tip. Using this FO'59 counter force is returned to only the finger tip which touches a particle moved accompanying a deforming operation in the virtual world, and the feeling of the force from Virtuaclay can be expressed.

Figure 18:
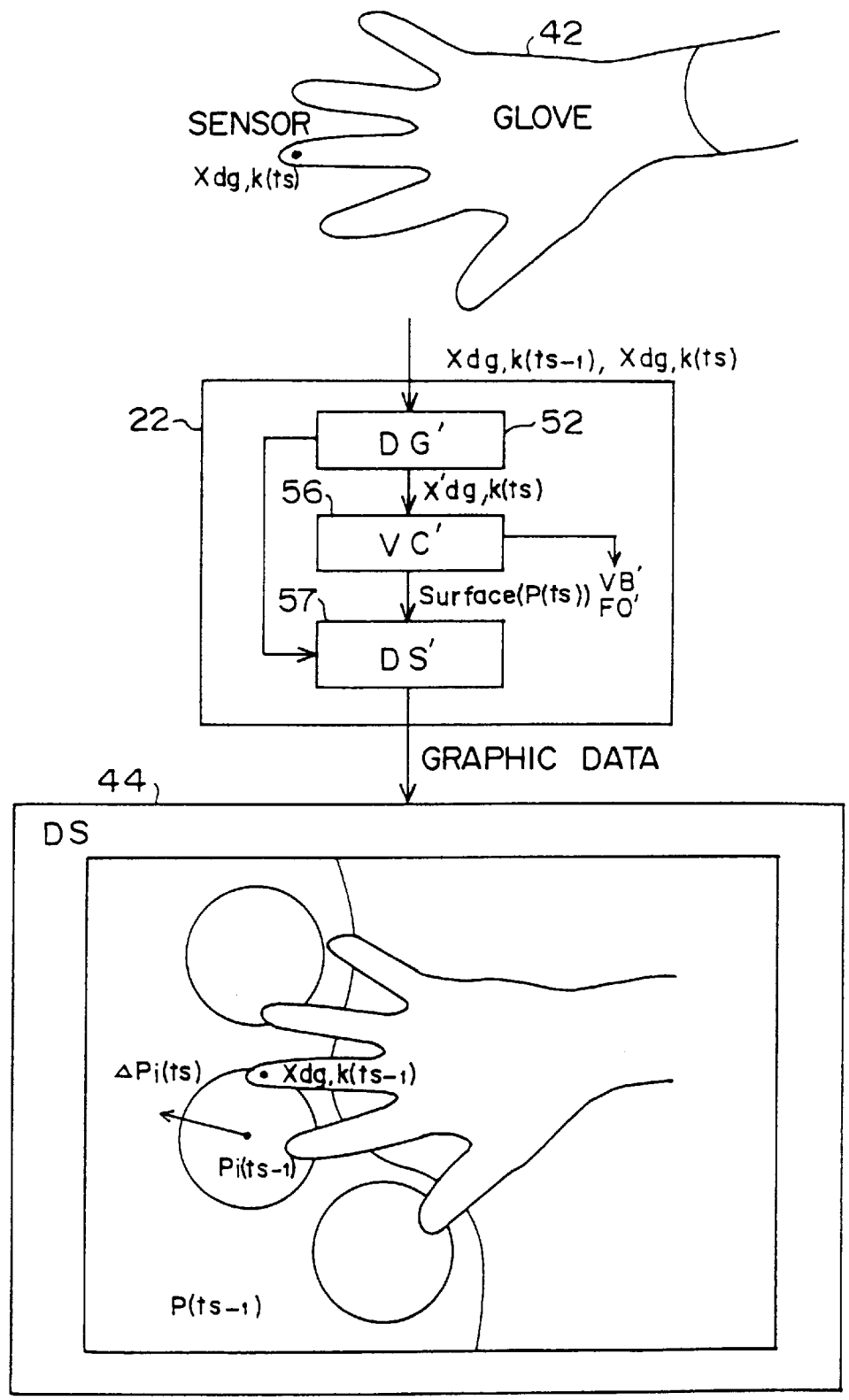
FIG. 18 shows a data glove.

Next, FIG. 18 shows an example of DG42. A great number of position sensors are built into DG42 and the position coordinate of the k-th sensor is described as $x_{dg,k}(t_s)$. In this case the upper limit of the value of k is decided depending on the number of sensors. When DG'52 receives information on $x_{dg,k}(t_s)$ at each operation time, from DG42, in the same way as the expression (4) DG'52 converts it into the coordinate information $x'_{dg,k}(t_s)$ in the model world and passes it to VC'56 and DS'57.

Then, the VC'56 executes the deforming operation based on $x'_{dg,k}(t_{s-1})$ and $x'_{dg,k}(t_s)$, and deforms a particle aggregate $P(t_s)$. At this time the following calculation is executed for the input procedures of the DG'52.

$$\Delta p_i(t_s) = x'_{dg,k}(t_s) - x'_{dg,k}(t_{s-1}), \qquad (8)$$

$$\forall i, |x'_{dg}(t_s) - p_i(t_{s-1})| < r_I,$$

$$p_i(t_{s-1}) \in P(t_{s-1})$$

where only the particles in which $x'_{dg}(t_s)$ is in the interaction field move according to a movement vector $\Delta p_i(t_s)$ and the positions of the other particles do not change. Vector $\Delta p_i(t_s)$ is given as the difference between $x'_{dg,k}(t_s)$ and $x'_{dg,k}(t_{s-1})$.

Then, VC'56 makes the entire particle aggregate $P(t_{s-1})$ reflect the influence of the movement vector $\Delta p_i(t_s)$ of the particle moved first according to the predetermined deformation algorithm, and generates a particle aggregate $P(t_s)$ after operation. Then, it executes the film creating operation, generates a Surface $(P(t_s))$ and outputs the information.

DS'57 generates the graphic data of the Virtuaclay and a hand according to the information on the Surface $(P(t_s))$ and $x'_{dg,k}(t_s)$ and displays it on the screen of DS44. Although FIG. 18 shows the shape of the particle aggregate $P(t_{s-1})$ and hand at a time $t_{s-1}$, the shape of the particle aggregate $P(t_s)$ and hand at a time $t_s$ is also displayed in the same way.

Figure 19:
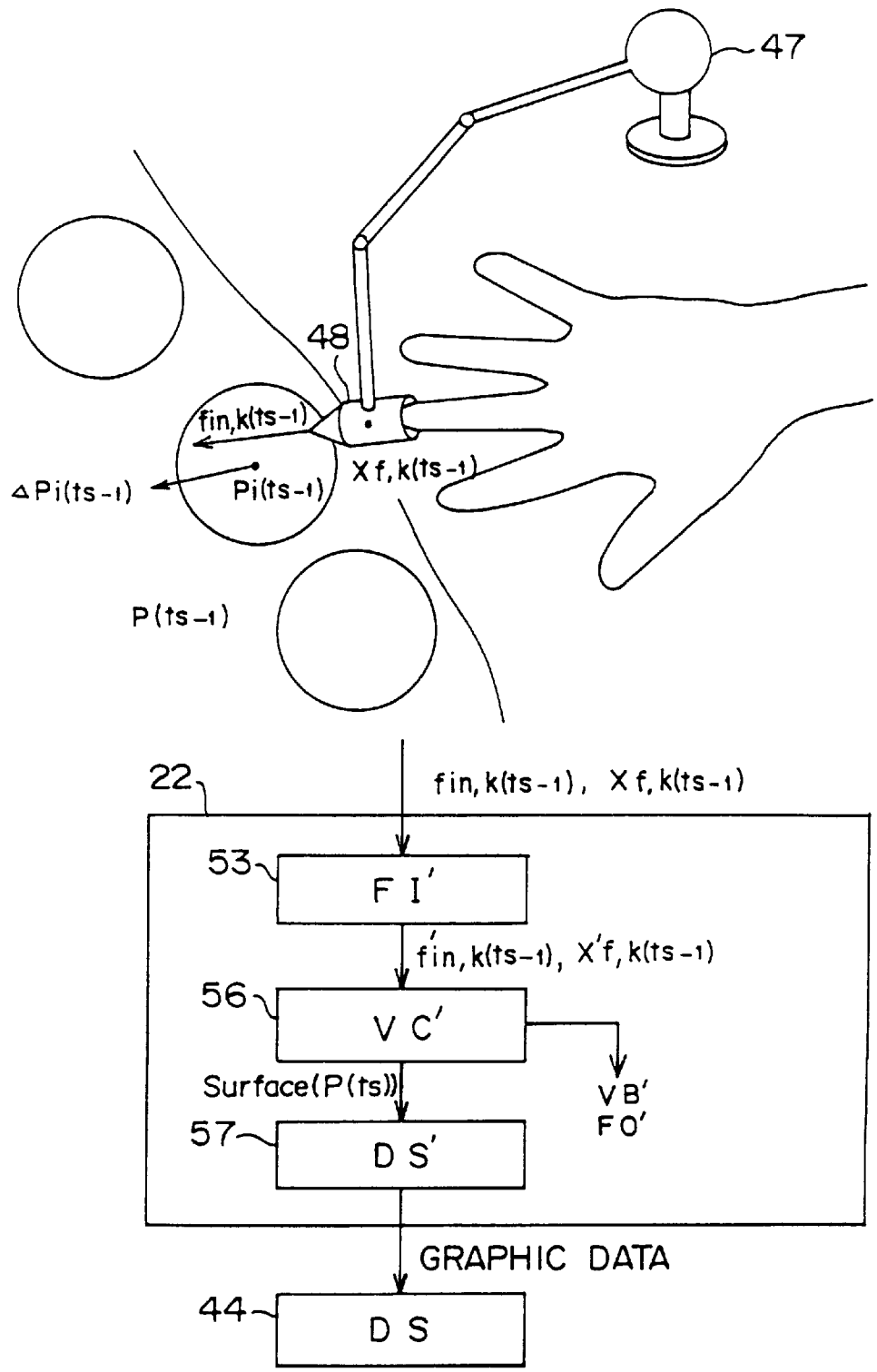
FIG. 19 is a drawing showing the input by a force input/output device.

Next, FIG. 19 shows an example of inputting force from the input/output unit 47. FI'53 receives the k-th coordinate information $x_{f,k}(t_{s-1})$ and force vector $f_{in,k}(t_{s-1})$ input from the force input/output unit 47. In the same way as shown in FIG. 17, $x_{f,k}(t_s)$ and $f_{in,k}(t_{s-1})$ represent the position of the gimbal 48 of the force input/output unit 47 and the force input at that position. In the same way as for the expression (4), FI'53 converts the amount $x'_{f,k}(t_{s-1})$ and $f'_{in,k}(t_{s-1})$ in the model world and passes them to the VC'56.

Then, VC'56 executes the deforming operation based on $x'_{f,k}(t_{s-1})$ and $f'_{in,k}(t_{s-1})$, and deforms a particle aggregate $P(t_s)$. At this time, the following calculation is executed for the input procedures of FI'53.

$$\Delta p_i(t_s) = \text{Displacement } (f'_{in,k}(t_{s-1})), \qquad (9)$$

$$\forall i, |x'_{f,k}(t_{s-1}) - p_i(t_{s-1})| < r_I,$$

$$p_i(t_{s-1}) \in P(t_{s-1})$$

where only the particles in which $x'_{f,k}(t_{s-1})$ is in the interaction field move according to movement vector $\Delta p_i(t_s)$ and the positions of the other particles do not change. Vector $\Delta p_i(t_s)$ is calculated using a function Displacement with $f'_{in,k}(t_{s-1})$ as a parameter. The function type of Displacement is decided by experiment.

Then, VC'56 makes the entire particle aggregate $P(t_{s-1})$ reflect the influence of the movement vector $\Delta p_i(t_s)$ of the particle moved first according to the predetermined deformation algorithm, and creates a particle aggregate $P(t_s)$ after operation. Then, it executes the film generating operation, generates the Surface $(P(t_s))$ and outputs the information. DS'57 generates the graphic data of the Virtuaclay according to the information on the Surface $(P(t_s))$ and displays it on the screen of DS44.

Figure 20:
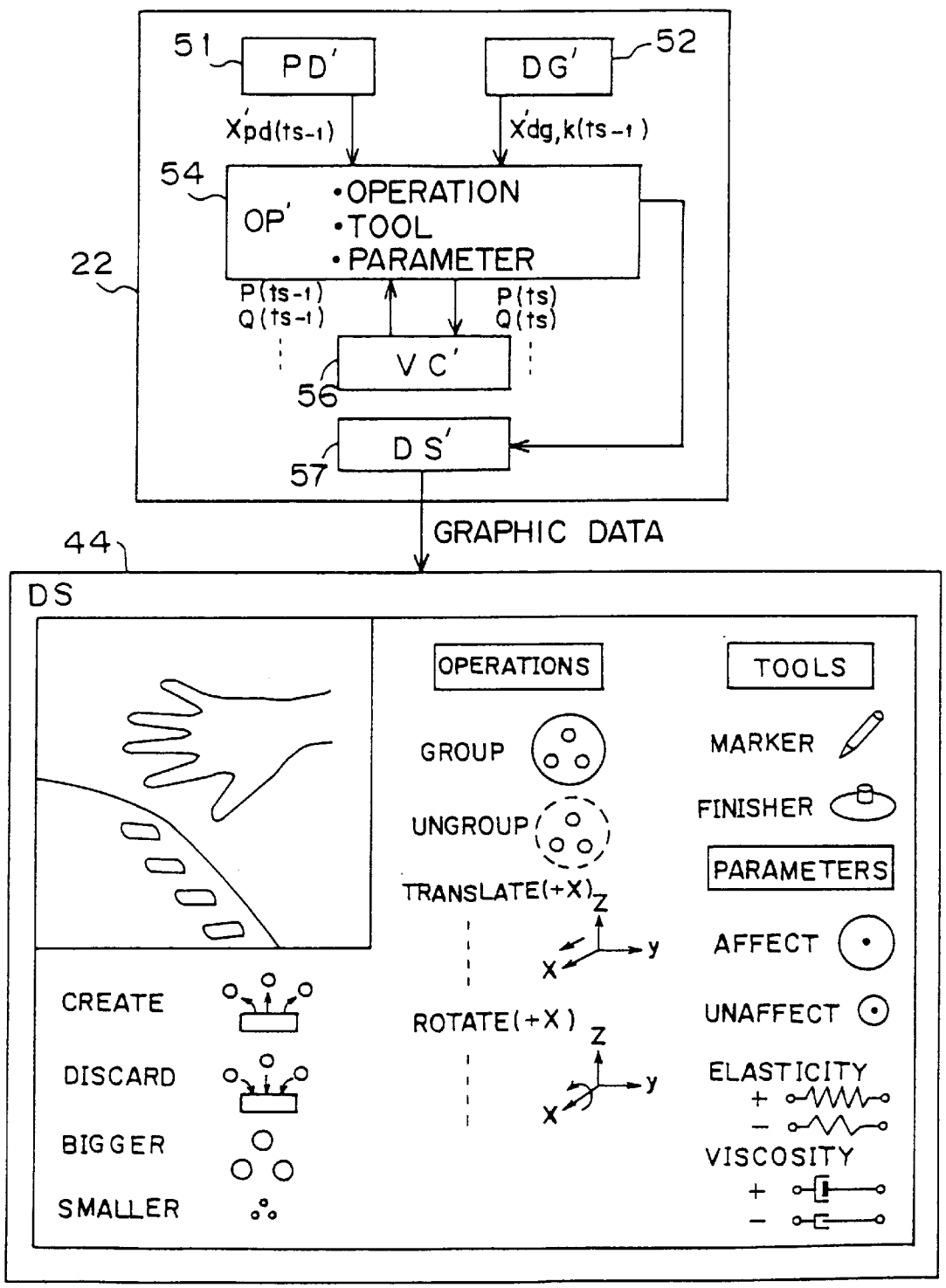
FIG. 20 shows the operation panel.

Next, FIG. 20 shows the operation panel displayed on the screen of DS44. In OP'54 the procedures corresponding to the operation owned by VC'56, tool and the parameter of a particle are defined in advance, and are displayed on the screen of DS44 as menu items.

In the screen shown in FIG. 20 for the operation, tool and parameter, are displayed items such as CREATE, DISCARD, BIGGER, SMALLER, GROUP, UNGROUP, TRANSLATE, ROTATE, etc., items such as MARKER, FINISHER and items such as AFFECT, UNAFFECT, ELASTICITY and VISCOSITY, respectively. By designating these items their corresponding operations can be executed. CREATE, DISCARD, BIGGER, SMALLER, GROUP, UNGROUP, TRANSLATE and ROTATE represent the operation of creating a particle, discarding a particle, enlarging, reducing, grouping, ungrouping, translating, rotating and deforming, respectively. Out of these for TRANSLATE and ROTATE, the direction of the translation and the rotation axis are also displayed.

AFFECT and UNAFFECT are used to set the radius $r_I$ of the interaction field of a particle and its feature, and the radius $r_C$ of the core of a particle and its feature, respectively. ELASTICITY and VISCOSITY are used to set the elasticity and viscosity constants, respectively, and "+" and "−" represent the instruction to strengthen and weaken its feature, respectively.

When the user designates an item using PD41 or DG42, OP'54 receives $x'_{pd}(t_{s-1})$ and $x'_{dg,k}(t_{s-1})$ from PD'51 and DG'52, respectively. Then, it judges whether or not $x'_{pd}(t_{s-1})$ or $x'_{dg,k}(t_{s-1})$ are in the area corresponding to any of the items on the screen, and if their position correspond to any of the items, the operation of the corresponding item is executed. At this time OP'54 asks VC'56 to process if necessary.

For example, when GROUP is designated, OP'54 receives the information on the designated particle aggregate $P(t_{s-1})$ and $Q(t_{s-1})$ from VC'56, and executes the following calculation.

$$\text{Group } (P(t_{s-1}), Q(t_{s-1})) = \{P(t_s), Q(t_s)\}, \qquad (10)$$

$$P(t_s) = P(t_{s-1}), Q(t_s) = Q(t_{s-1})$$

where Group is an operator for grouping given particle aggregates, and the information on a group $\{P(t_s), Q(t_s)\}$ is output to VC'56. After this the particle aggregate $P(t_s)$ and $Q(t_s)$ are regarded as one operation target.

When UNGROUP is designated, OP'54 receives the information on the designated particle aggregate $P(t_{s-1})$ and $Q(t_{s-1})$ from VC'56, and executes the following calculation.

$$\text{Ungroup } (P(t_{s-1}), Q(t_{s-1})) = \{P(t_s), Q(t_s)\}, \quad (11)$$
$$P(t_s) = P(t_{s-1}), Q(t_s) = Q(t_{s-1})$$

where UnGroup is an operator for ungrouping given particle aggregates, and the information on an ungrouped P ($t_s$) and Q ($t_s$) is output to VC'56. After this the particle aggregate P ($t_s$) and Q ($t_s$) are regarded as two separate operation targets.

When TRANSLATE is designated, OP'54 asks VC'56 to execute the translating operation using the designated translation vector $x_c$. Then, VC'56 executes the following calculation.

$$\text{Translate } (\{ \ldots, p_i(t_{s-1}), \ldots \}, x_c) = \{ \ldots, p_i(t_s), \ldots \} \quad (12)$$
$$p_i(t_s) = p_i(t_{s-1}) + x_c$$

where Translate is an operator for adding vector $x_c$ to the position coordinate $p_i$ ($t_{s-1}$) of each particle.

When ROTATE is designated, OP'54 asks VC'56 to execute the rotating operation using the rotation vector $\phi_c$. Then, VC'56 executes the following calculation.

$$\text{Rotate } (\{ \ldots, p_i(t_{s-1}), \ldots \}, \phi c) = \{ \ldots, p_i(t_s), \ldots \} \quad (13)$$
$$p_i(t_s) = R(\phi_c) p_i(t_{s-1})$$

where Rotate is an operator for multiplying the position coordinate $p_i$ ($t_{s-1}$) of each particle by the rotation matrix R ($\phi_c$) described by the rotation vector $\phi_c$.

When BIGGER or SMALLER is designated, OP'54 asks VC'56 to execute the scale modifying operation using the designated constant vector c. Then, VC'56 executes the following calculation.

$$\text{Scale } (\{ \ldots, p_i(t_{s-1}), \ldots \}, c) = \{ \ldots, p_i(t_s), \ldots \} \quad (14)$$
$$p_i(t_s) = diag(c) p_i(t_{s-1})$$

where Scale is an operator for multiplying the position coordinate $p_i$ ($t_{s-1}$) of each particle by the diagonal matrix diag (c) in which each element of the vector c is its diagonal element.

Figure 21:
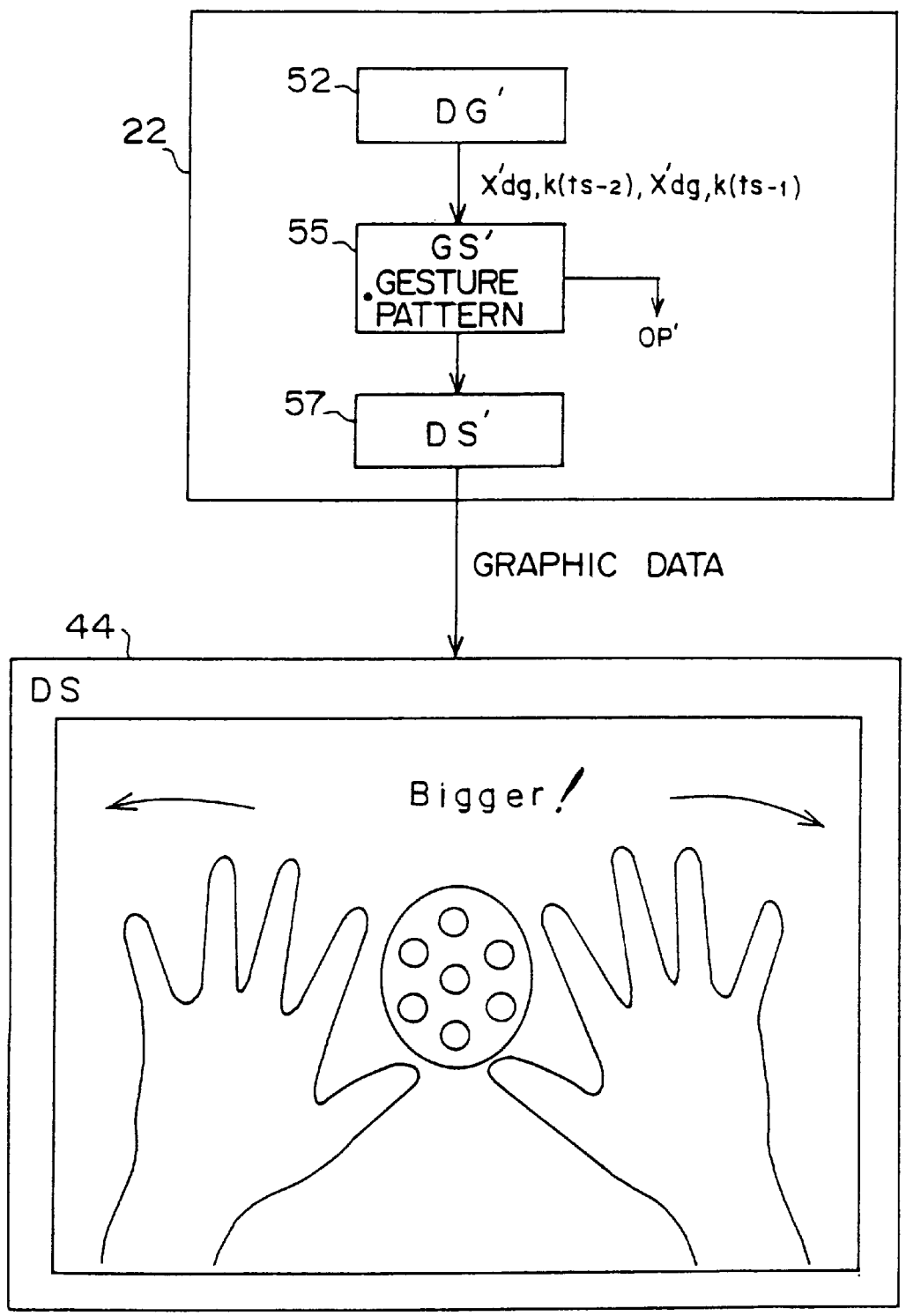
FIG. 21 is a drawing showing a gesture system.

Next, FIG. 21 shows the gesture system for designating operation without an operation panel. When using this function, the user makes predetermined gestures with a hand filted in a DG42. At this time GS'55 receives the history information $\{ \ldots, x'_{dg,k}(t_{s-2}), x'_{dg,k}(t_{s-1}), \ldots \}$ on the position of each sensor from DG'52, and judges whether or not the information is similar to a specific gesture pattern.

The gesture pattern is the information representing the change of the position of each sensor within a certain period, and patterns corresponding to each menu item shown in FIG. 20, such as translation gesture pattern, rotation gesture pattern, enlargement/reduction gesture pattern, etc. are prepared. GS'55 stores these gesture patterns as data in advance, calculates a similarity of the input history information to each of the gesture patterns, and compares them.

If the degree of the similarity exceeds a predetermined value, it judges that the item corresponding to the gesture pattern has been designated and asks OP 54 to process the item. It also asks DS'57 to display the gesture, Then, DS'57 displays the image of the corresponding gesture on the screen of DS44.

In this way, using the Virtuaclay system of this embodiment, the working methods restricted by the operability of 2D pointing devices and displays such as 3D CAD, 3D graphics, etc. can be improved and made more intuitive. Since today a data glove, 3D mouse, force input/output unit, etc. and head mount display are becoming popular input and output devices, it is easy to use these in the Virtuaclay system.

A function of realizing the feeling of operations on such as clay and generating various kinds of shapes intuitively, can also be provided as a plug-in tool for the conventional 3D CAD and 3D graphics. As a result, the time efficiency of the design of a 3D object in the real world, or in the design and production of buildings and molded objects in the virtual world can be improved.

Next, the details of each process of the Virtuaclay system and the resultant change are described below referring to FIGS. 22 to 78. It is assumed below that its system software is configured by object-oriented programming, and objects corresponding to PD'51, DG'52, FI'53, OP'54, GS'55, VC'56, DS'57, VB'58 and FO'59 are generated.

FIG. 22 is a flowchart showing the general process of this Virtuaclay system. When the system is started, first all objects described above are activated in the memory 22, and they are kept in the state of waiting for a message (step S1). Then, it is judged whether or not the objects have received a message (step S2).

When an object receives a message, the process related to the message is executed (step S3), the internal state of the object is updated (step S4), and it is judged whether or not an instruction to end the system is input (step S5). If it is not input, the process of steps S2 and after is executed until it is input. In step S2 when no object receives any message, the process of step S5 is executed.

FIG. 23 is a flowchart showing the transmitting and receiving process of a message between objects. The object on the transmitting side enters into a waiting state (step 12) after delivering the message to ask for the execution of a method (step S11).

When an object on the receiving side receives a message (step S21), it executes the designated method (step S22) and updates the internal state of data, etc. based on the result (step S23). Then, it returns the necessary information to the object on the transmitting side, delivers a new message to other objects (step S24) and enters into a waiting state (step S25).

If the combination of transmitting and receiving objects are expressed as [transmitting object >> receiving object], the major combinations of the Virtuaclay system become as follows:

[PD' >> VC'], [PD' >> OP'], [PD' >> DS'],
[DG' >>VC'], [DG' >> OP'], [DG' >> GS'],
[DG' >> DS'],
[FI' >> VC'], [FI' >> DS'],
[OP' >> VC'], [OP' >> DS'],
[GS' >> OP'], [GS' >> DS'],
[VC' >> DS'], [VC' >> VB'], [VC' >>FO']

Of course, a message can also be delivered between objects other than the above combinations if necessary. These objects and PD41, DG42, FI43, DS44, VB45 and FO46 shown in FIG. 13 operate as follows.

Figure 24:
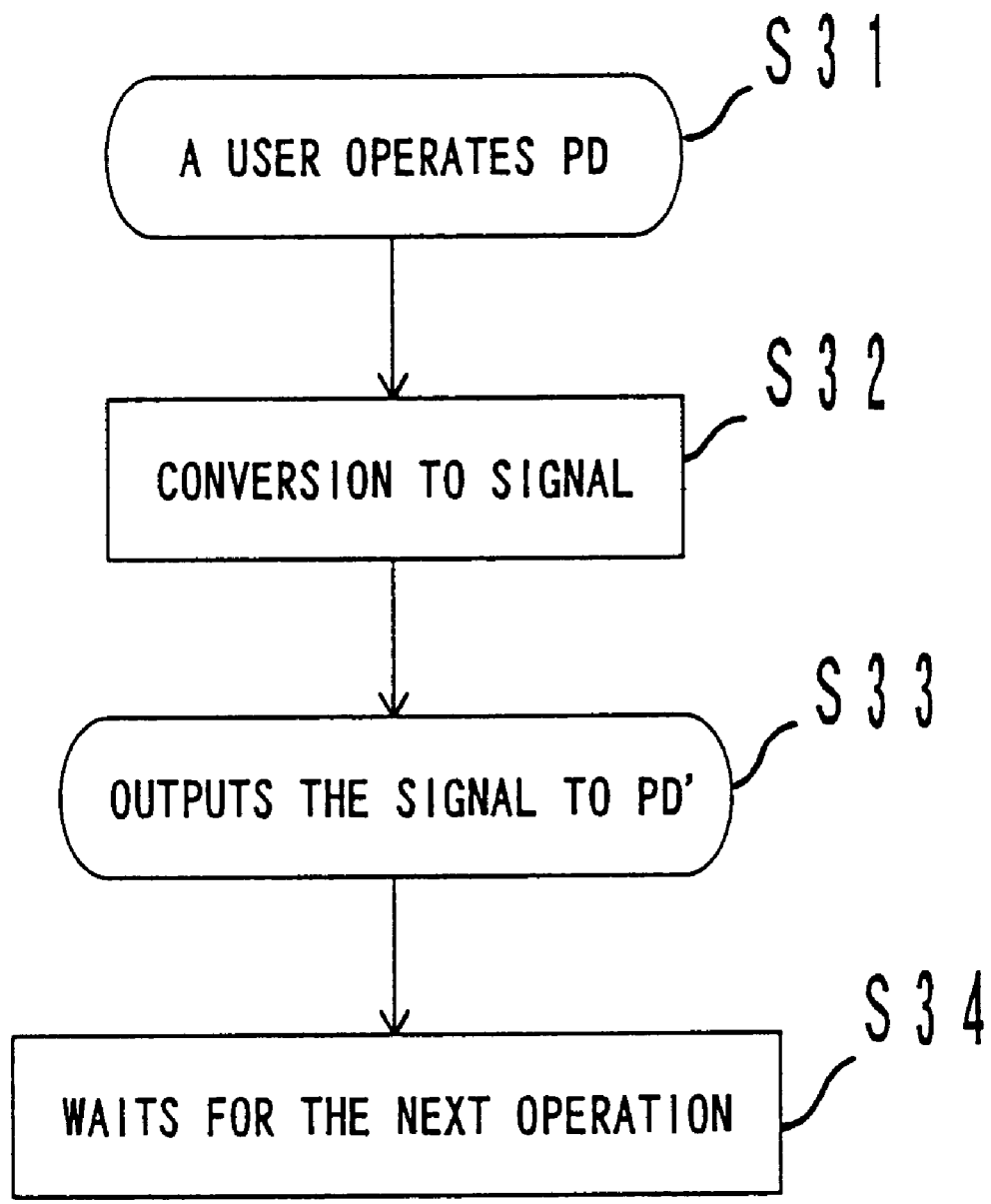
FIG. 24 is a flowchart showing the operation of the pointing device.

FIG. 24 is a flowchart showing the operation of PD41. PD41 starts to operate when operated by the user (step S31) and converts operation amount to a signal (step S32). Then, it outputs the signal to PD'51 (step S33) and enters into a state of waiting for the next operation (step S34).

Figure 25:
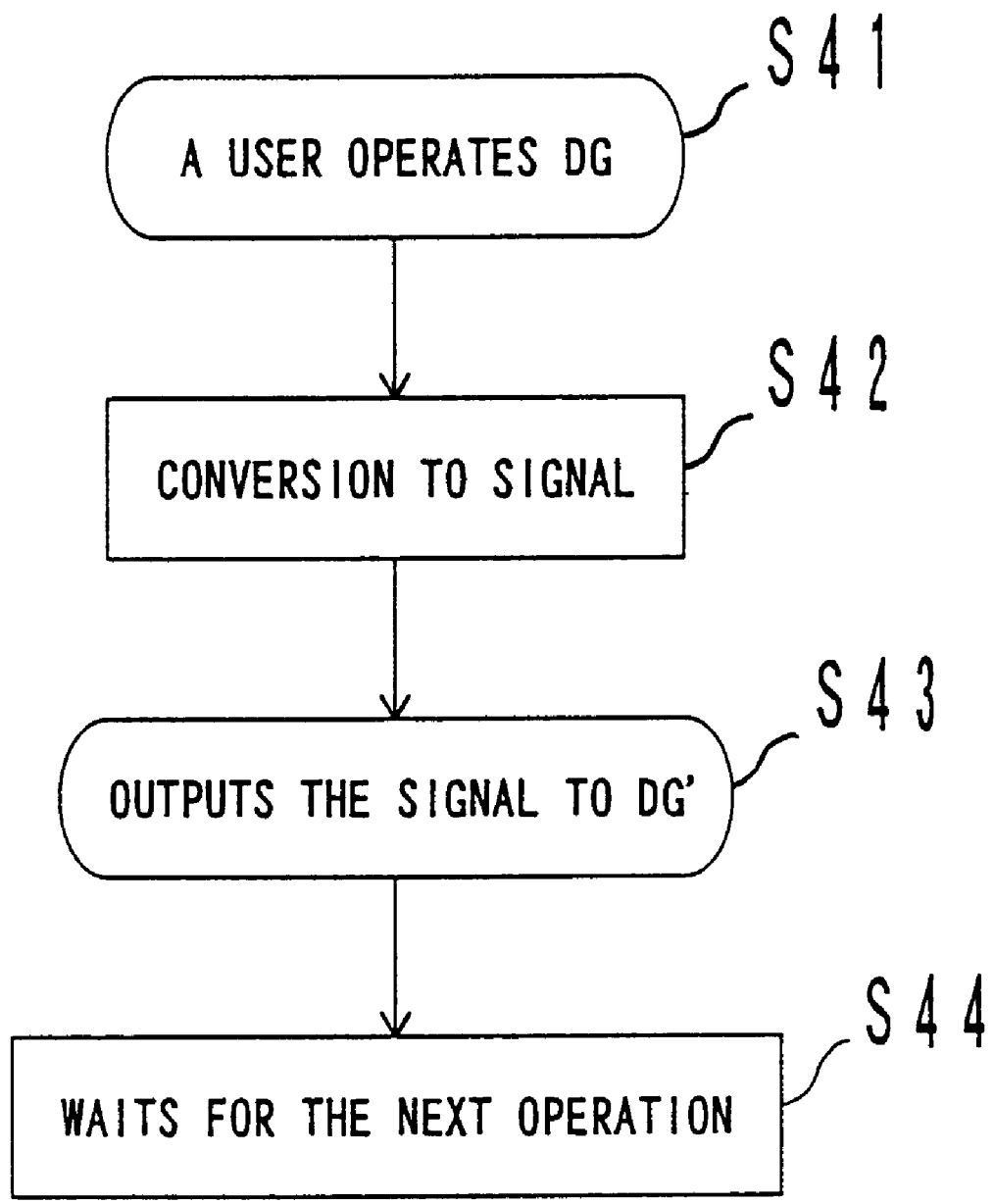
FIG. 25 is a flowchart showing the operation of the data glove.

FIG. 25 is a flowchart showing the operation of DG43. DG43 starts to operate when filted to the user's hand (step S41), and converts the change in the position of each sensor to a signal (step S42). Then, it outputs the signal to DG'52 (step S43), and enters into a state of waiting for the next operation (step S44).

FIG. 26 is a flowchart showing the operation of FI43. FI43 starts to operate when filted to the user's finger tip and operated (step S51), and converts the change in the position of the finger tip to a signal (step S52). Then, it outputs the signal to FI'53 (step S53), and enters into a state of waiting for the next operation (step S54).

FIG. 27 is a flowchart showing the operation of PD'51. PD'51 starts to operate when receiving a signal from PD41 (step S61), and determines the displacement amount of the position (point) of PD'51 based on the value of the signal (step S62). The position and displacement amount of PD'51, for example, correspond to the position information $x'_{pd}$ and movement vector $\Delta x'_{pd}$ shown in FIG. 15, respectively.

Then, PD'51 updates its position information (step S63) and determines the address of the message (step S64). When the address is VC'56, it outputs the position information and displacement amount to VC'56 as a message (step S65), and enters into a state of waiting for a signal (step S66). When the address is OP'54, it outputs the position information and displacement amount to OP'54 as a message (step S67), and enters into a state of waiting for a signal (step S66).

Figure 28:
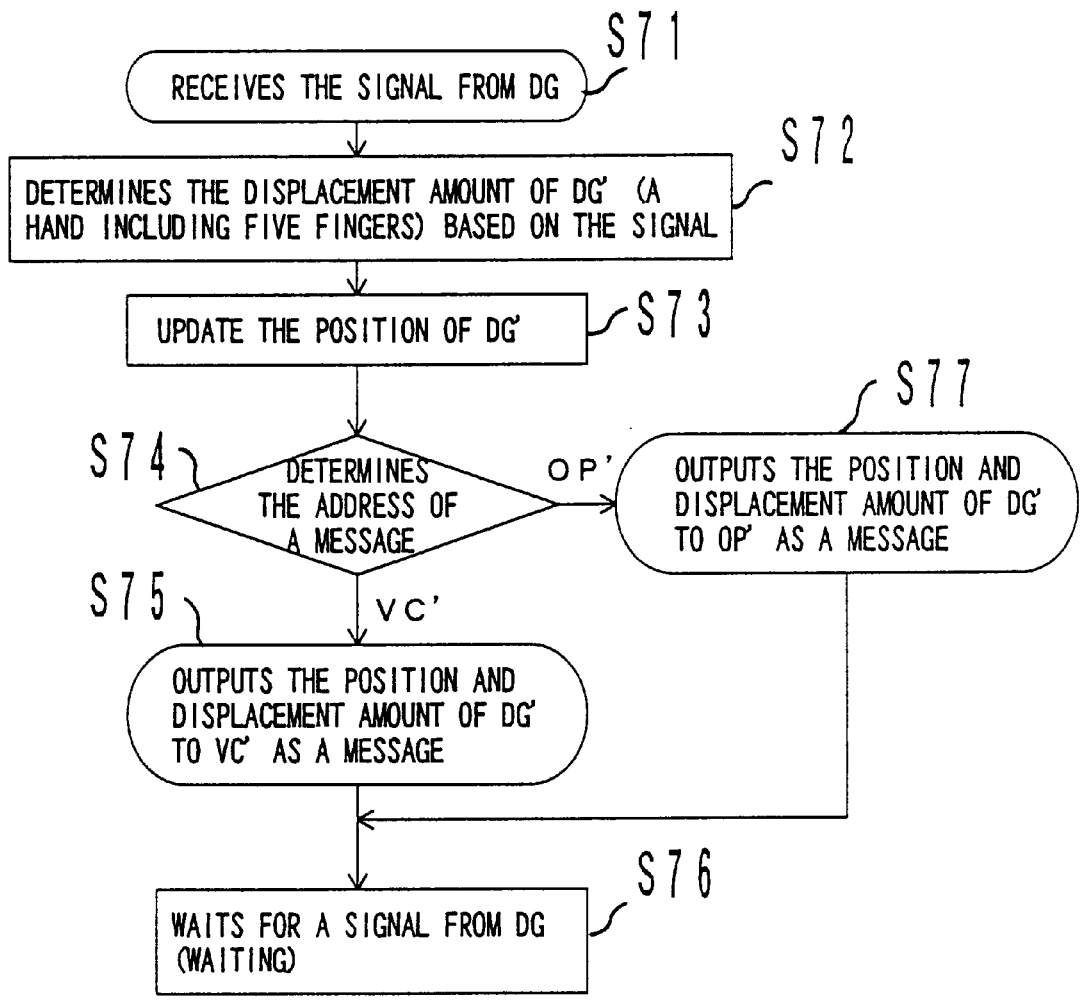
FIG. 28 is a flowchart showing of the operation of an object DG'.

FIG. 28 is a flowchart showing the operation of DG'52. DG'52 starts to operate when receiving a signal from DG42 (step S71), and determines the displacement amount of the sensor position of DG'52 based on the signal value (step S72). The position and displacement amount of DG'52, for example, correspond to the position information $x'_{dg,k}$ and the difference in $x'_{dg,k}$ between two consecutive time shown in FIG. 18.

Then, DG'52 updates its position information (step S73), and determines the address of the message (step S74). When the address is VC'56, it outputs the position information and displacement amount to VC'56 as a message (step S75), and enters into a state of waiting for a signal from DG42 (step S76). When the address is OP'54, it outputs the position information and displacement amount to OP'54 as a message (step S77), and enters into a state of waiting for a signal (step S76).

Figure 29:
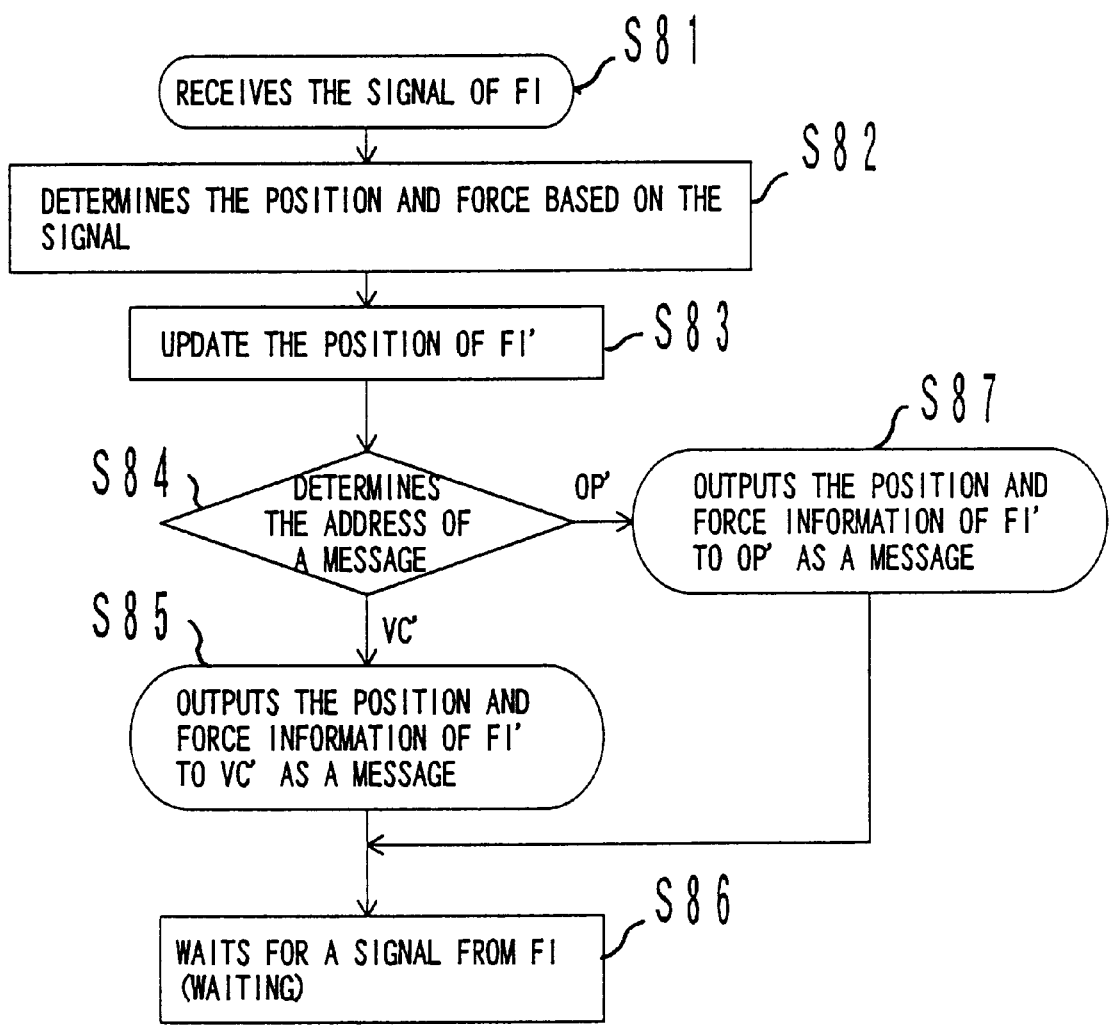
FIG. 29 is a flowchart showing of the operation of an object FI'.

FIG. 29 is a flowchart showing the operation of FI'53. FI'53 starts to operate when receiving a signal from FI43 (step S81), and determines the position and the input force of FI'53 based on the signal value (step S82). The position and force of FI'53, for example, correspond to the position information $x'_{f,k}$ and force vector $f_{in,k}$ shown in FIG. 19.

Then, FI'53 updates its position information (step S83), and determines the address of the message (step S84). When the address is VC'56, it outputs the position and force information to VC'56 as a message (step S85), and enters into a state of waiting for a signal from FI43 (step S86). When the address is OP'54, it outputs the position and force information as a message for OP'54 (step S87) and enters into a state of waiting for a signal (step S86).

FIG. 30 is a flowchart showing the operation of OP'54. OP'54 receives the event input from the operation panel (OP) displayed on the screen of DS44 (step S91), and determines its operation based on this event (step S92). Then, it outputs the operation for VC'56 to VC'56 as a message (step S93), and enters into a state of waiting for an event from the operation panel (step S94).

FIG. 31 is a flowchart showing the operation of VC'56. VC'56 starts to operate when receiving a message from PD'51, DG'52, FI'53 or OP'54 (step S101), and determines the action point and movement amount of a deforming operation for the Virtuaclay (step S102). Then, it starts a deforming operation (step S103), processes the movement of particles whose the action point exists in the interaction field (step S104), and determines the reaction (step S105).

Then, VC'56 updates the position of each particle (step S106), and updates the outermost particles (step S107). Then, it updates the surface information (patch information) of the Virtuaclay (step S108) and outputs the surface information to DS'57 as a message (step S109). It also outputs the reaction to VB'58 or FO'59 as a message (step S110), and enters into a state of waiting for the next message (step S111).

Figure 32:
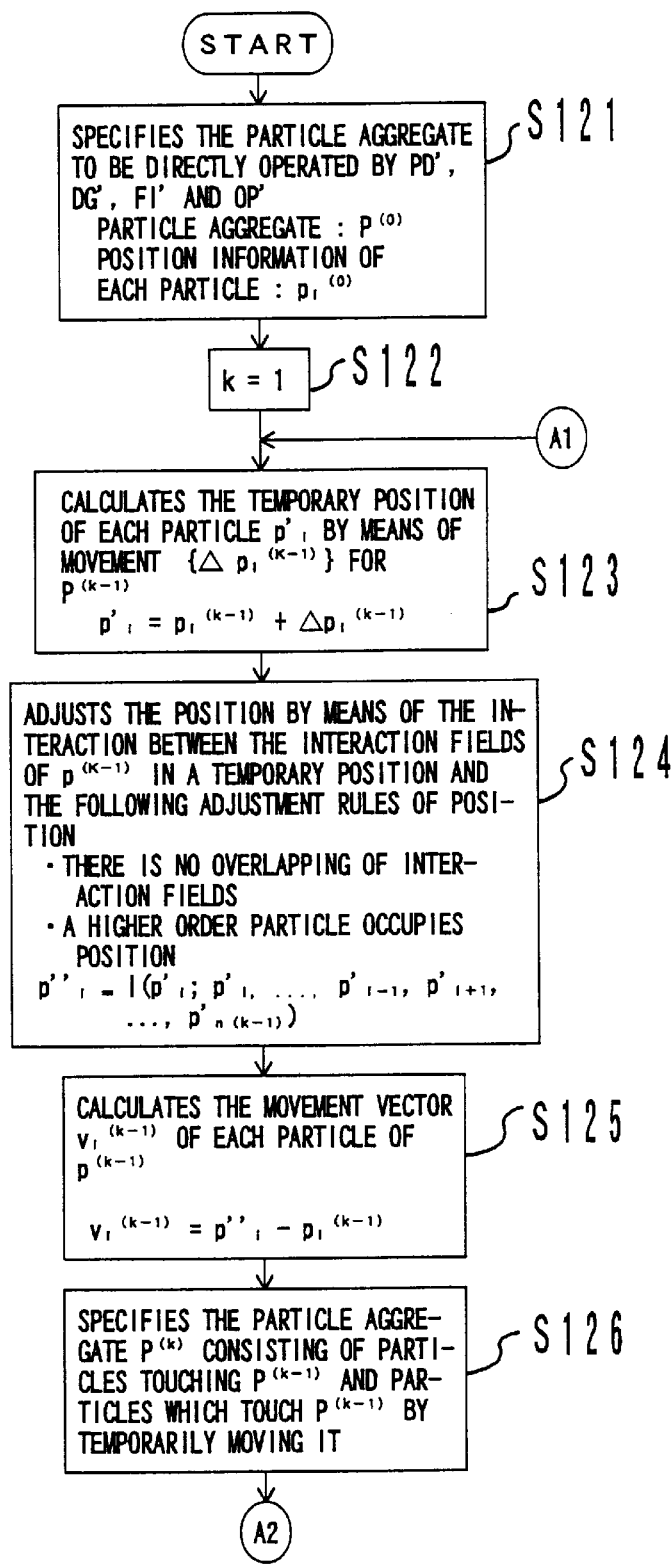
FIG. 32 is a flowchart (No.1) of the moving process.
Figure 33:
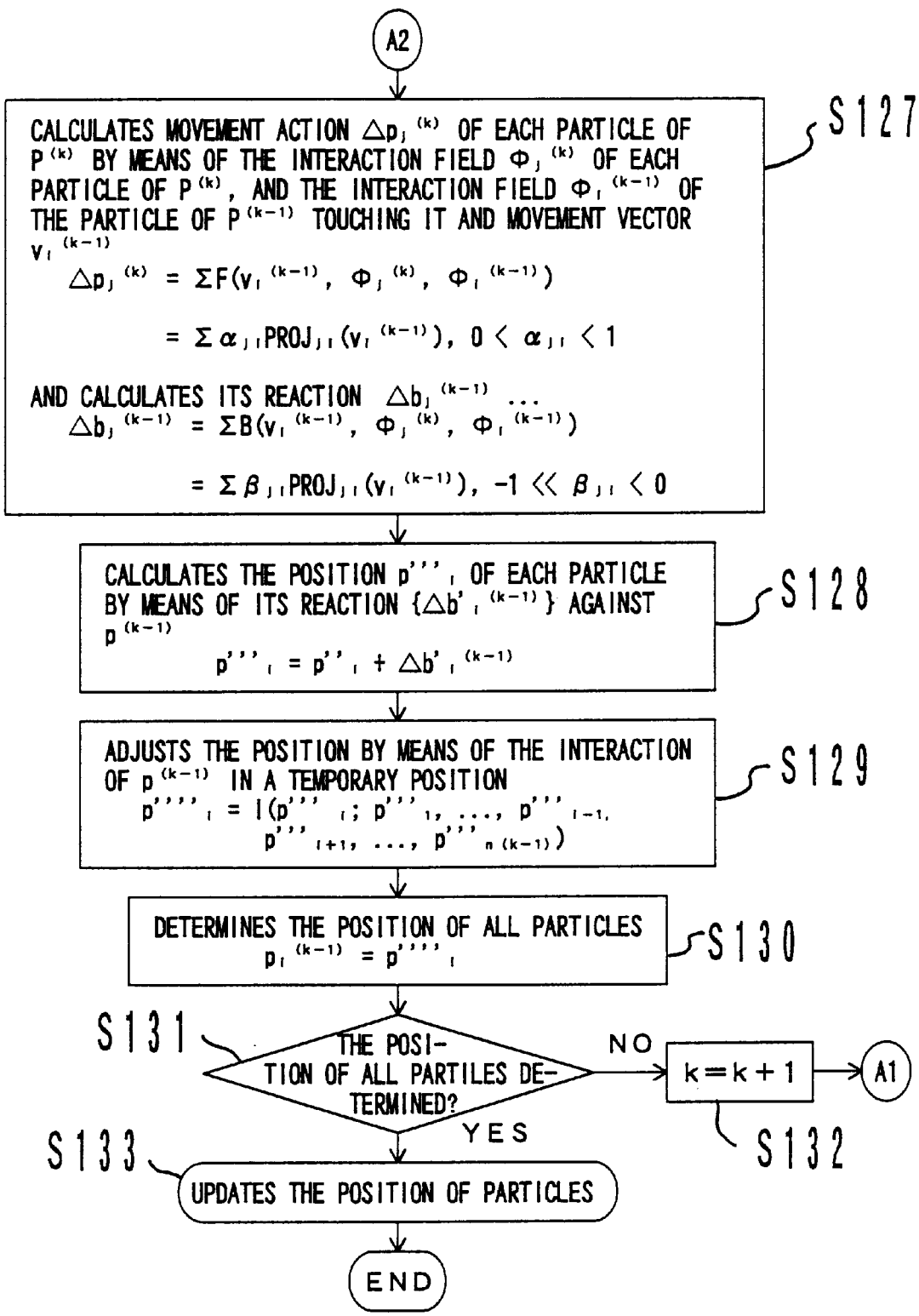
FIG. 33 is a flowchart (No.2) of the moving process.
Figure 34:
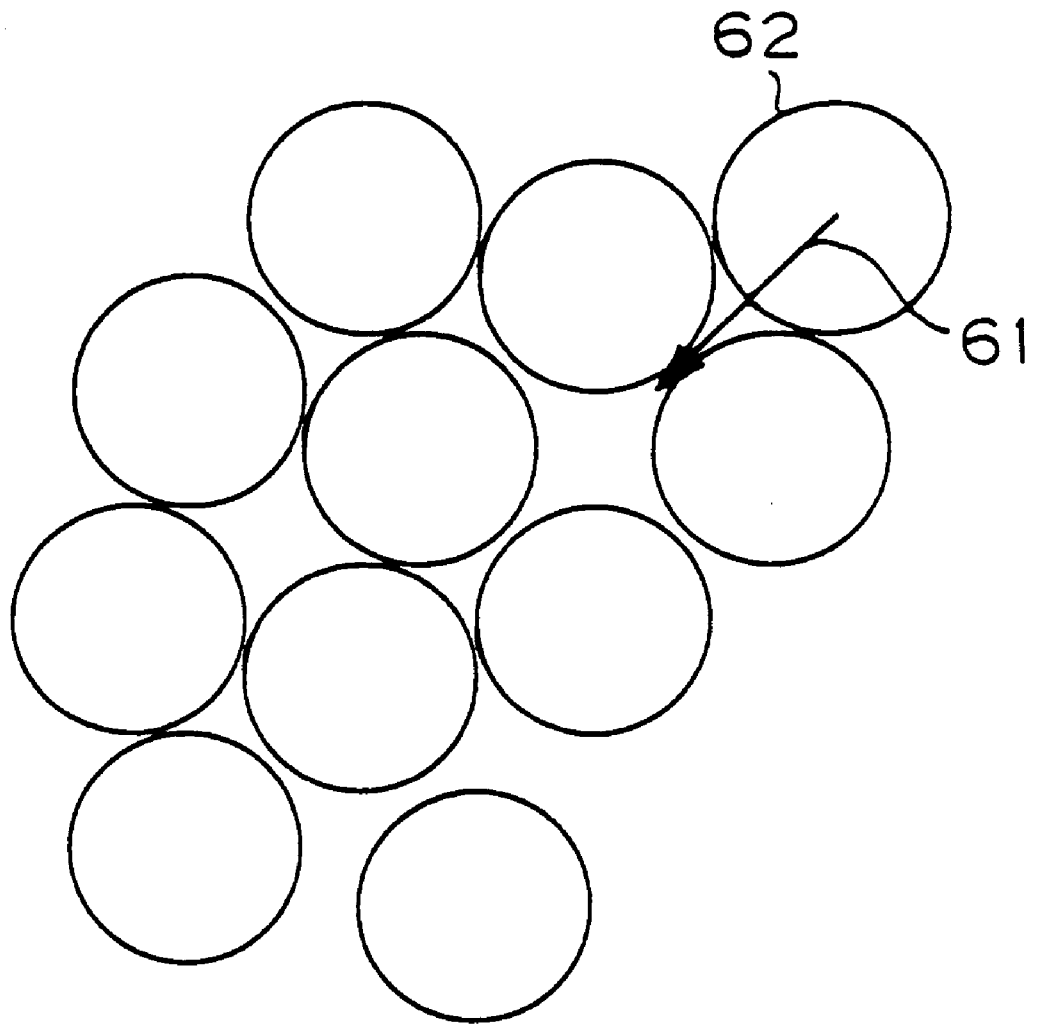
FIG. 34 shows the movement action on a particle.

FIGS. 32 and 33 are flowcharts showing the process in steps S102, S103, S104, S105 and S106. When a process is started, first VC'56 specifies the partial particle aggregate $P^{(0)}$ to be directly operated on by PD'51, DG'52, FI'53 or OP'54 out of all of the particle aggregates of the Virtuaclay, and assumes the position of each particle contained in $P^{(0)}$ to be $p_i^{(0)}$ (FIG. 32, step S121). For example, in a particle aggregate as shown in FIG. 34, when displacing action 61 is input, a particle 62 becomes the particle to be directly operated.

Then, the temporary position $p'_i$ of each particle is calculated by the following expression substituting a control variable k as 1 (step S122) and using the displacement $\{\Delta p_i^{(k-1)}\}$ for each particle in an aggregate $p_i^{(k-1)}$ (step S123).

$$p''_i = p_i^{(k-1)} + \Delta p_i^{(k-1)} \qquad (15)$$

Then, the position after adjustment $p''_i$ is decided after adjusting by means of the interaction between interaction fields in the temporary position $p'_i$ of each particle in the aggregate $p^{(k-1)}$ and the adjustment rule of position (step S124).

$$p''_i = I(p'_i, p'_i, \ldots, p'_{i-1}, p'_{i+1}, \ldots, p'_{n(k-1)}) \qquad (16)$$

where the right side of the expression (16) and n(k-1) represent the calculation for adjusting the position $p'_i$ and the number of particles in the aggregate $p^{(k-1)}$ respectively. For the adjustment rule, for example, the condition that there is no overlapping among the interaction fields is used. When as a result of a temporary movement there is an overlapping between the interaction fields of two or more particles, it makes either of them occupy the place and modifies the position of the others.

For example, it is assumed here that it compares the identification numbers of the overlapped particles and makes the overlapped particle with smaller number (higher order) occupy the place. In the case of FIG. 34 since only one particle is contained in the aggregate $P^{(0)}$. there is no need of adjustment and it becomes $p''_i = p'_i$.

Then, the movement vector $v_i^{(k-1)}$ of each particle in the aggregate $p^{(k-1)}$ is calculated using the following expression (step S125).

$$v_i^{(k-1)} = p''_i - p_i^{(k-1)} \qquad (17)$$

Then, it specifies an aggregate $p^{(k)}$ consisting of the other particles touching each particle in the aggregate $p^{(k-1)}$ and other newly touched particles which touch each particle in the aggregate $p^{(k-1)}$ when it moves according to the vector $v_i^{(k-1)}$ (step S126). In the case of FIG. 34 if the particle 62 is moved, its influence is gradually propagated to other particles as shown in FIG. 35.

Figure 35:
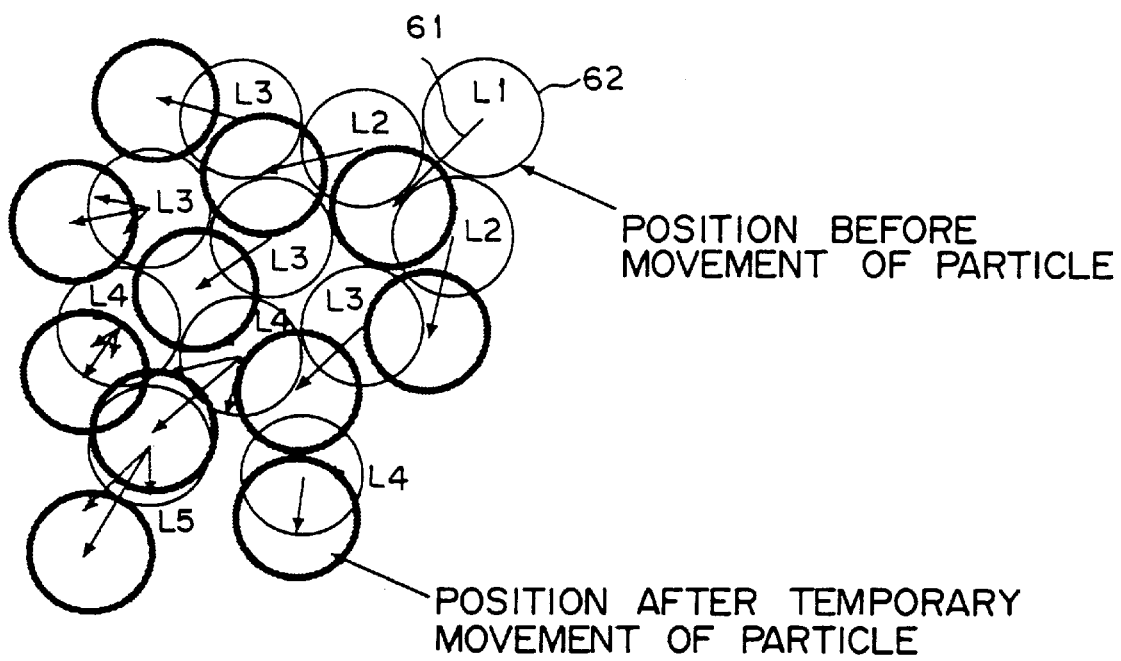
FIG. 35 shows the propagation of the movement to other particles.

In FIG. 35, circles drawn in thin and thick line represent particles before and after the movement, respectively. If the aggregate $P^{(0)}$ to which the particle 62 belongs is assumed to be in a particle layer L1, two particles touching the particle 62 are contained in a particle layer L2 corresponding to an aggregate $P^{(1)}$. In this way the particles in particle layers Lk (k=1,2,3,4,5) are contained in aggregates $P^{(k-1)}$.

Then, the movement action $\Delta p_j^{(k)}$ for each particle of an aggregate $P^{(k)}$ and the reaction $\Delta b_j^{(k-1)}$ from the particle are calculated by the following expression by means of the interaction field $\phi_j^{(k)}$ of each particle of an aggregate $P^{(k)}$, the interaction field $\phi_i^{(k-1)}$ of each particle of an aggregate $P^{(k-1)}$ touching it and movement vector $v_i^{(k-1)}$ (FIG. 33, step S127).

$$\Delta p_j^{(k)} = \sum_i F(v_i^{(k-1)}, \phi_j^{(k)}, \phi_i^{(k-1)}) \quad (18)$$

$$\approx \sum_i \alpha_{ij} PROJ_{ji}(v_i^{(k-1)}),$$

$$0 < \alpha_{ji} < 1$$

$$\Delta b_j^{(k-1)} = \sum_i B(v_i^{(k-1)}, \phi_j^{(k)}, \phi_i^{(k-1)}) \quad (19)$$

$$\approx \sum_i \beta_{ji} PROJ_{ji}(v_i^{(k-1)}),$$

$$-1 \ll \beta_{ji} < 0$$

where $PROJ_{ji}(v_i^{(k-1)})$ is a function for projecting vector $v_i^{(k-1)}$ on the direct line connecting $p_i^{(k-1)}$ and $p_j^{(k)}$ and $\alpha_{ji}$ and $\beta_{ji}$ are coefficients decided by interaction fields $\phi_j^{(k)}$ and $\phi_i^{(k-1)}$. Provided that the absolute value of $\beta_{ji}$ shall be sufficiently smaller than 1.

Then, the modification of the position p"$_i$ is calculated by the following expression after obtaining reaction $\{\Delta b'_i^{(k-1)}\}$ against each particle of the aggregate $P^{(k-1)}$ by each particle of the aggregate $P^{(k)}$.

$$p'''_i = p''_i + \Delta b'_i^{(k-1)} \quad (20)$$

$\Delta b'_i^{(k-1)}$ is obtained by projecting the reaction $\Delta b_j^{(k-1)}$ from each particle of the aggregate $P^{(k)}$ on the straight line connecting $p_i^{(k-1)}$ and $p_j^{(k)}$.

Then, the position after adjustment p'''$_i$ is decided after adjusting by means of the interaction between interaction fields in the temporary position p'''$_i$ of each particle of the aggregate $P^{(k-1)}$ and the adjustment rule described above (step S129).

$$p''''_i = I(p'''_i; p'''_1, \ldots, p'''_{i-1}, p'''_{i+1}, \ldots, p'''_{n(k-1)}) \quad (21)$$

Then, p''''$_i$ is determined as the final position $p_i^{(k-1)}$ (step S130).

Then, it is judged whether or not the positions of all particles are decided (step S131), and if there is any particle whose position is not yet decided, the process of steps S123 and after is repeated substituting k=k+1 (step S132). Then, if the positions of all particles are determined, the particle positions are updated according to that information (step S133) and this process terminates.

Figure 36:
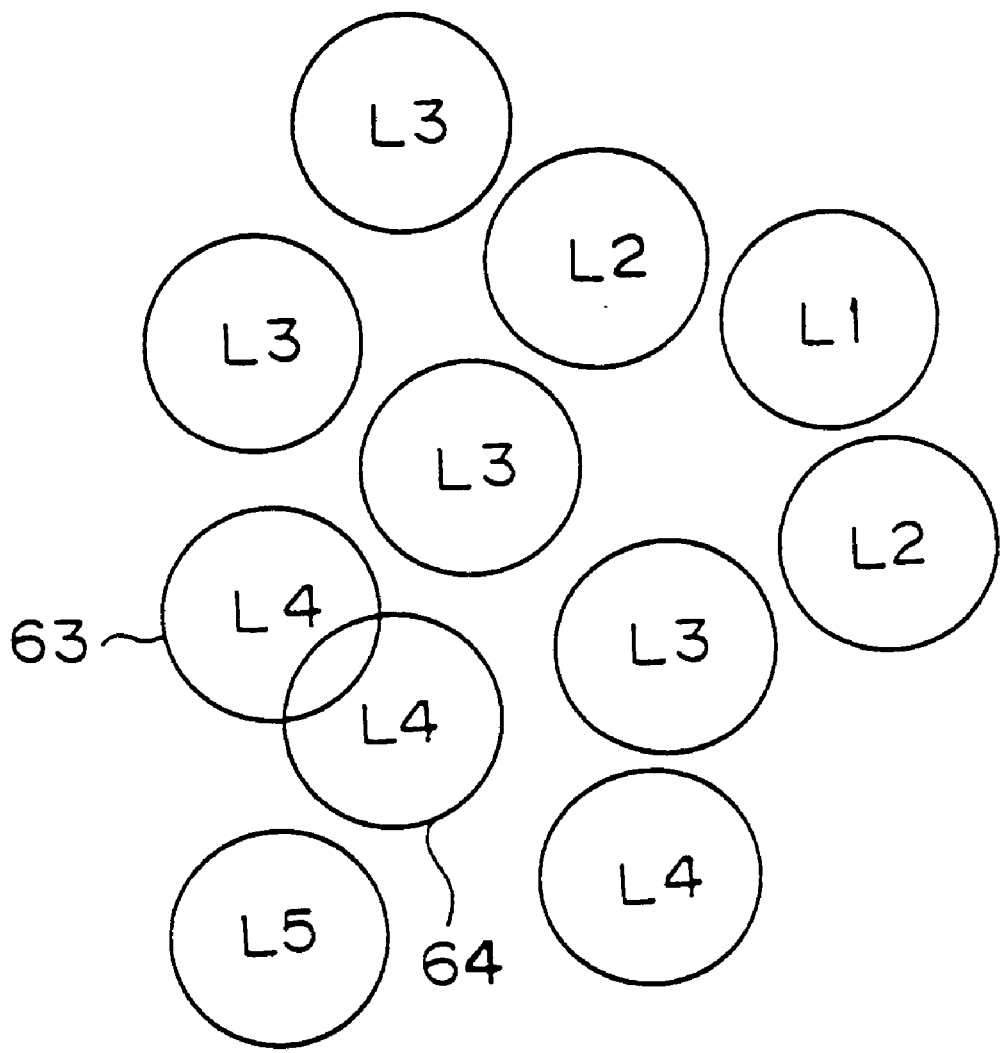
FIG. 36 shows the overlapping of the interaction field.
Figure 37:
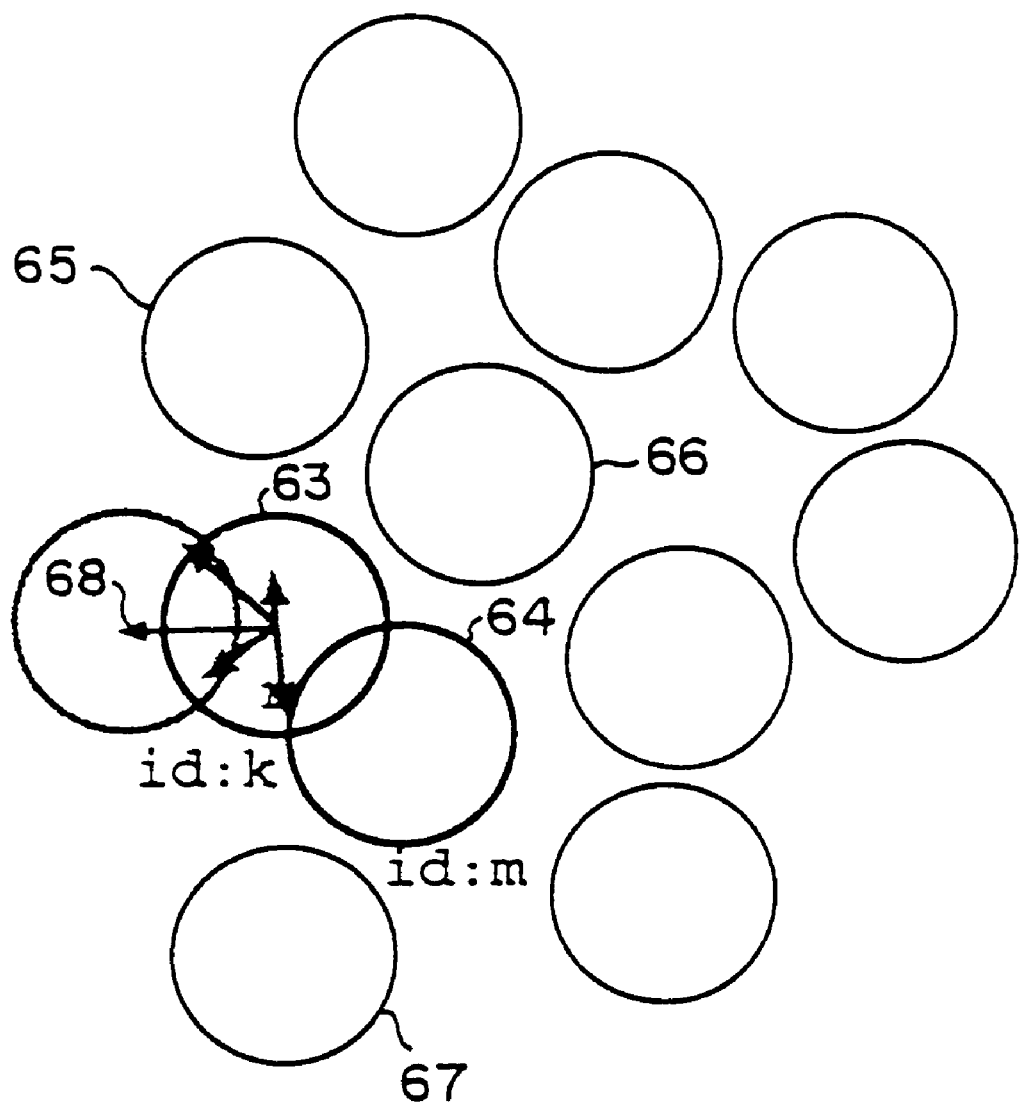
FIG. 37 shows the dissolution of the overlapping in the particle layer.

For example, it is assumed that two particles 63 and 64 in a particle layer L4 overlap each other as shown in FIG. 36. At this time, to remove the overlapping, VC'56 compares the identifiers k and m of these particles 63 and 64, and decides to change the position of the particle 63 as shown in FIG. 37.

Figure 38:
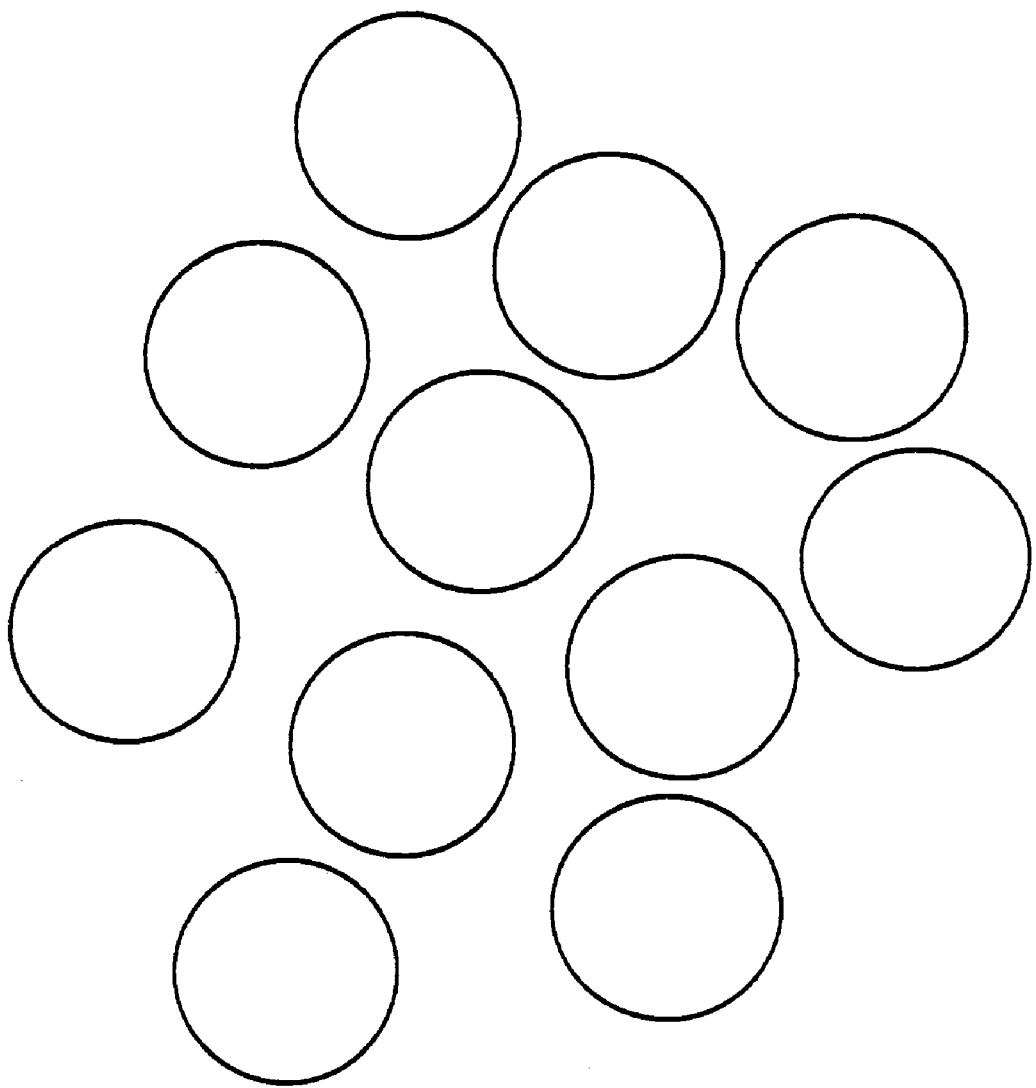
FIG. 38 shows the determined position.

Although there are various methods of modifying the position of the particle 63, it is assumed here that vectors with the direction going away from particles 65, 66, 64 and 67 in the neighborhood are calculated, and the position to be modified is decided by the composite vector 68 generated from them. In this way, the position of each particle is determined as shown in FIG. 38.

Figure 39:
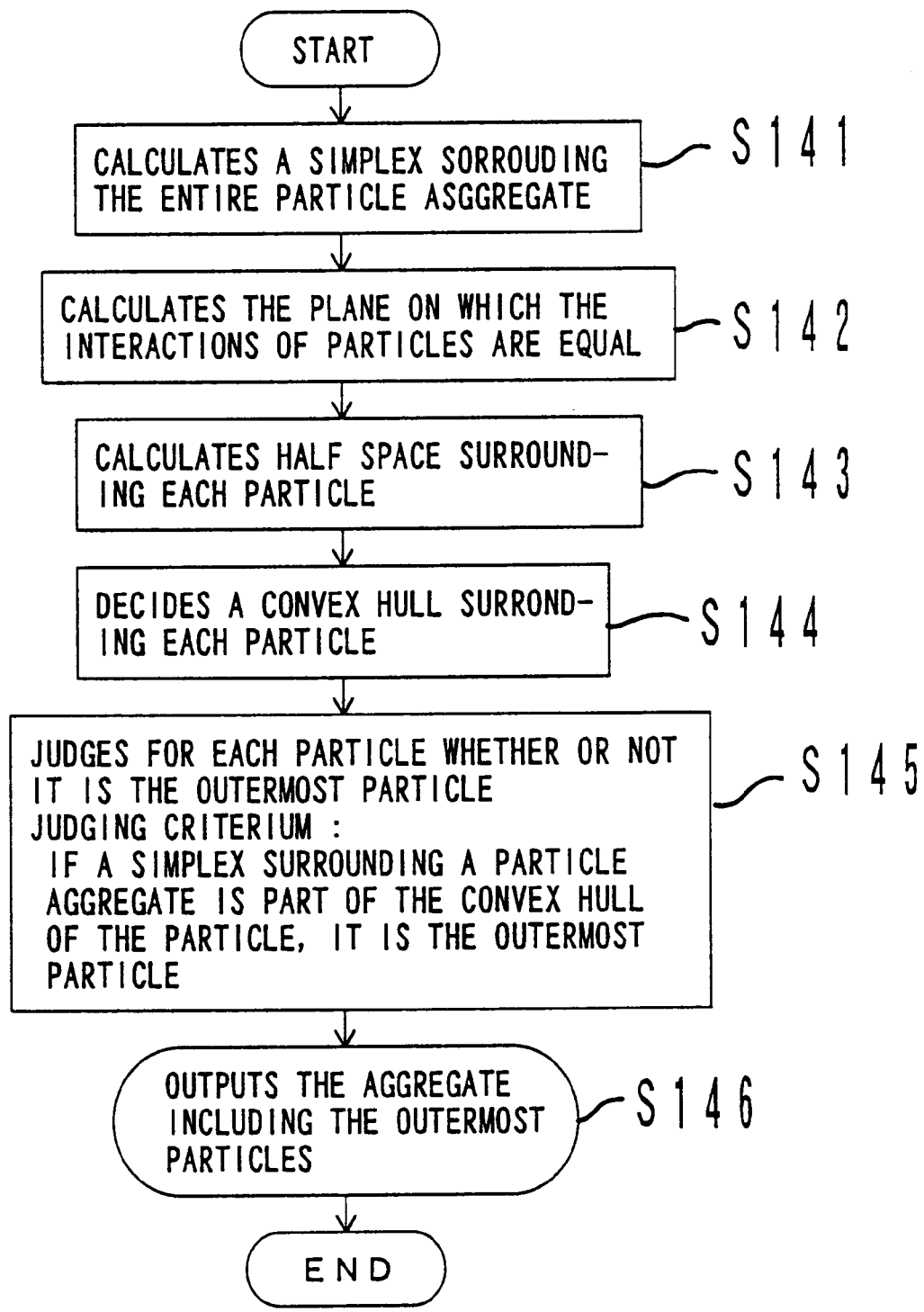
FIG. 39 is a flowchart showing the updating process of the outermost particles.
Figure 40:
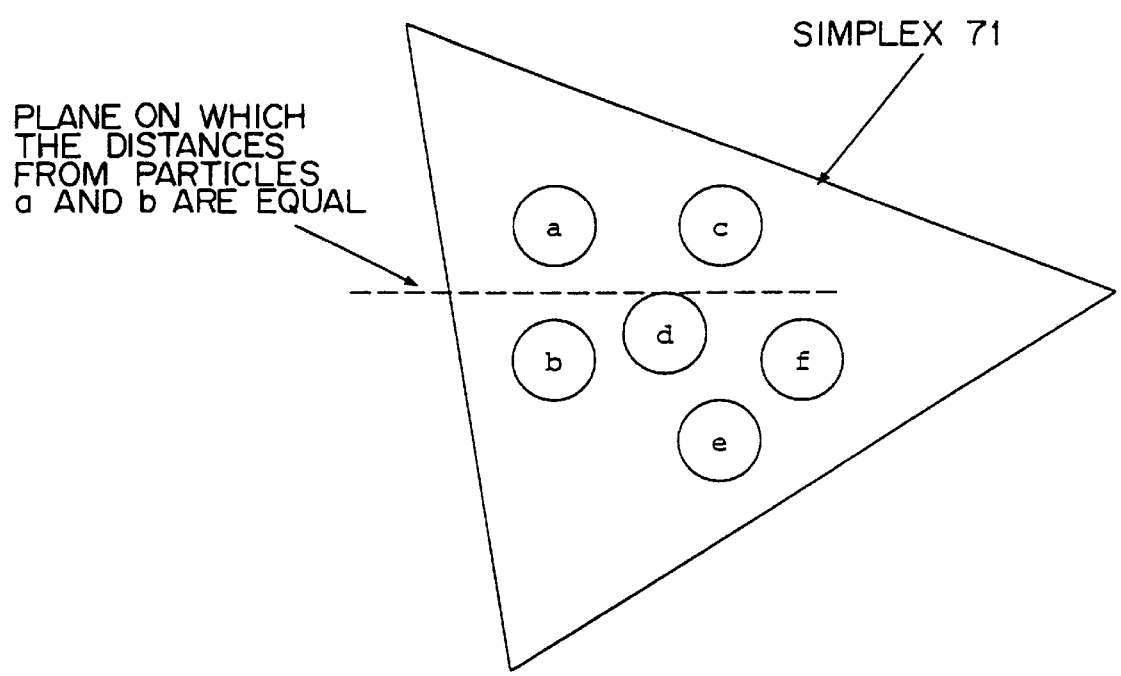
FIG. 40 shows the boundary between particles.

FIG. 39 is a flowchart showing the updating process of the outermost particle in step S107 shown in FIG. 31. Here the outermost particle is decided using a simplex method. When its process is started, VC'56 first calculates a simplex 71 surrounding the entire particle aggregate as shown in FIG. 40 (step S141). Then, when there is interaction between two particles in the neighborhood of each particle, a plane is calculated so that each influence becomes equal (step S142).

Then, VC'56 calculates a half space surrounding each particle with the decided plane as a boundary (step S143). In the particle aggregate shown in FIG. 40 the half space surrounding a particle a is separated by three planes with a boundary a & b between particles a and b, a boundary a & c between particles a and c, and a boundary a & d between particles a and d, as shown in FIG. 41.

Then, it decides a convex hull surrounding each particle (step S144). A convex hull means the minimum convex set including an arbitrary partial set of points in the space. A convex set means a partial set of points in the space and has the feature of including a segment connecting any two points in it. Therefore, in other words, a convex hull surrounding a particle is the minimum convex set including the neighborhood of the particle.

Figure 41:
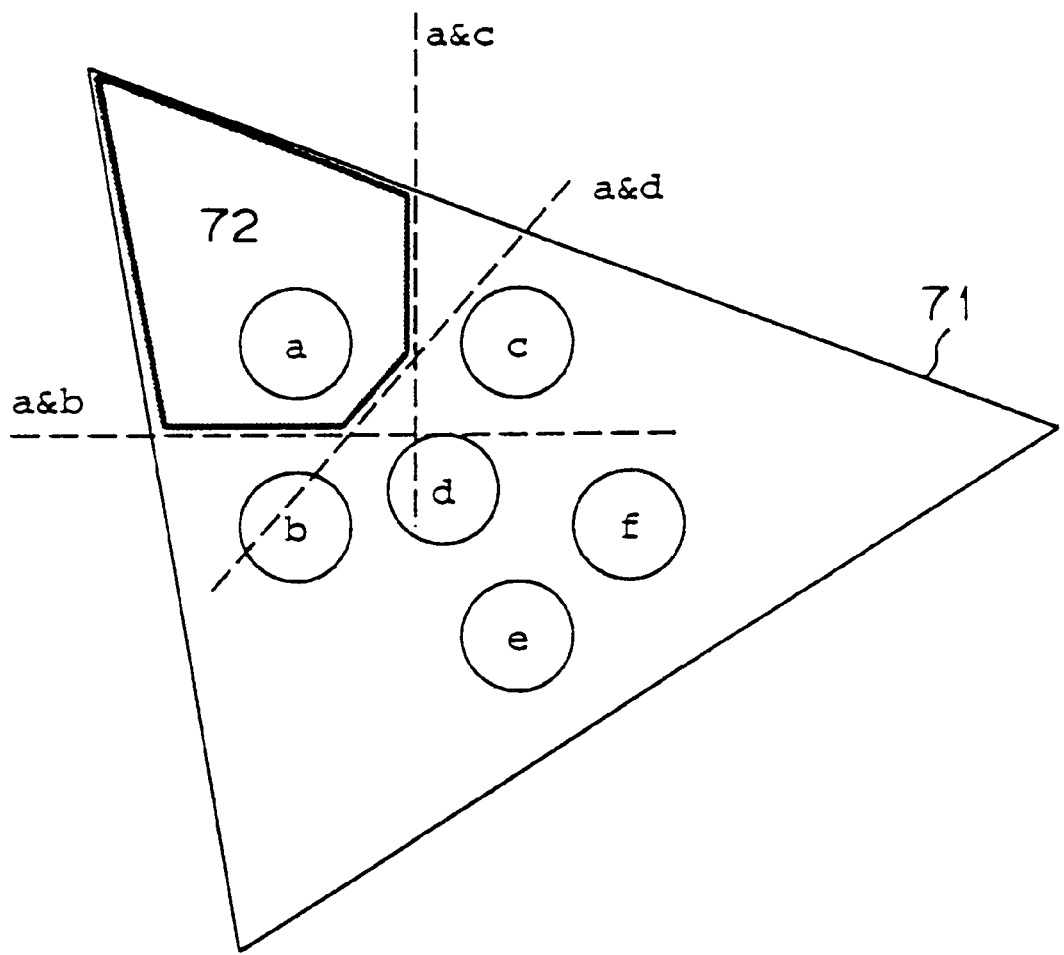
FIG. 41 shows half spaces and convex hulls.
Figure 42:
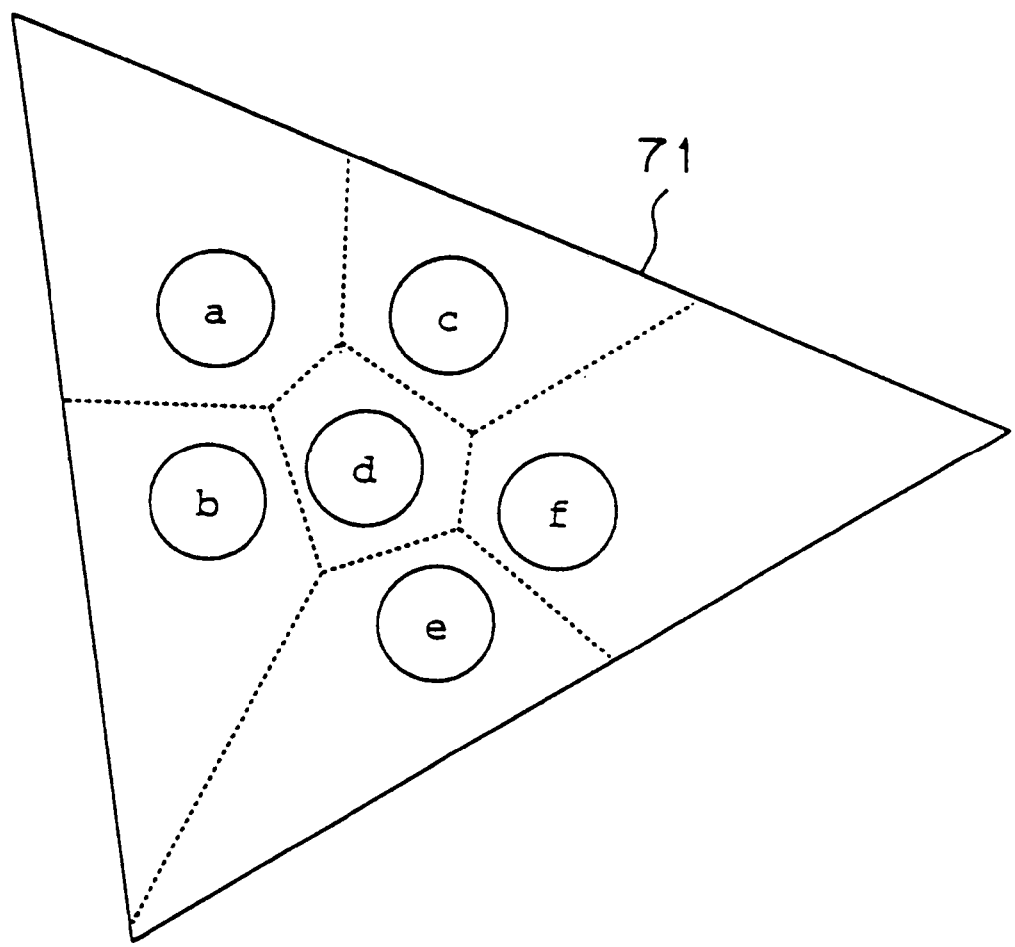
FIG. 42 shows convex hulls and the outermost particles.

In FIG. 41 a convex hull 72 surrounding a particle a is decided by planes a & b, a & c and a & d, and the surface of a simplex 71. In the same way convex hulls surrounding other particles are decided as shown in FIG. 42.

Then, it judges for each particle whether or not it is the outermost particle (step S145). If a simplex surrounding a particle aggregate is part of the convex hull of a certain particle, the particle is judged the outermost particle. Then, it outputs the aggregate of the outermost particles to execute the process of step S108 shown in FIG. 31 (step S146) and terminates the process. In the case of FIG. 42 particles a, b, e, f and c in the convex hulls including the simplex 71 become the outermost particles.

Figure 43:
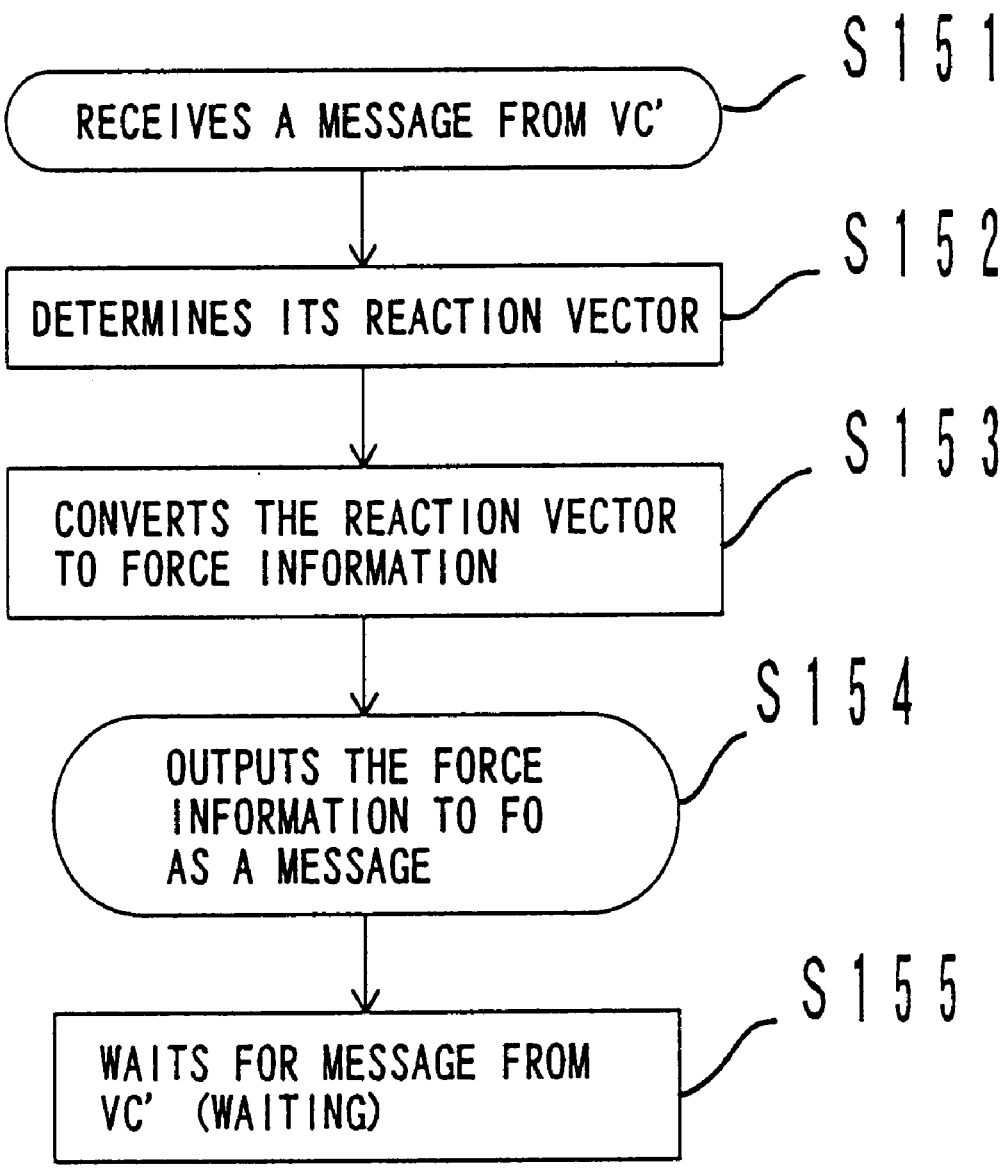
FIG. 43 is a flowchart showing the operation of an object FO'.

FIG. 43 is a flowchart showing the operation of FO'59. FO'59 starts to operate when receiving a message from VC'56 (step S151) and determines its reaction vector at the action point (step S152).

Then, it converts the reaction vector to force information (step S153). This information corresponds to, for example, the force data $F_k$ shown in FIG. 17. Then, it outputs the force information to FO46 as a message (step S154), and enters into a state of waiting for a message (step S155).

Figure 44:
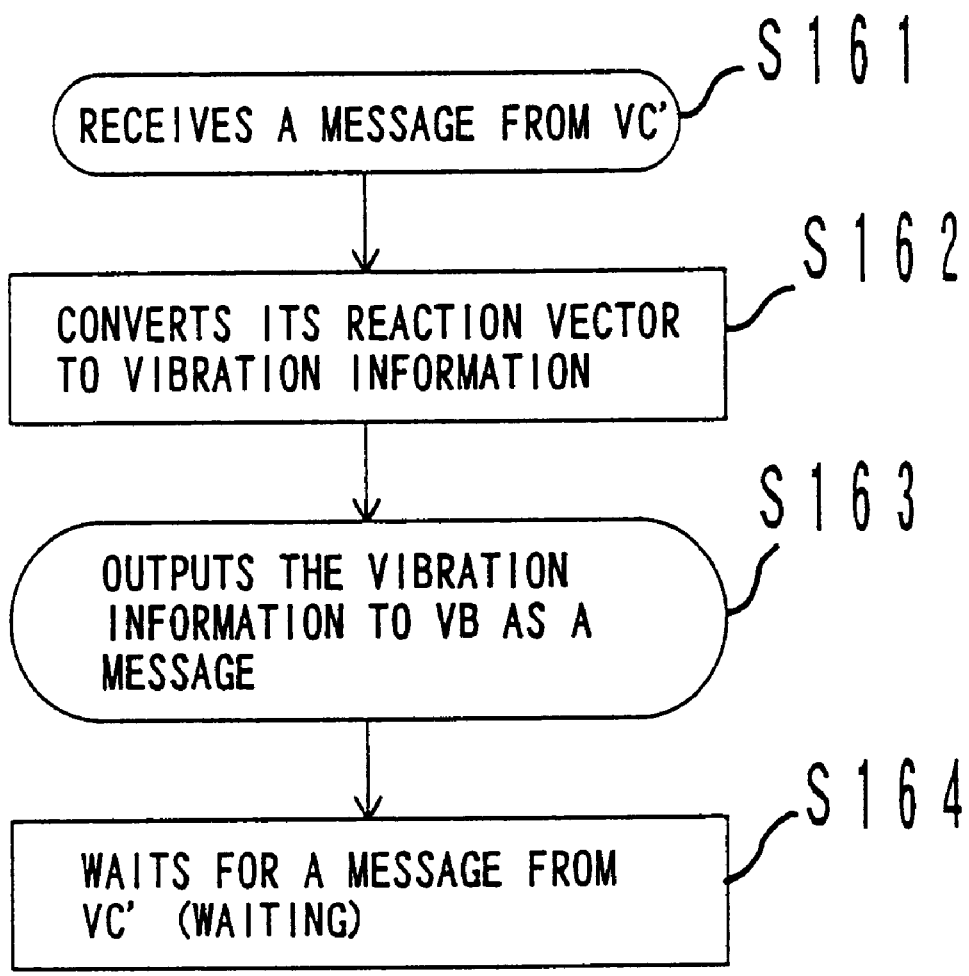
FIG. 44 is a flowchart showing the operation of an object VB'.

FIG. 44 is a flowchart showing the operation of VB'58. VB'58 starts to operate when receiving a message from VC'56 (step S161) and converts its reaction vector at the action point to vibration information (step S162). This vibration information corresponds to, for example, the vibration data $V_k$ shown in FIG. 16. Then, it outputs the vibration information to VB54 as a message (step S163), and enters into a state of waiting for a message (step S164).

Figure 45:
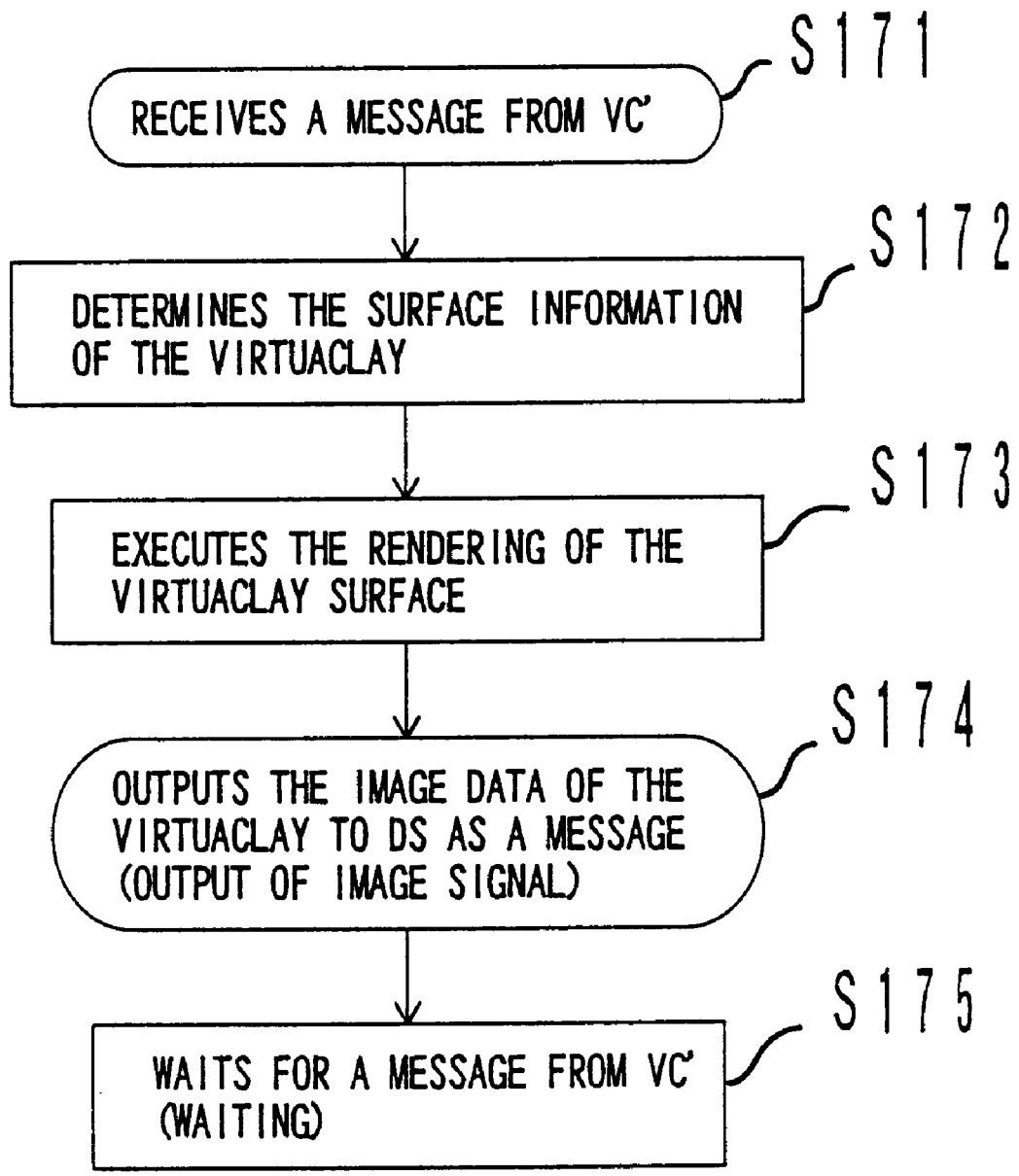
FIG. 45 is a flowchart showing the operation of an object DS'.

FIG. 45 is a flowchart showing the operation of DS'57. DS'57 starts to operate when receiving a message from VC'56 (step S171), determines the surface information of the Virtuaclay (step S172), executes the rendering of the surface, and generates the image data of the Virtuaclay (step S173). This surface information corresponds to, for example, the Surface shown in FIG. 15. Then, it outputs the image data to DS44 as a message (image signal) (step S174), and enters into a state of waiting for a message from VC'56 (step S175).

DS'57 receives a message from PD'51, DG'52, FI'53, OP'54 and GS'55 besides VC'56, generates image data corresponding to the message, and outputs the image data to DS44.

Figure 46:
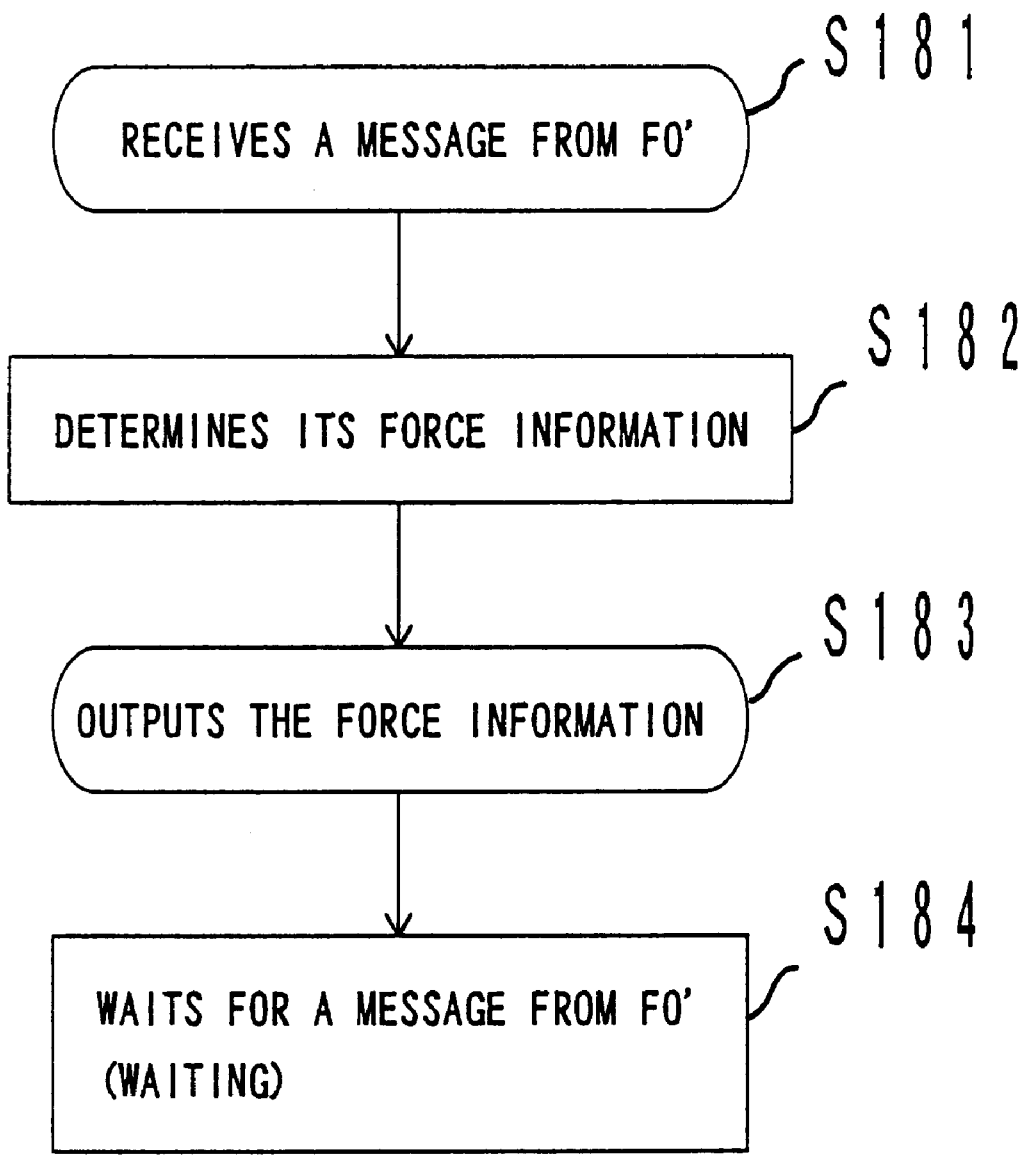
FIG. 46 is a flowchart showing the operation of the force output device.

FIG. 46 is a flowchart showing the operation of FO46. FO46 starts to operate when receiving a message from FO'59 (step S181) and determines its force information (step S182). Then, it outputs the force information (step S183), and enters into a state of waiting for a message from FO'59 (step S184).

Figure 47:
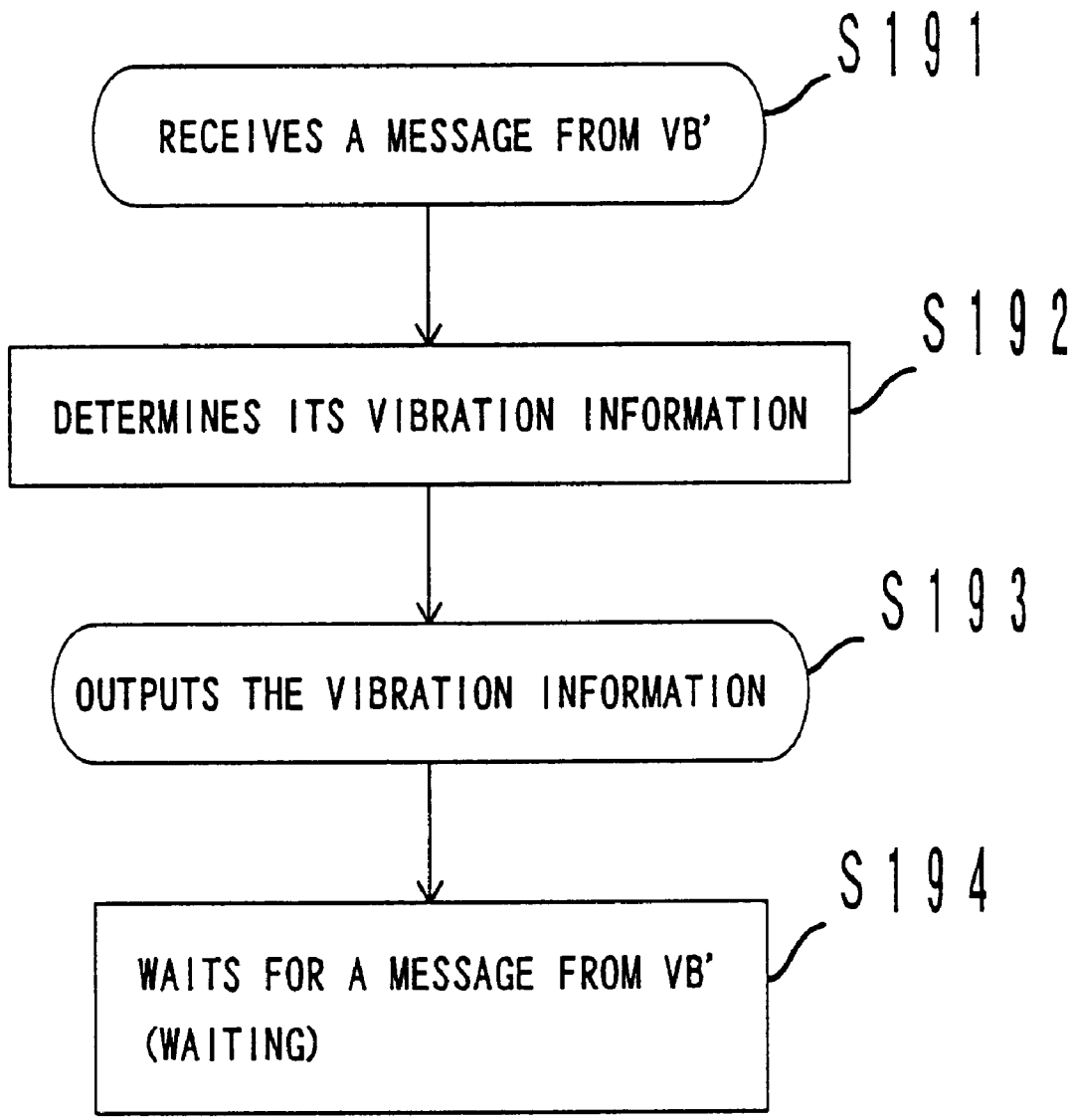
FIG. 47 is a flowchart showing the operation of the vibrator.

FIG. 47 is a flowchart showing the operation of VB45. VB45 starts to operate when receiving a message from VB'58 (step S191) and determines its vibration information (step S192). Then, it outputs the vibration information (step S193), and enters into a state of waiting for a message from VB'58 (step S194).

Figure 48:
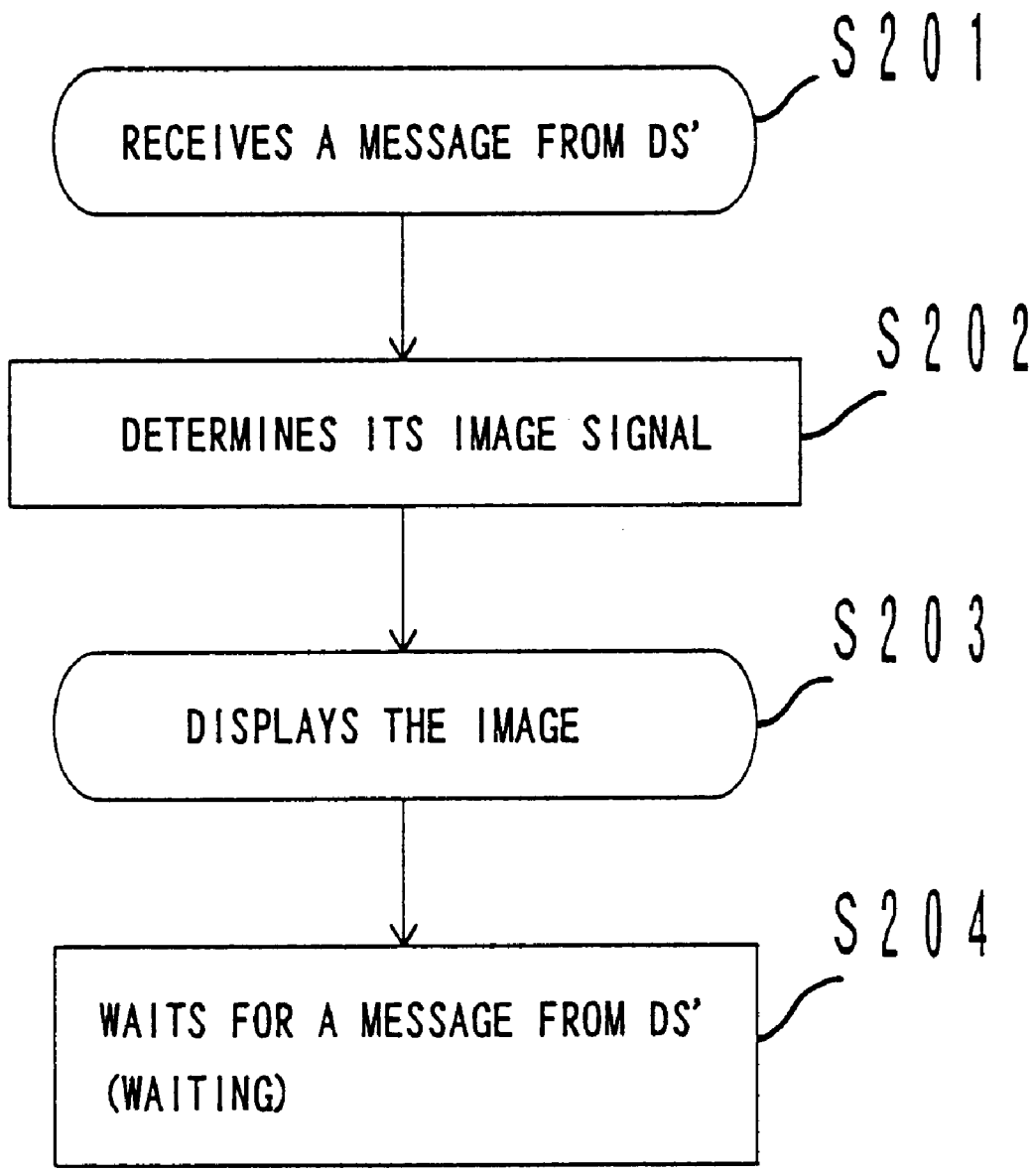
FIG. 48 is a flowchart showing the operation of the display.

FIG. 48 is a flowchart showing the operation of DS44. DS44 starts to operate when receiving a message from DS'57 (step S201) and determines its image signal (step S202). Then, it displays the image (step S203), and enters into a state of waiting for a message from DS'57 (step S204).

Figure 49:
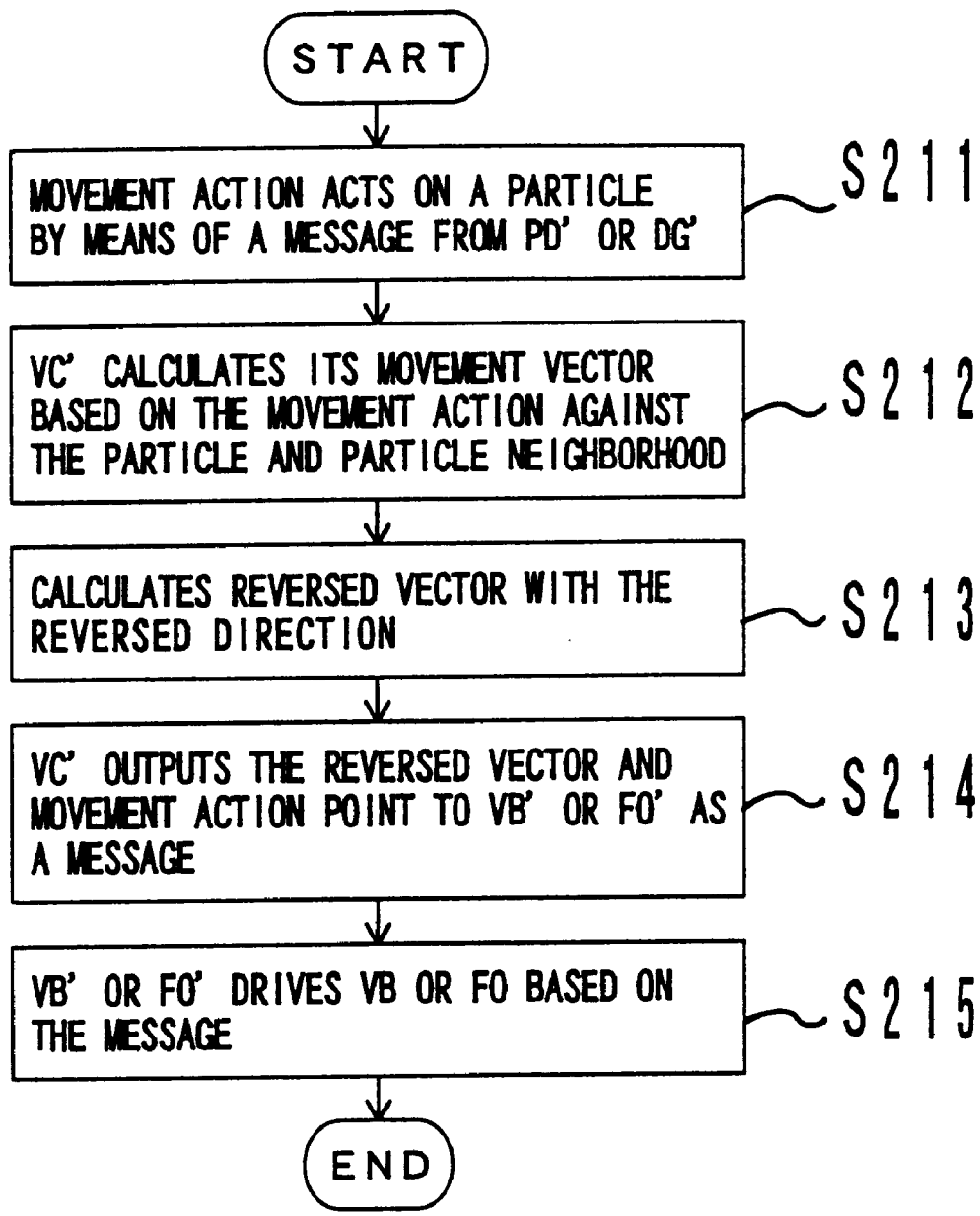
FIG. 49 is a flowchart showing the output process of the reaction.

FIG. 49 is a flowchart showing a simple example of outputting process of a reaction using the Virtuaclay system. When, according to a message from PD'51 or DG'52, a movement action acts on the particle of VC'56 (step S211), VC'56 calculates the movement vector v based on the movement action and the interaction of the particle neighborhood (step S212).

Figure 50:
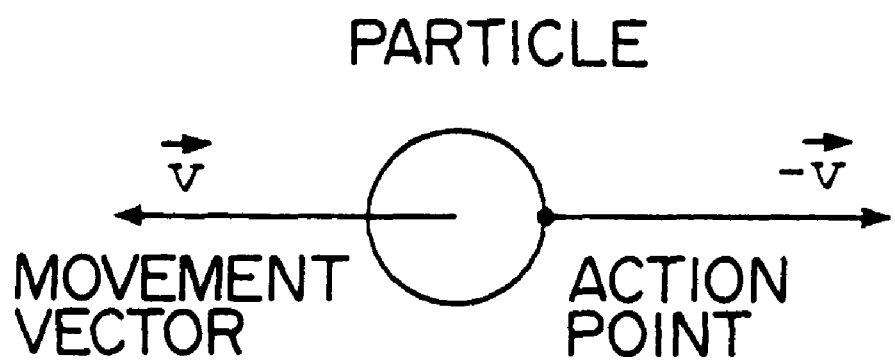
FIG. 50 shows the reaction.

Then, it calculates the reversed vector −v in which the direction of the movement vector v is reversed, as shown in FIG. 50 (step S213), and outputs the information on the reversed vector −v and the action point of the movement action to VB'58 or FO'59 as a reaction message (step S214). When VB'58 or FO'59 receives this message, it drives VB45 or FO46 according to the information (step S215) and terminates the process.

Figure 51:
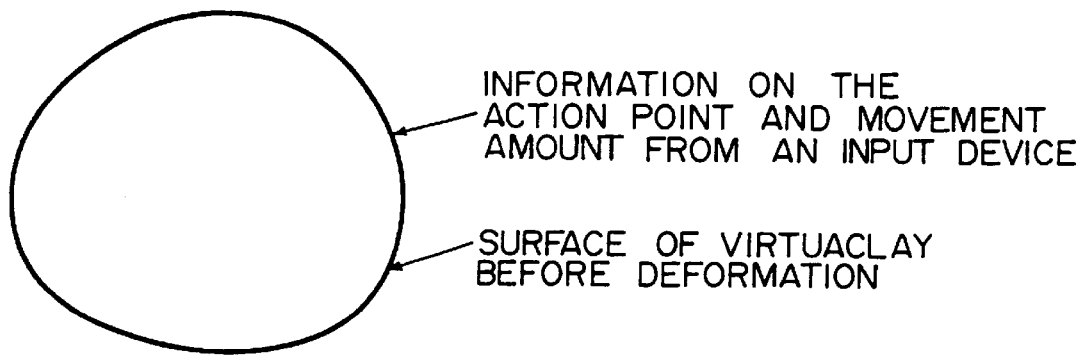
FIG. 51 shows the virtual clay before deformation.

FIGS. 51 to 55 show the deforming operation on the Virtuaclay based on the process described above. FIG. 51 shows the outer form of the Virtuaclay displayed on DS44, and the user can deform this Virtuaclay by operating PD41, DG42 or FI43.

The Virtuaclay not only directly receives the action from PD41, DG42 and FI43, but also receives action based on the operation on the operation panel displayed on DS44. From these input devices the action point and movement amount of the deforming operation are input.

The operation of PD41, DG42 and FI43 by the user is converted to signals by the operation shown in FIGS. 24, 25 and 26 and is transmitted to the control objects PD'51, DG'52 and FI'53 of these devices.

PD'51, DG'52 and FI'53 convert signals from the input devices to operation messages for VC'56 by the processes shown in FIGS. 27, 28 and 29, respectively. These objects generate messages for the deforming operation by judging the state of the input device and its operating requirements, and transmit them to VC'56. An operation message for OP'54 is also transmitted if necessary.

OP'54 determines events generated by the operation of the input devices by the process shown in FIG. 30, generates a message for VC'56 (deformation message in the context of the deforming operation), and transmits it.

Figure 52:
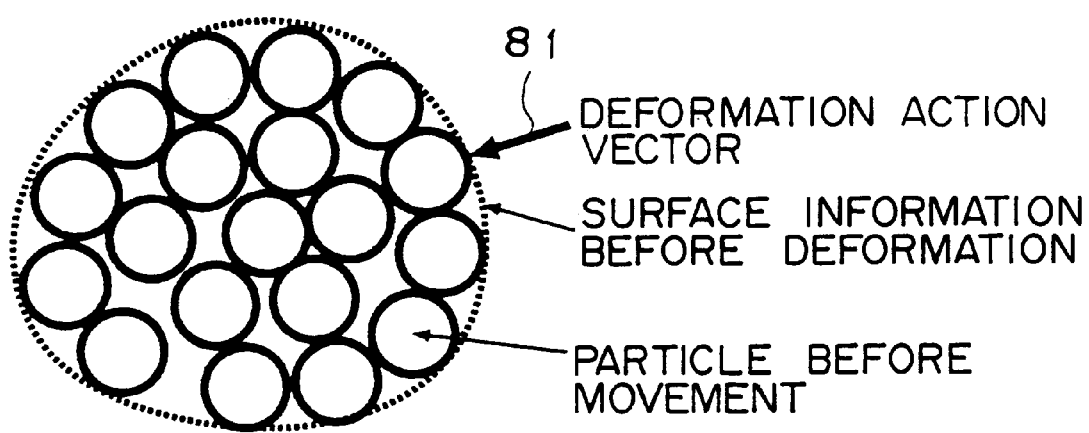
FIG. 52 shows the particles in the virtual clay.

FIG. 52 shows the particles composing the Virtuaclay shown in FIG. 51. This Virtuaclay has the surface information before deformation and the information on virtual particles before the movement due to the deformation action. The deforming operation is described below referring to the flowchart shown in FIG. 31.

For the first stage of the deforming operation VC'56 receives messages from each object of PD'51, DG'52, FI'53 and OP'54 (step S101), processes the contents of the messages, determines the action point and movement amount of its moving operation (step S102), starts the deforming operation and generates the deformation action vector 81 (step S103).

Figure 53:
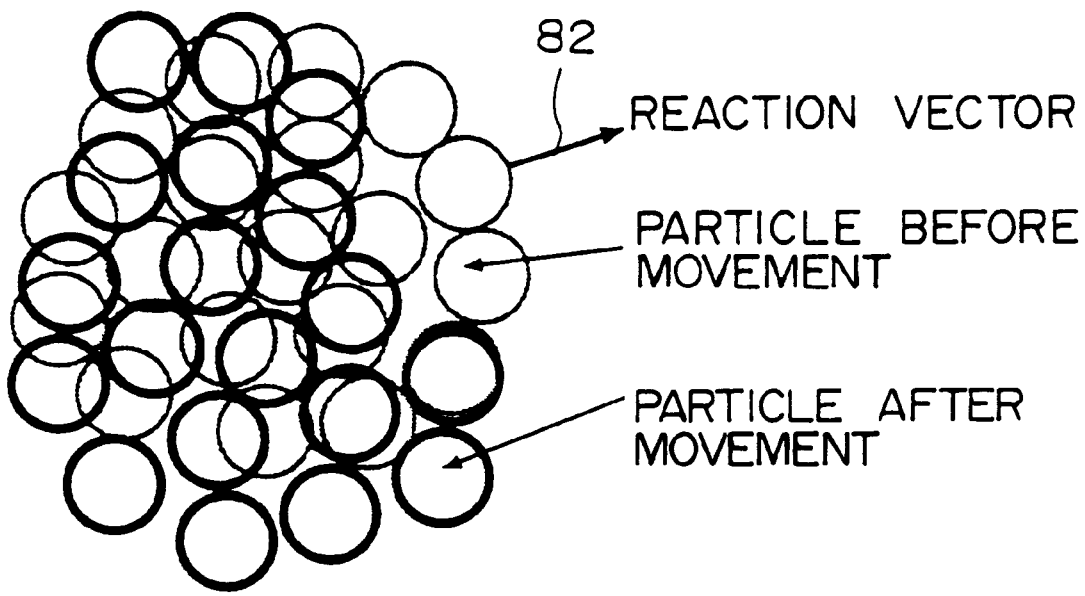
FIG. 53 shows the movement of the particles.

Then, for the second stage, VC'56 executes the movement process of particles as shown in FIG. 53 (step S104), determines its reaction (step S105), and updates the position of each particle (step S106). FIG. 53 shows the position of particles before the movement, the position of particles after the movement and the reaction vector 82.

Figure 54:
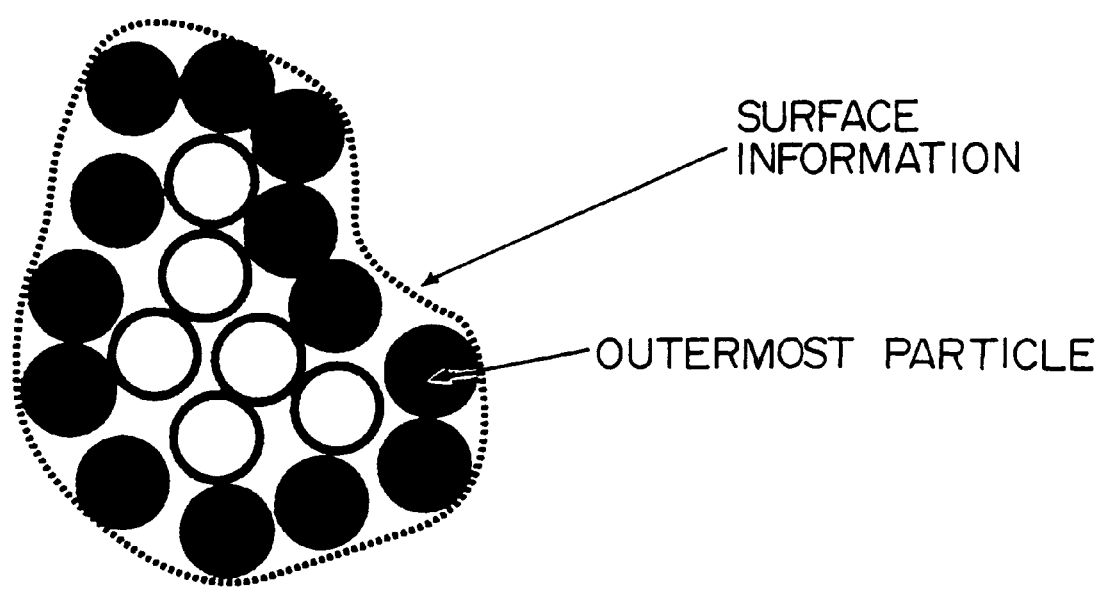
FIG. 54 shows the outermost particles.

Then, for the third stage, VC'56 updates the outermost particles as shown in FIG. 54 (step S107) and updates the surface information of the Virtuaclay (step S108). In this stage VC'56 transmits the surface information to DS'57 as a message (step S109) and transmits the reaction to VB'58 or FO'59 as a message (step S110).

When FO'59 or VB'58 receives a message for the reaction from VC'56, it processes the message according to the process shown in FIGS. 43 and 44, and transmits an operation message to FO46 and VB45. When DS'57 receives the message of the surface information from VC'56, it executes the rendering of the Virtuaclay surface, generates an image signal and transmits it to DS44 as a message by the process as shown in FIG. 45.

Output devices FO46, VB45 and DS44 receive messages from their corresponding control objects FO'59, VB'58 and DS'57, respectively. FO46, VB45 and DS44 present the force information to the user according to the operation shown in FIG. 46, present the vibration information to the user by the operation shown in FIG. 47, and display the image of the Virtuaclay by the operation shown in FIG. 48, respectively. Thus, the surface of the Virtuaclay after the deformation is displayed on the screen of DS44 as shown in FIG. 55.

Figure 55:
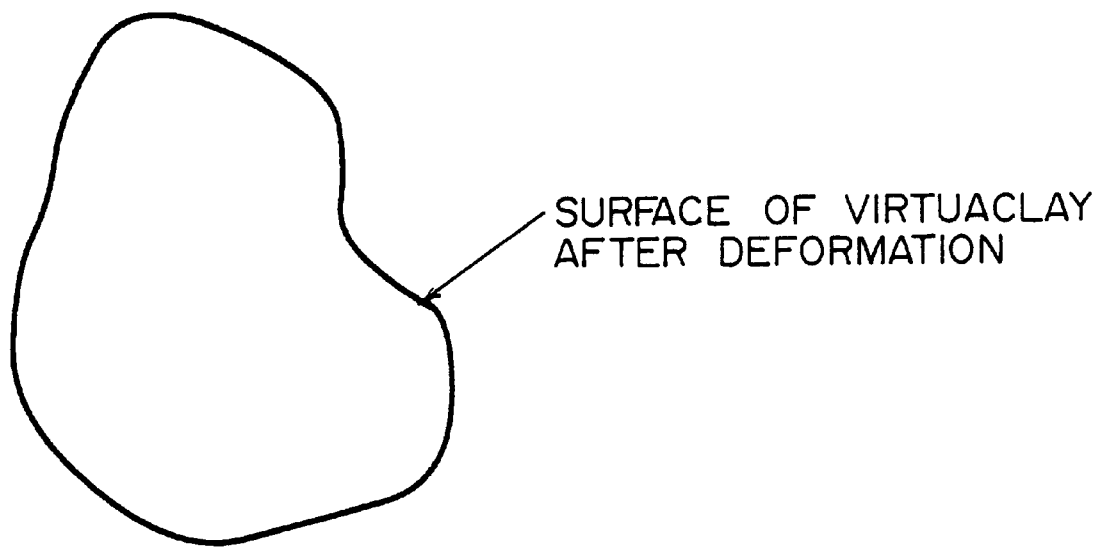
FIG. 55 shows the virtual clay after deformation.
Figure 56:
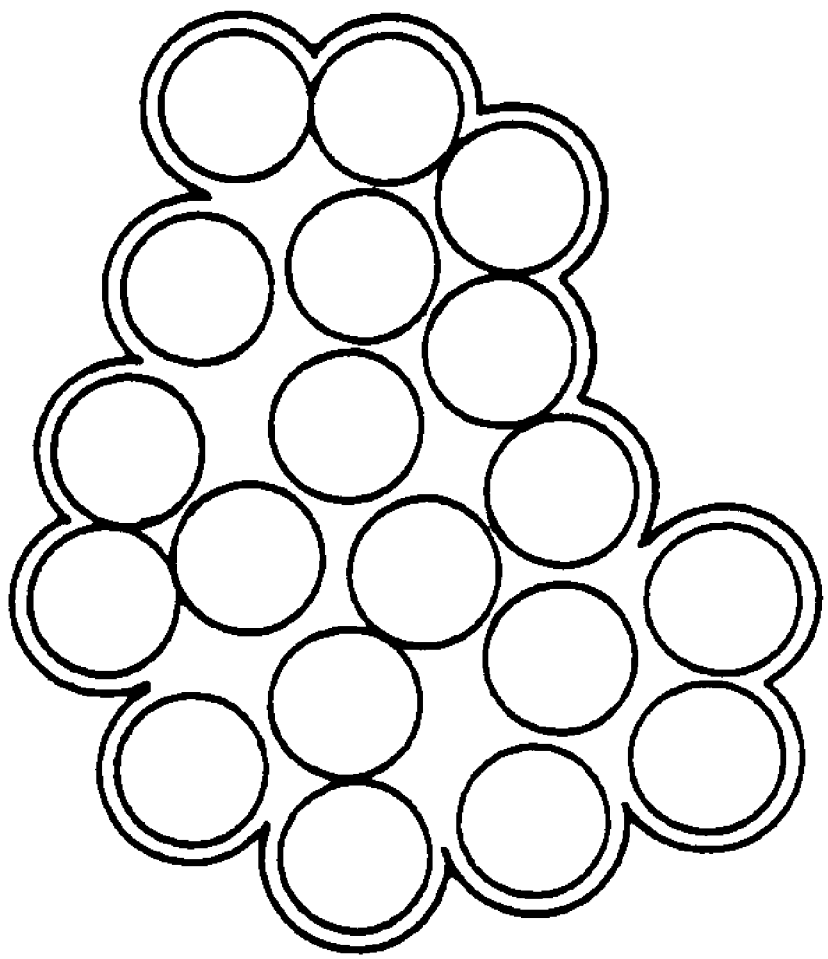
FIG. 56 shows the film along the surface of particles.
Figure 57:
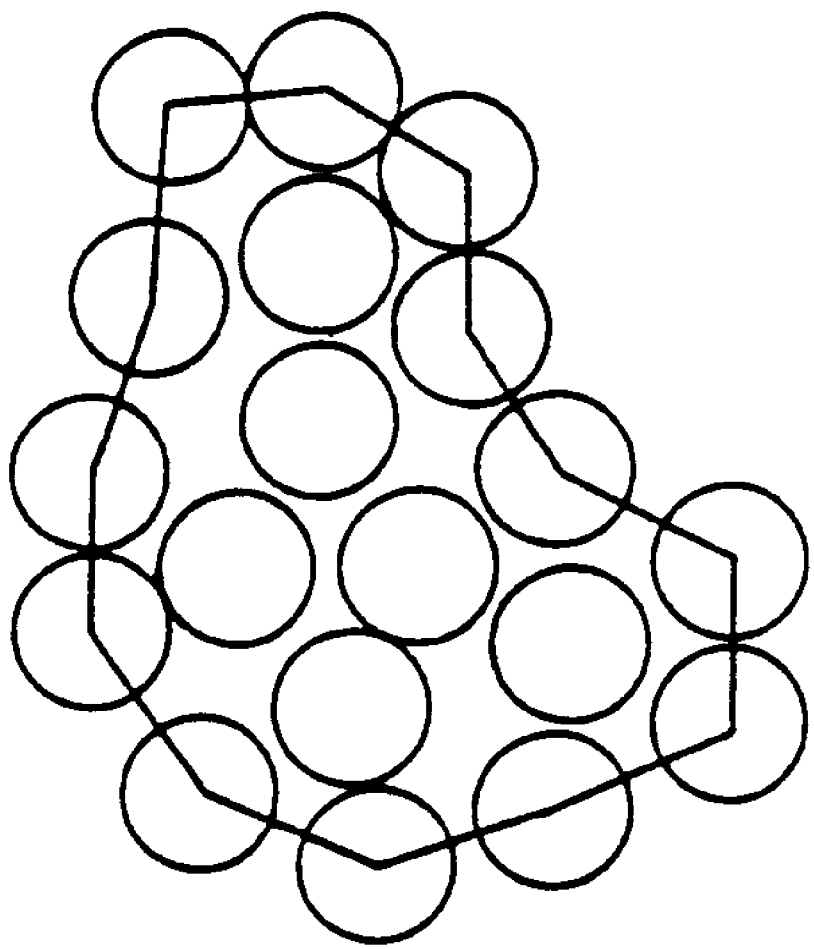
FIG. 57 shows the film of the polyhedron.

The film of the Virtuaclay is not limited to a smooth curved plane as shown in FIG. 55, and it can take any shape based on the position after the displacement of the particles. For example, it can be a curved plane along the surface of the outermost particles as shown in FIG. 56, or it can be a polyhedron with the centers of the outermost particles as vertices, as shown in FIG. 57.

Figure 58:
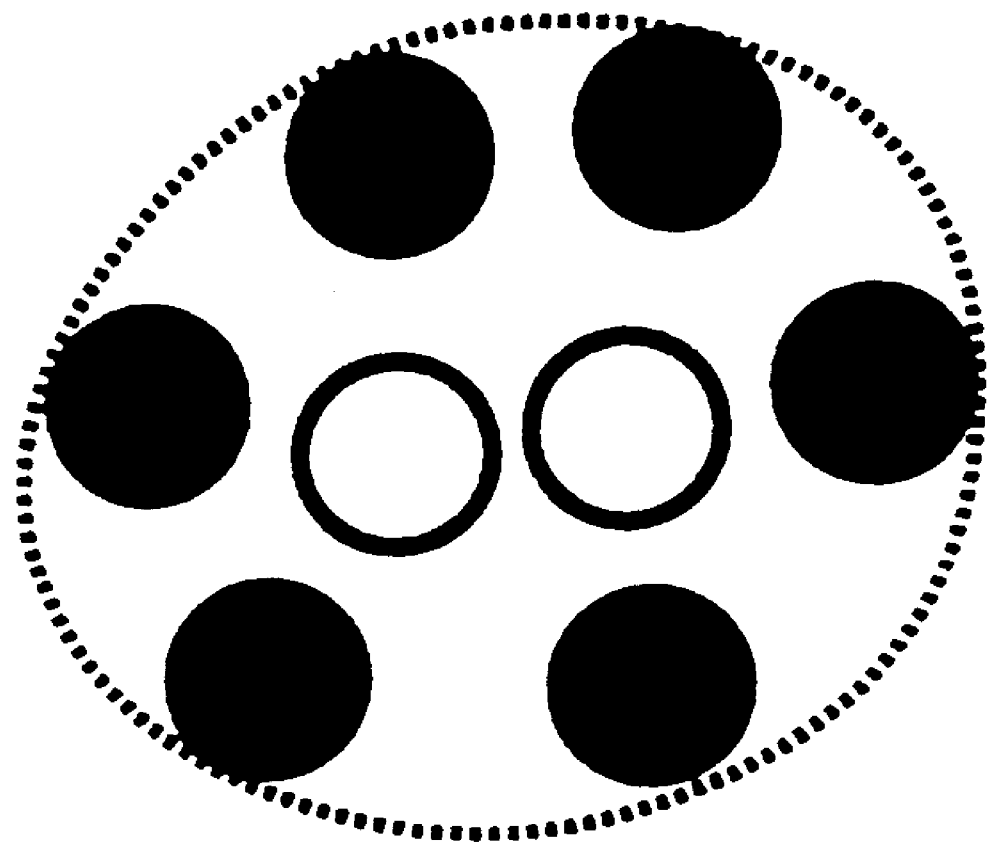
FIG. 58 shows the first step of "tearing-off".
Figure 59:
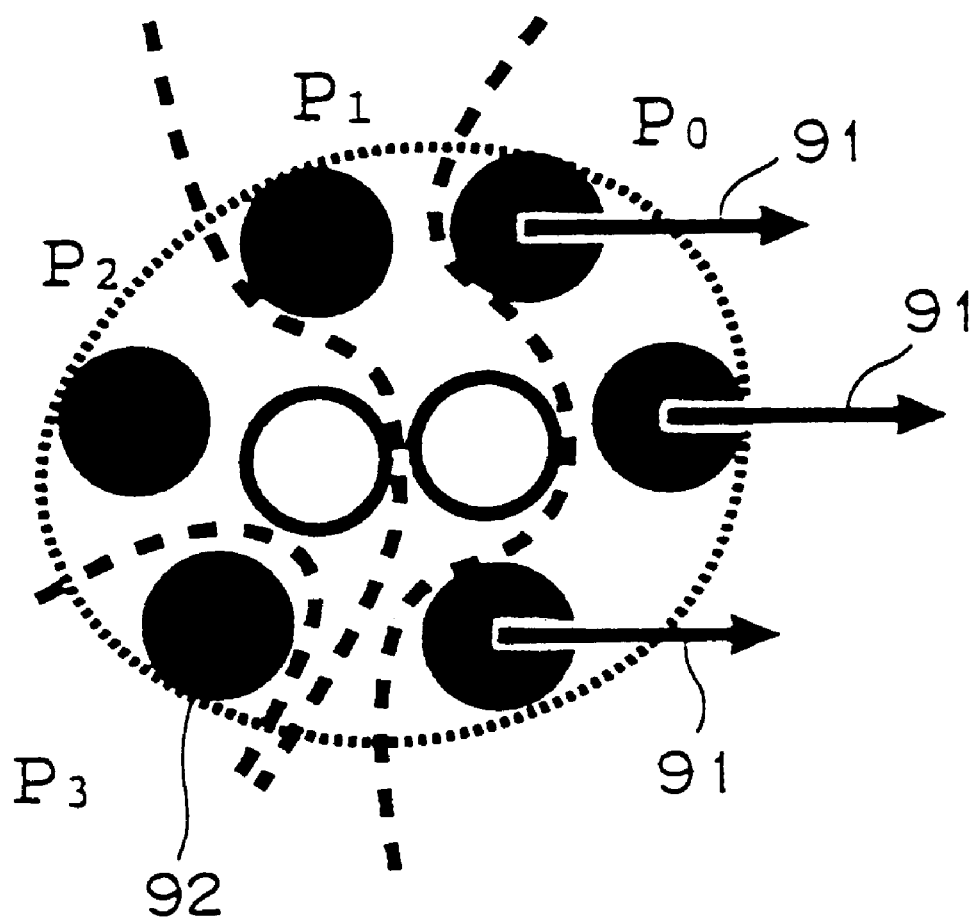
FIG. 59 shows the second step of "tearing-off".

Next, FIGS. 58 to 68 show examples of the deforming operation in the case where the Virtuaclay is torn off in a virtual world as shown in FIG. 12. If the particles of the Virtuaclay are arranged as shown in FIG. 58 at a time $t_{s-1}$, VC'56 first decides a particle layer $P_0$ which is a direct target of the "tearing-off" operation, and assigns the same movement vector 91 to each particle of the layer, as shown in FIG. 59. Then, it decides particle layers $P_1$, $P_2$ and $P_3$ which become units of movement. The position of the particle 92 in a layer $P_3$ placed farthest away from a layer $P_0$ is fixed.

Figure 60:
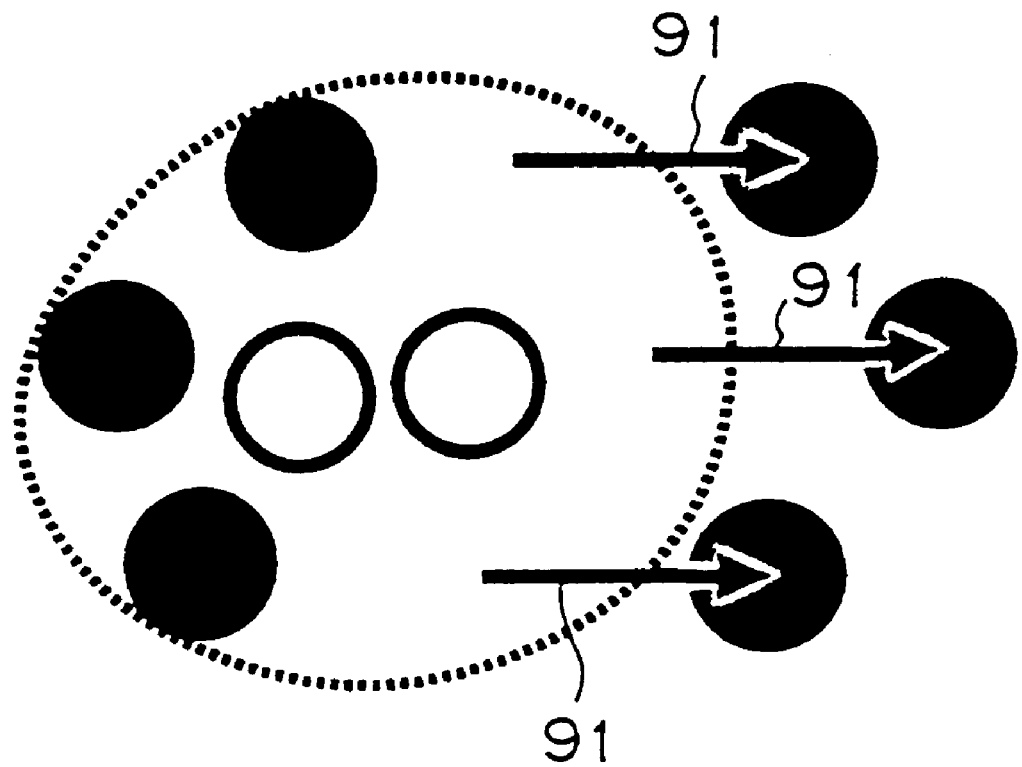
FIG. 60 shows the third step of "tearing-off".
Figure 61:
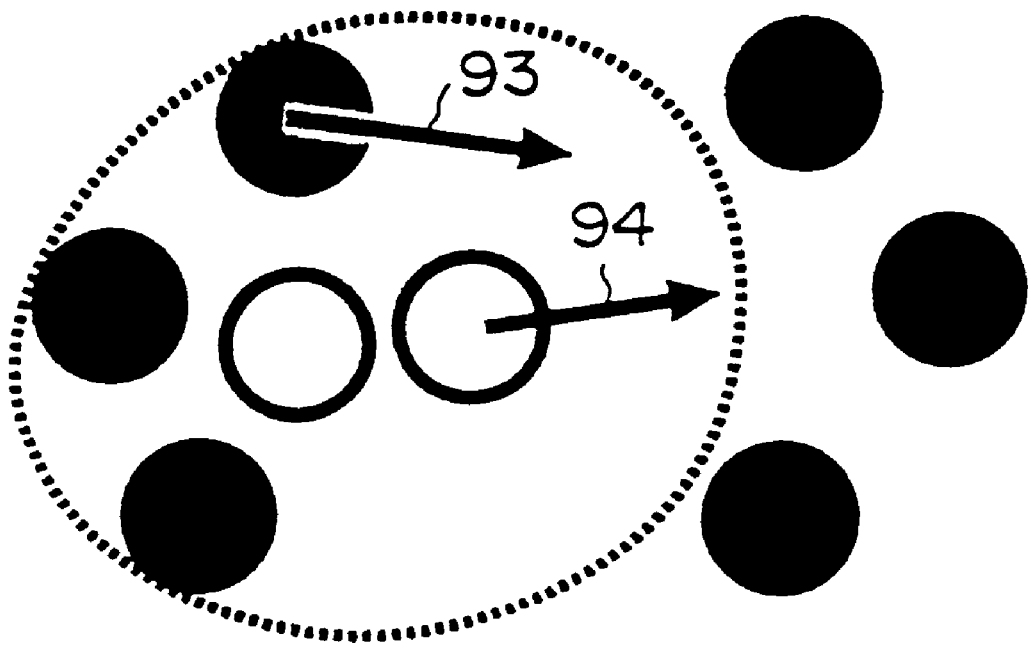
FIG. 61 shows the fourth step of "tearing-off".

Then, VC'56 temporarily moves the particles in the layer $P_0$ using the movement vector 91 as shown in FIG. 60. Since in this case all the particles move in parallel and there is no need to correct their positions, the temporary destination is determined as their next positions as they are. Then, it decides the movement vector 93 and 94 of the next layer $P_1$ as shown in FIG. 61. The directions of these vectors are decided depending on the vector 91 of the previous layer.

Figure 62:
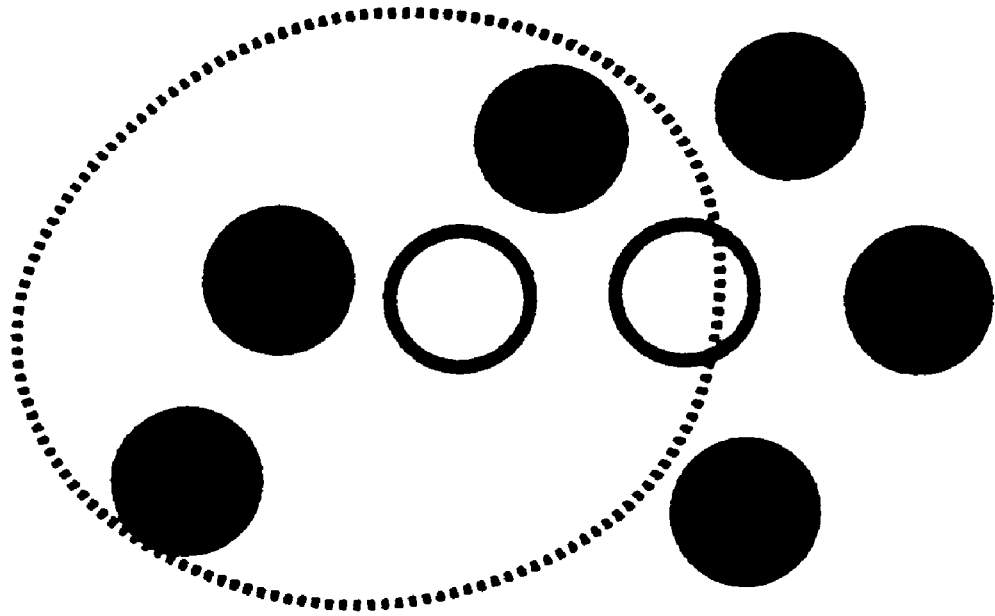
FIG. 62 shows the fifth step of "tearing-off".

In this way, VC'56 calculates movement vectors of each layer in order and decides the temporary positions of all particles. If there is any overlapping of the particles, it corrects their positions. In this example there is no overlapping nor correction. As a result the positions of the particles are as shown in FIG. 62.

Figure 63:
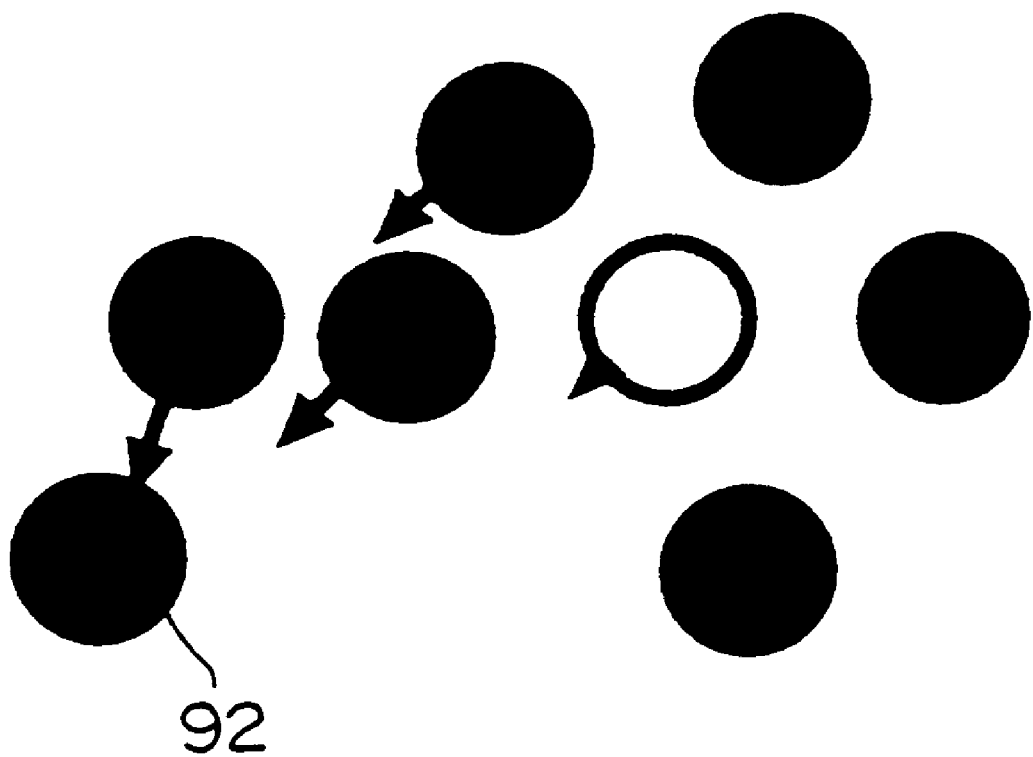
FIG. 63 shows the sixth step of "tearing-off".
Figure 64:
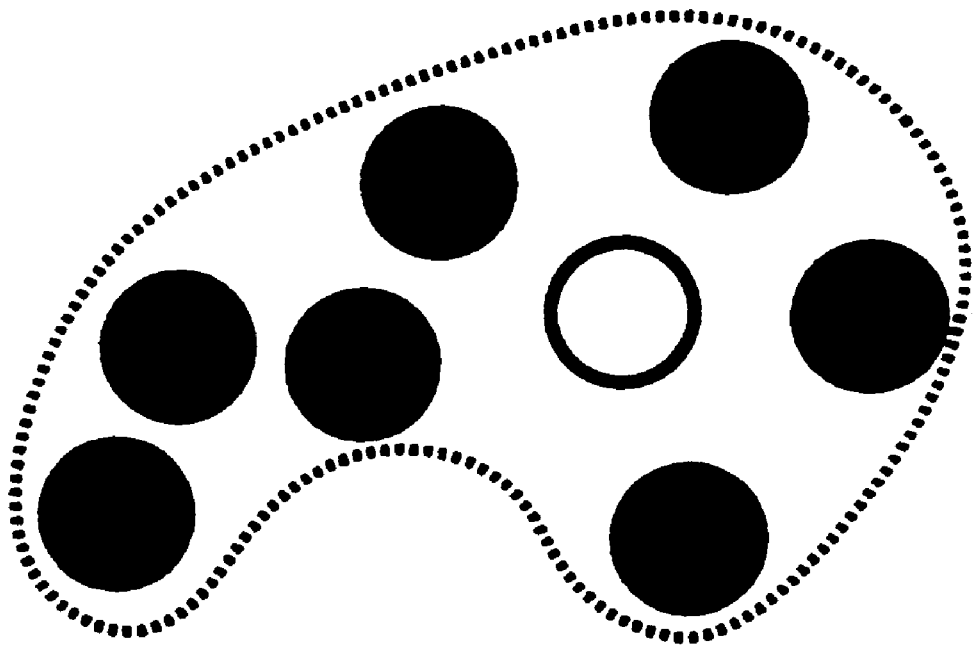
FIG. 64 shows the seventh step of "tearing-off".

Then, VC'56 synthesizes the reactions due to the fixing of the particle 92 in the layer $P_3$ and moves related particles as shown in FIG. 63. This reaction is decided by means of an interaction between particles such as viscosity, etc. Then, it adjusts the position of each particle, decides the outermost particles, and calculates the film. As a result, the shape of the Virtuaclay at a time $t_s$ becomes as shown in FIG. 64.

Figure 65:
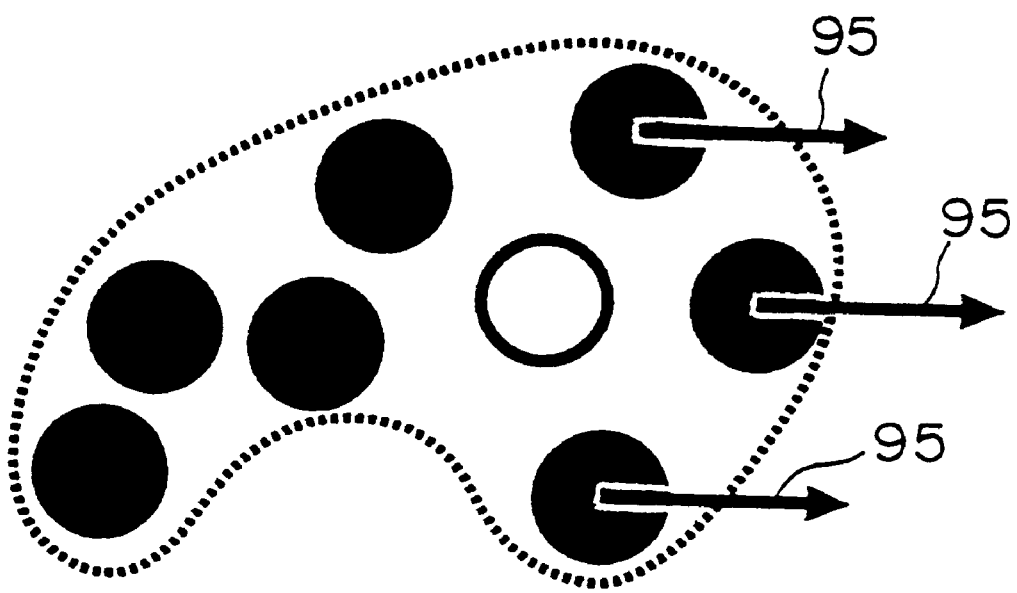
FIG. 65 shows the eighth step of "tearing-off".
Figure 66:
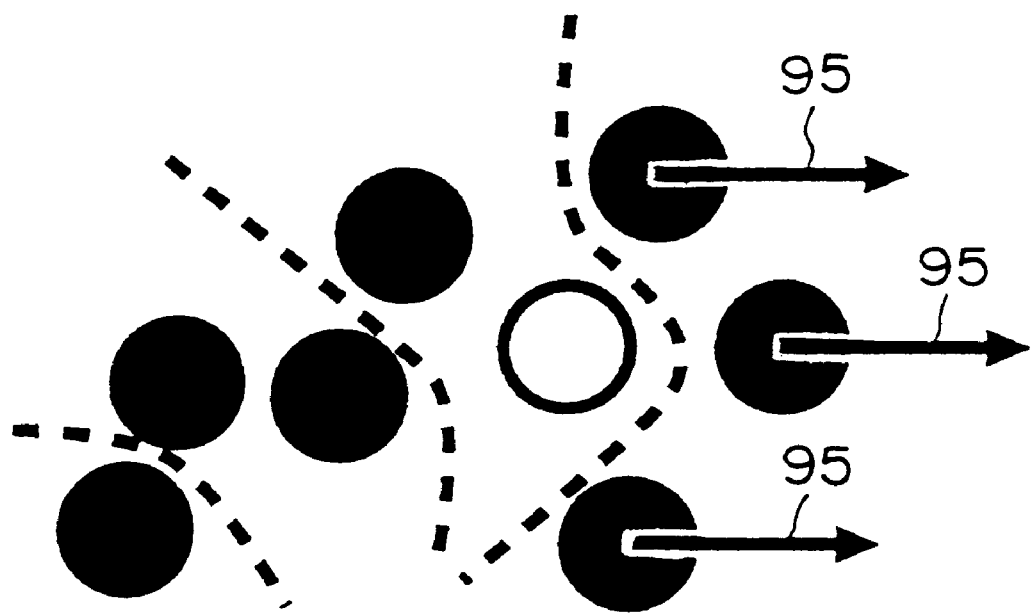
FIG. 66 shows the ninth step of "tearing-off".
Figure 67:
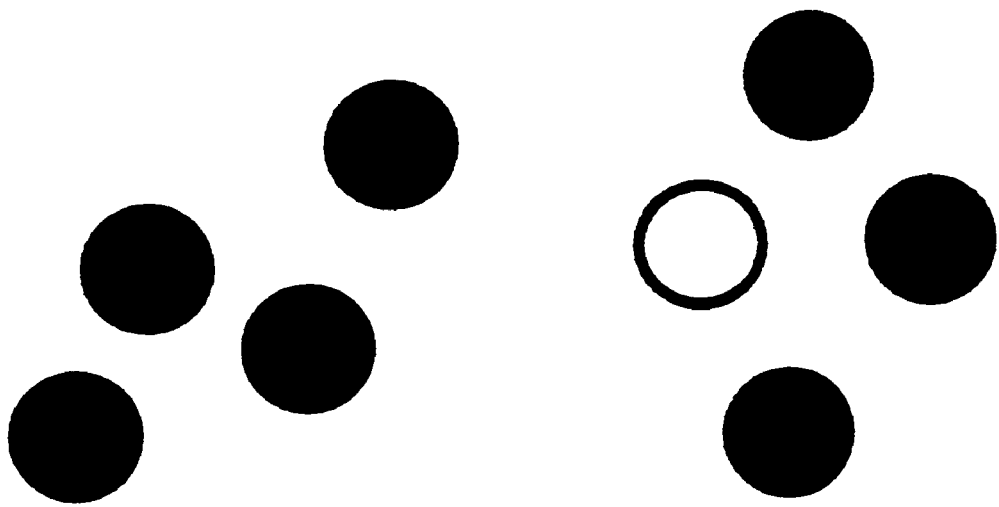
FIG. 67 shows the tenth step of "tearing-off".

When the "tearing-off" operation further continues at a time $t_s$, VC'56 calculates movement vectors 95 as shown in FIG. 65, calculates particle layers as shown in FIG. 66 and executes their temporary movement. Then, it calculates their reaction and decides the position of each particle at a time $t_{s+1}$ as shown in FIG. 67.

Figure 68:
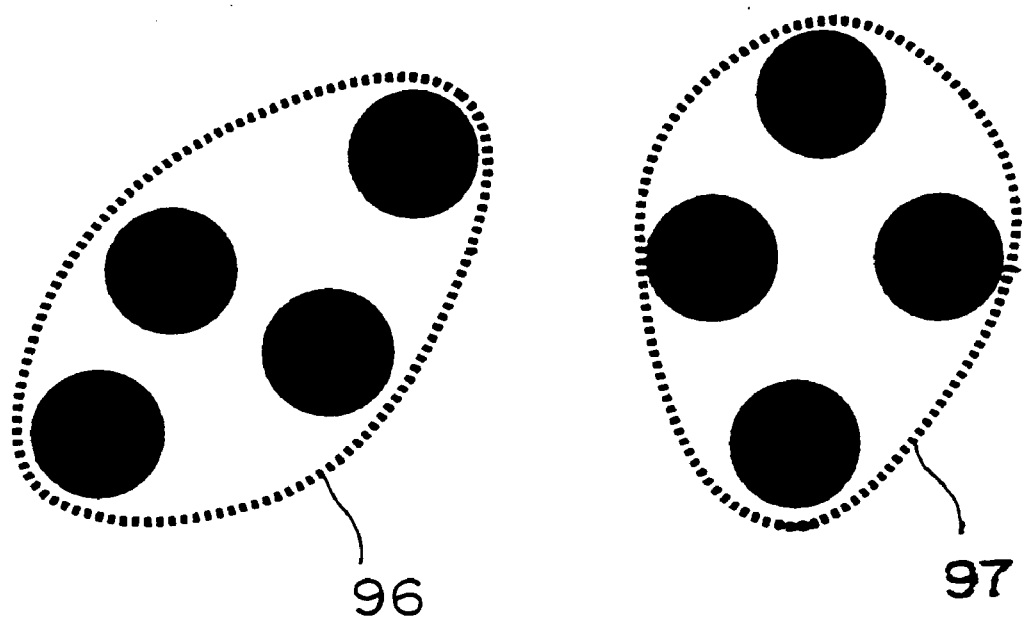
FIG. 68 shows the eleventh step of "tearing-off".

Then, VC'56 decides the outermost particles and calculates the film. At this time particles separated by more than a certain distance shall be handled as different particle aggregates and covered with different films. As a result the shape of the Virtuaclay at a time $t_{s+1}$ is represented by two films 96 and 97 as shown in FIG. 68. Thus, the Virtuaclay shown in FIG. 58 is divided into two.

Figure 69:
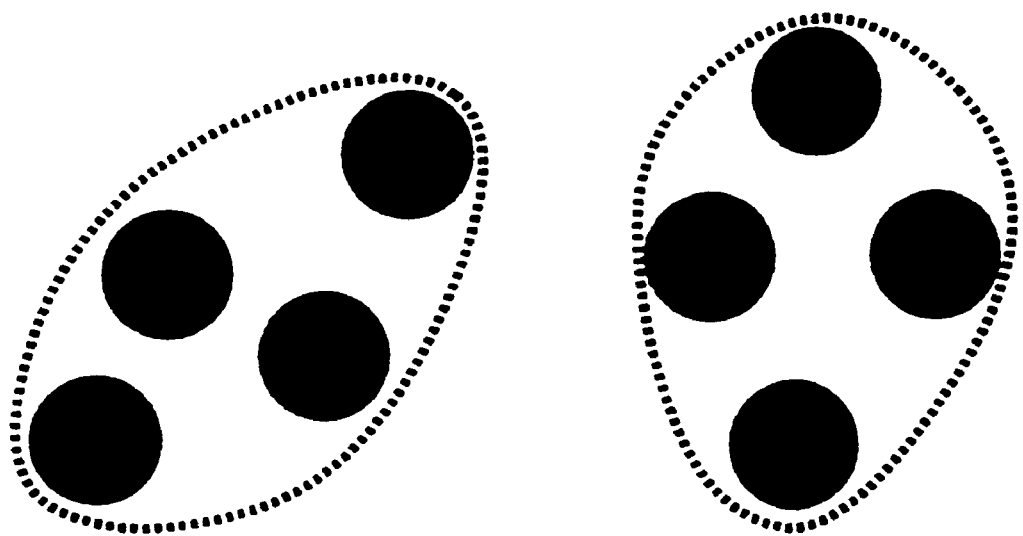
FIG. 69 shows the first step of "joining".
Figure 70:
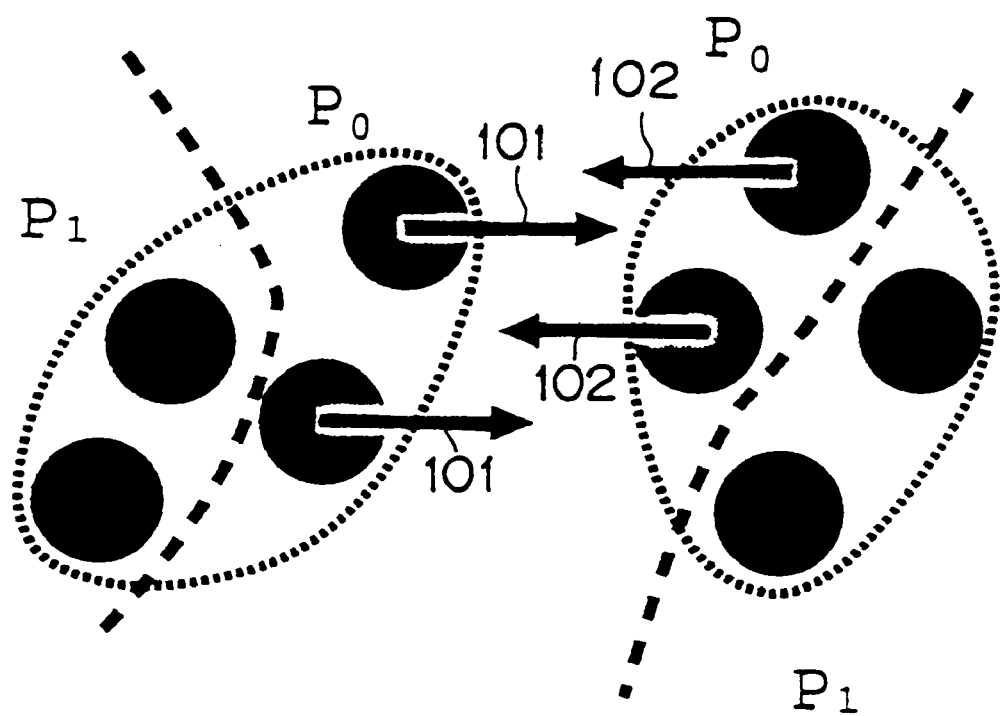
FIG. 70 shows the second step of "joining".

FIGS. 69 to 75 show an example of the deforming operation in the case where the Virtuaclay is joined in a virtual world as shown in FIG. 10. If each particle of the Virtuaclay is arranged as shown in FIG. 69 at a time $t_{s+1}$, VC'56 first decides a particle layer $P_0$ which is the direct target of "joining" operation as shown in FIG. 70, and assigns movement vectors 101 and 102 to each particle of the layer. Then, it decides another particle layer $P_1$, which becomes the units of movement.

Figure 71:
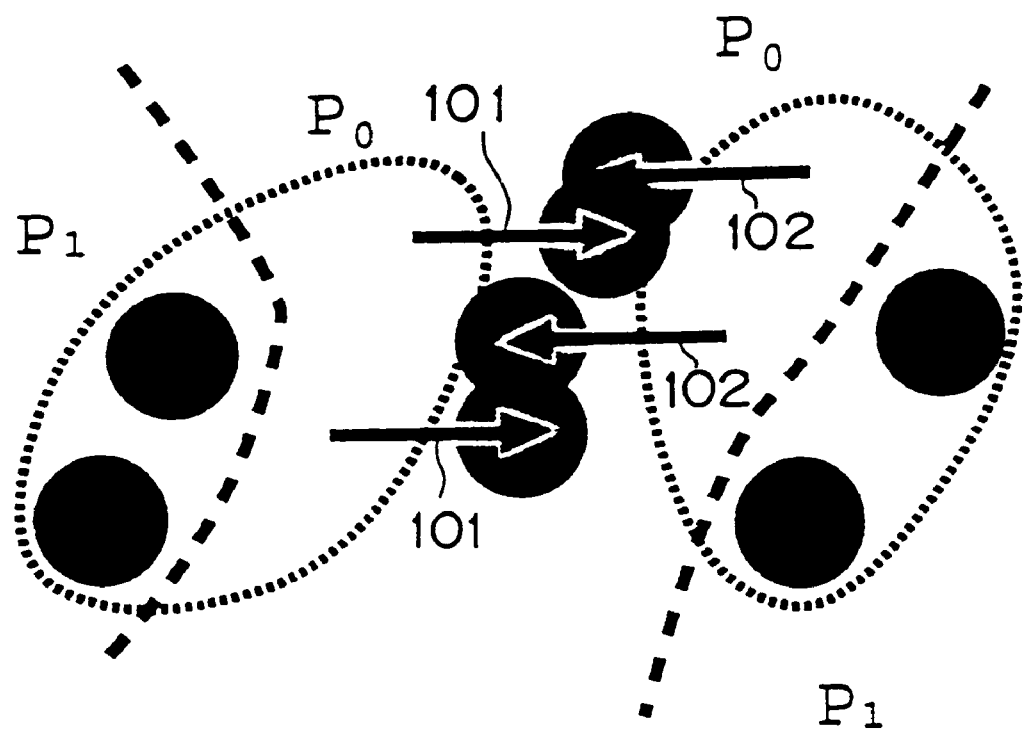
FIG. 71 shows the third step of "joining".
Figure 72:
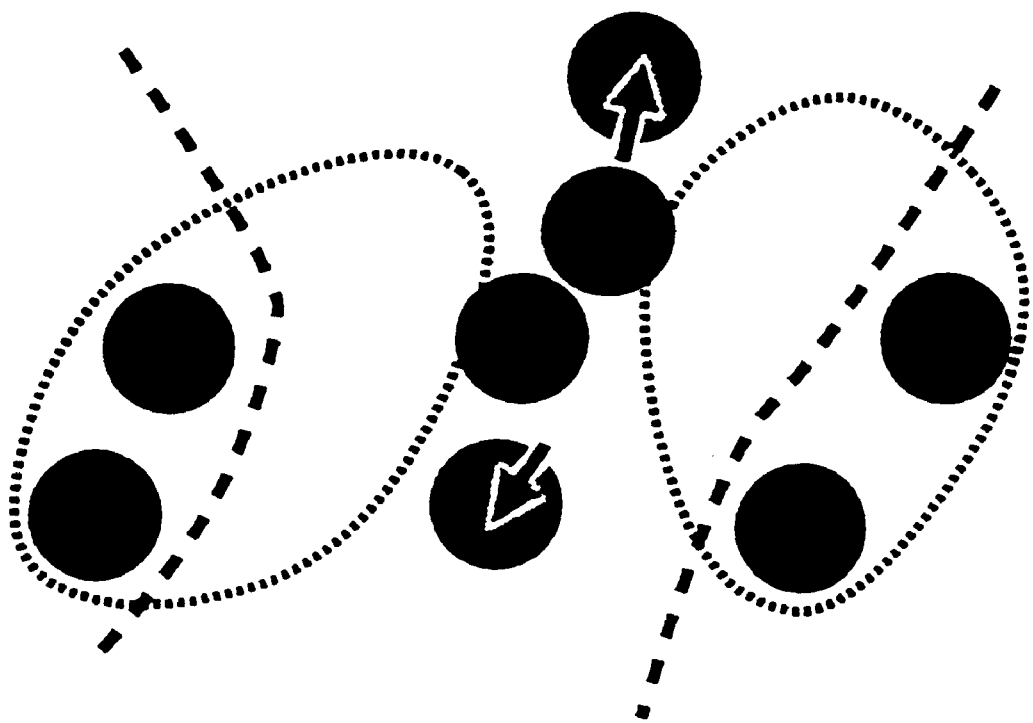
FIG. 72 shows the fourth step of "joining".

Then, VC'56 moves the particles of the layer $P_0$ by means of the movement vectors 101 and 102 as shown in FIG. 71, and corrects their positions so that there may be no overlapping as shown in FIG. 72.

Figure 73:
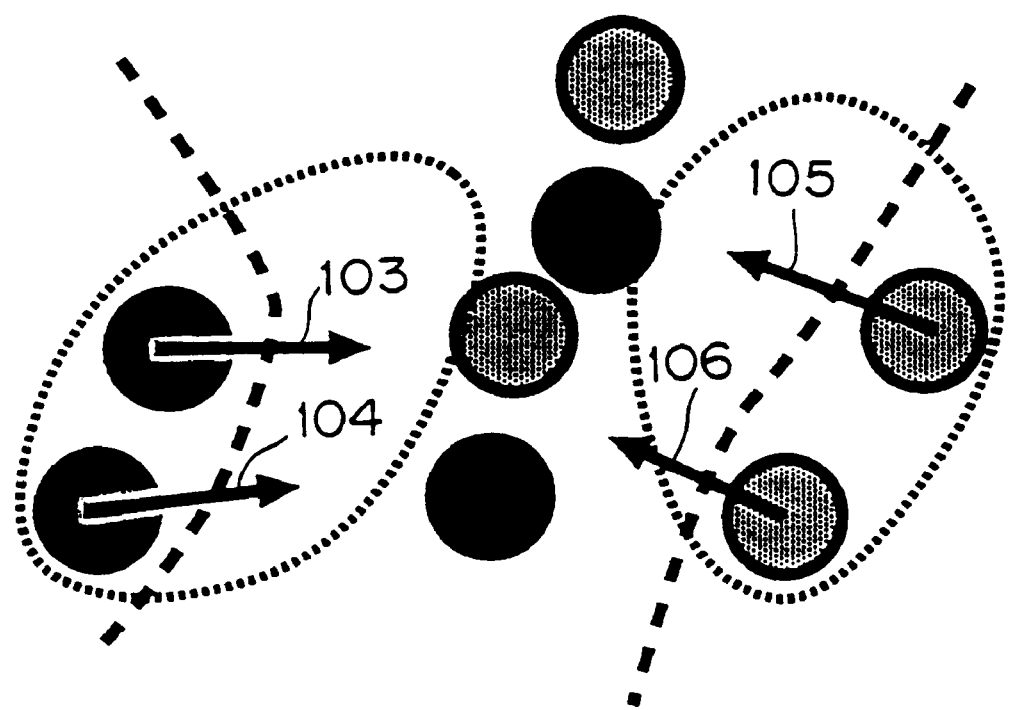
FIG. 73 shows the fifth step of "joining".
Figure 74:
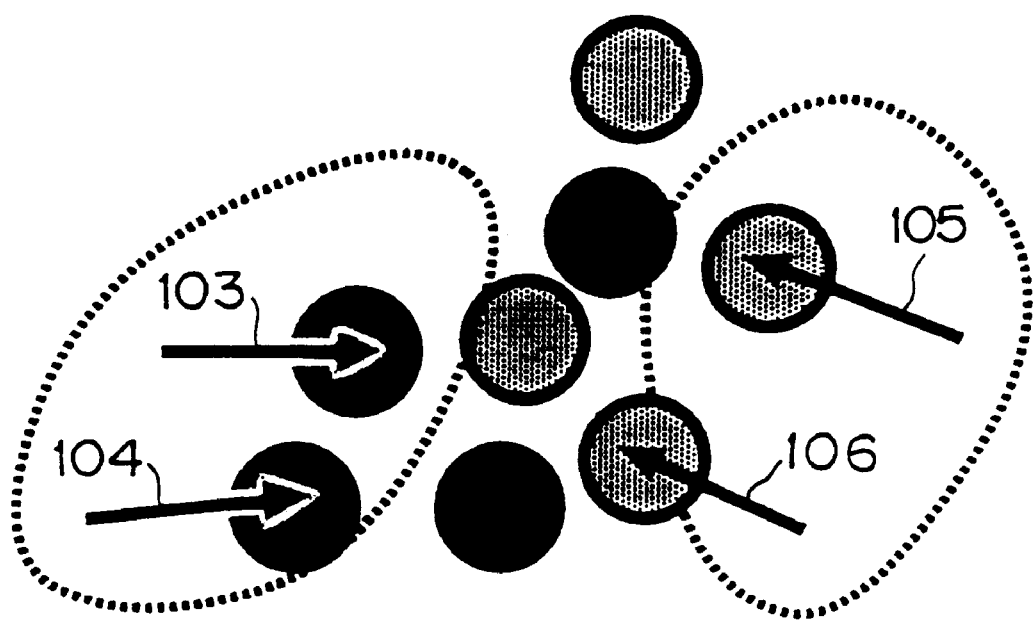
FIG. 74 shows the sixth step of "joining".

Then, it decides the movement vectors 103, 104, 105 and 106 of the next layer $P_1$ as shown in FIG. 73. The directions of these vectors are decided depending on the vectors 101 and 102 of the previous layer. Then, it temporarily moves the particles in the layer $P_1$ by means of the movement vectors 103, 104, 105 and 106 as shown in FIG. 74. Since there is no overlapping of particles, there is no correction.

Figure 75:
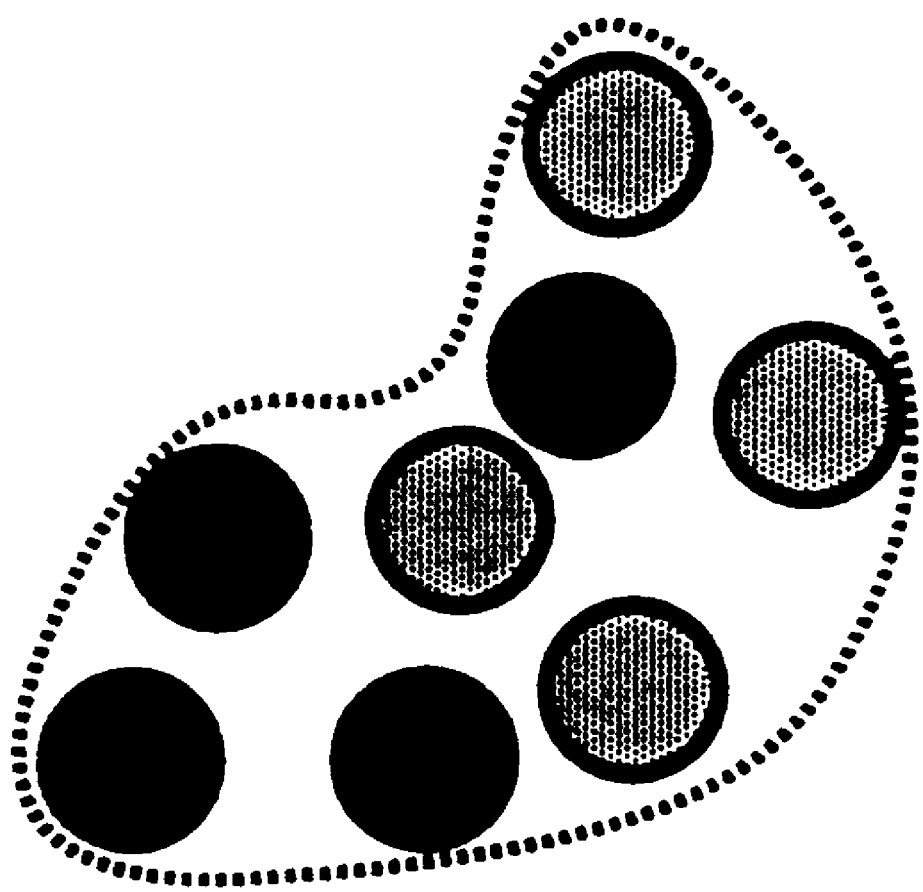
FIG. 75 shows the seventh step of "joining".

Then, VC'56 decides the outermost particles and calculates the film. As a result, the shape of the Virtuaclay at a time $t_s$ becomes as shown in FIG. 75 and the two Virtuaclay in shown in FIG. 69 are joined.

Figure 76:
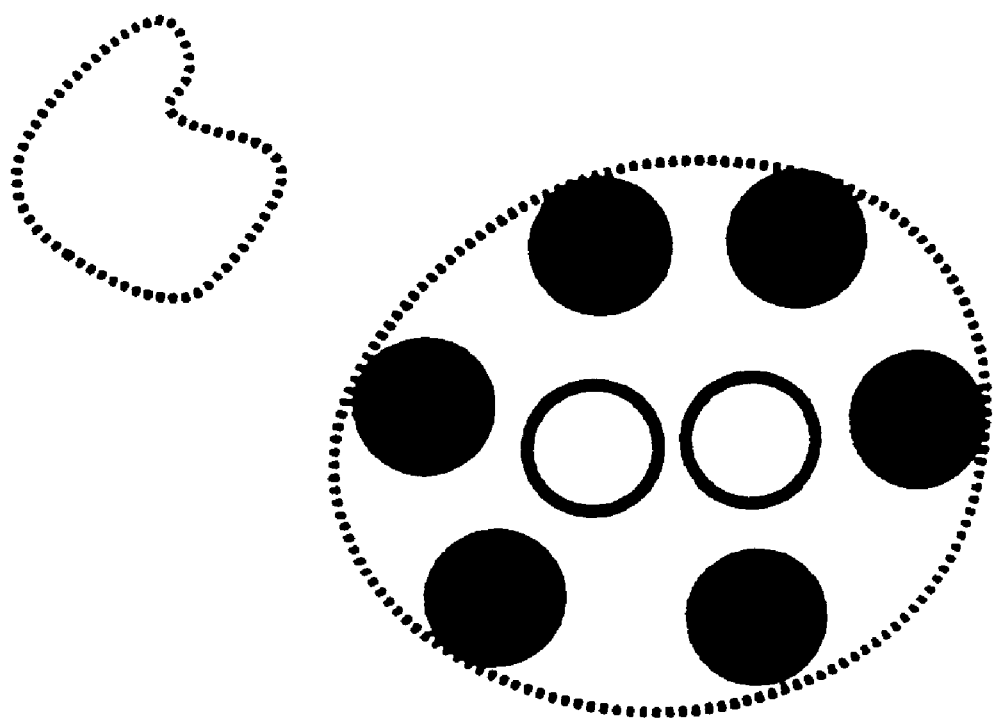
FIG. 76 shows the first step of the translating movement.
Figure 77:
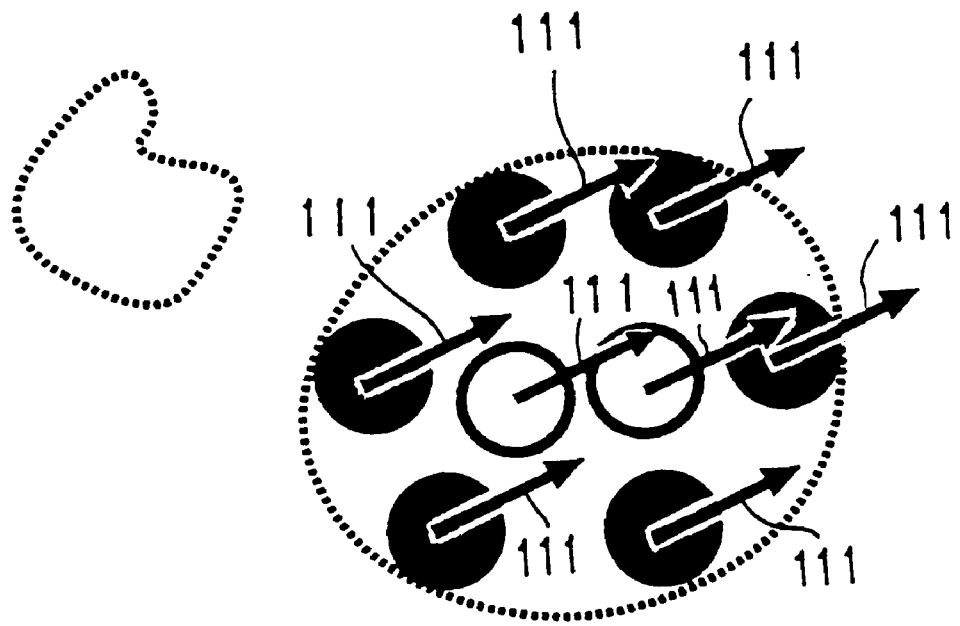
FIG. 77 shows the second step of the translating movement.
Figure 78:
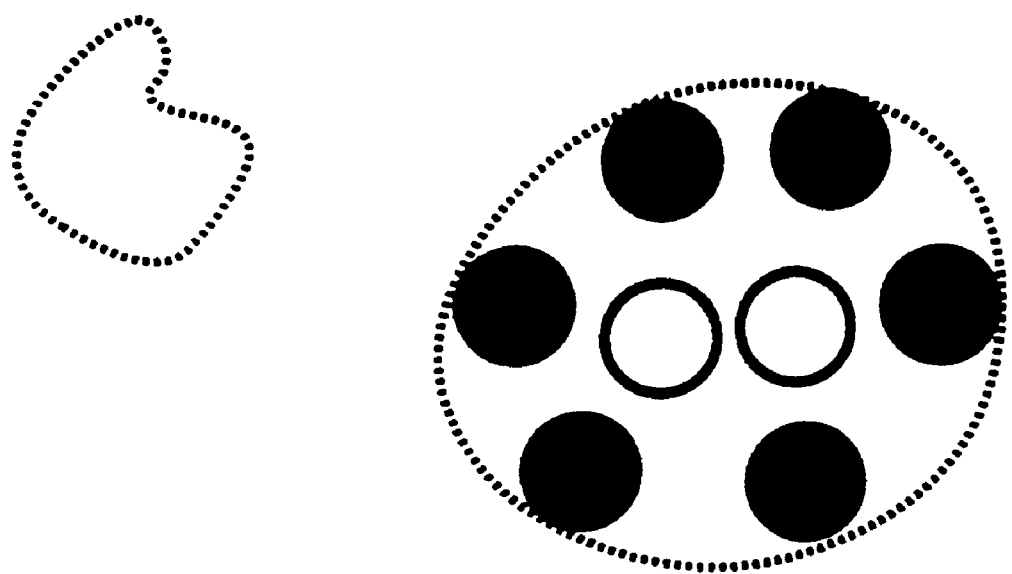
FIG. 78 shows the third step of the translating movement.

FIGS. 76 to 78 show an example of the operation in the case where Virtuaclay are moved in parallel. If each particle of the Virtuaclay is arranged as shown in FIG. 76 at a time $t_{s-1}$, VC'56 first assigns the same movement vector 111 to all the particles, as shown in FIG. 77.

Then, VC'56 temporarily moves each particle by means of the movement vectors 111. Since there is no need to correct the positions when moving in parallel, the temporary destination is determined as the next position. Then, it decides the outermost particles and calculates the film. As a result, the Virtuaclay at a time $t_s$ becomes as shown in FIG. 78.

Although in the embodiment described above, PD'51, DG'52, FI'53, GS'55, VC'56, DS'57, VB'58 and FO'59 shown in FIG. 13 are assumed to be realized by using an object-oriented programming, the present invention is not limited to this, and any programming method can also be used. The input/output unit is not limited to PD41, DG42, FI43, DS44, VB45 and FO46, and any other device such as a keyboard, printer, etc. can also be used.

Furthermore, the Virtuaclay system can also be constructed on the host computer connected with a user terminal through a communication network and accessed from the user terminal. In this case, the user terminal is provided with a necessary input/output unit and input/output information is exchanged through the network.

By using the present invention the shape of an object displayed on the screen can be easily modified with a simple operation and the shape can be efficiently simulated. Various kinds of feature can also be defined for the particles composing the object and various kinds of simulation become available.

What is claimed is:

1. A virtual clay system utilizing a computer, comprising:
   memory means for storing particle aggregate data representing an aggregate of virtual particles and position data representing a position of each particle in the aggregate;
   shape-generating means for generating shape data representing a shape of the aggregate;
   input means for inputting designation information on the aggregate from a user;
   deforming means for dynamically changing the shape of the aggregate by modifying a position of at least some of the particles in the aggregate according to the designation information; and
   output means for outputting shape information based on the shape data.

2. The virtual clay system according to claim 1, further comprising
   interaction calculating means for defining a functional neighborhood of each particle in the aggregate, and calculating a first interaction between neighborhoods of two or more particles, and a second interaction between a neighborhood of one particle and an external action based on the designation information.

3. The virtual clay system according to claim 2, wherein said interaction calculating means defines one of spherical and cubic space as the neighborhood.

4. The virtual clay system according to claim 2, wherein said interaction calculating means calculates the first and second interaction using an approximate calculation based on a virtual physics law.

5. The virtual clay system according to claim 4, wherein said interaction calculating means calculates the first interaction based on at least one of virtual elasticity and viscosity of the particles and calculates the second interaction based on a virtual reaction against the external action.

6. The virtual clay system according to claim 1, wherein said shape-generating means generates the shape data including film data representing a surface of the aggregate.

7. The virtual clay system according to claim 1, wherein said input means inputs as the designation information at least one or more operating designation out of a creation of a particle, a deletion of a particle, a deformation of the aggregate, a position fixing and fixing cancellation of a particle, a grouping and ungrouping of particles, a translation of the aggregate, a rotation of the aggregate, a scale modification of the aggregate and a surface modification of the aggregate.

8. The virtual clay system according to claim 1, wherein said output means includes one of two-dimensional and three-dimensional display means visually displaying the shape information.

9. The virtual clay system according to claim 1, further comprising
   tactile sense output means for outputting tactile information of a virtual object represented by the aggregate.

10. The virtual clay system according to claim 1, further comprising
    force output means for conveying force information generated in a virtual object represented by the aggregate.

11. The virtual clay system according to claim 1, wherein said input means includes one of two-dimensional pointing means, three-dimensional pointing means, position detecting means for detecting a hand position of the user, force input means, operation panel means displayed on a screen and gesture detecting means for detecting a gesture of the user.

12. The virtual clay system according to claim 11, wherein said position detecting means and gesture detecting means are glove type devices including a plurality of position sensor means.

13. A virtual clay system utilizing a computer, comprising:

memory means for storing particle aggregate data representing an aggregate of virtual particles and position data representing a position of each particle in the aggregate;

shape-generating means for generating shape data representing a shape of the aggregate;

input means for inputting designation information on the aggregate from a user;

deforming means for dynamically changing the shape of the aggregate by modifying a position of at least some of the particles in the aggregate according to the designation information; and output means for outputting at least one of tactile information of a virtual object represented by the aggregate and force information generated in the virtual object.

14. A computer-readable recording medium with a recorded program to enable a computer to perform the functions of:

generating shape data representing a shape of a particle aggregate of virtual particles using particle aggregate data representing the aggregate and position data representing a position of each particle in the aggregate stored in advance;

inputting designation information on the particle aggregate from a user;

dynamically changing the shape of the particle aggregate by modifying a position of at least some of the particles in the aggregate according to the designation information; and outputting shape information based on the shape data.

15. A computer-readable recording medium with a recorded program to enable a computer to perform the functions of:

generating shape data representing a shape of a particle aggregate of virtual particles using particle aggregate data representing the aggregate and position data representing a position of each particle in the aggregate stored in advance;

inputting designation information on the particle aggregate from a user;

dynamically changing the shape of the particle aggregate by modifying a position of at least some of the particles in the aggregate according to the designation information; and outputting at least one of tactile information of a virtual object represented by the particle aggregate and force information generated in the virtual object.

16. A simulating method using a computer, comprising the steps of:

generating shape data representing a shape of a particle aggregate of virtual particles using particle aggregate data representing the aggregate and position data representing a position of each particle in the aggregate stored in advance;

inputting designation information on the particle aggregate from a user;

dynamically changing the shape of the particle aggregate by modifying a position of at least some of the particles in the aggregate according to the designation information; and outputting shape information based on the shape data.

17. A simulating method using a computer, comprising the steps of:

generating shape data representing a shape of a particle aggregate of viatual particles using particle aggregate data representing the aggregate and position data representing a position of each particle in the aggregate stored in advance;

inputting designation information on the particle aggregate from a user;

dynamically changing the shape of the particle aggregate by modifying a position of at least some of the particles in the aggregate according to the designation information; and outputting at least one of tactile information of a virtual object represented by the particle aggregate and force information generated in the virtual object.

* * * * *

UNITED STATES PATENT AND TRADEMARK OFFICE
CERTIFICATE OF CORRECTION

PATENT NO.:      6,040,840
DATED       :    March 21, 2000
INVENTOR(S):     Takeshi KOSHIBA, et al.

It is certified that [an/error[s]] appears in the above-identified patent and that said Letters Patent is hereby corrected as shown below:

Column 28, Line 33, change "viatual" to -- virtual --

Signed and Sealed this

Twenty-fourth Day of April, 2001

Attest:

NICHOLAS P. GODICI

*Attesting Officer*          *Acting Director of the United States Patent and Trademark Office*